United States Patent [19]
Szczebak, Jr. et al.

[11] Patent Number: 5,652,712
[45] Date of Patent: Jul. 29, 1997

[54] METHOD AND APPARATUS FOR CALIBRATION OF DIGITAL TEST EQUIPMENT

[75] Inventors: Edward J. Szczebak, Jr., Plano; Chris A. Balthrop, Sr., Dallas; Patricia K. Mutzabaugh, Garland, all of Tex.

[73] Assignee: Reltec Corporation, Cleveland, Ohio

[21] Appl. No.: 567,140

[22] Filed: Dec. 4, 1995

Related U.S. Application Data

[62] Division of Ser. No. 944,204, Sep. 11, 1992, Pat. No. 5,473,666.

[51] Int. Cl.$^6$ ................................................ H04M 1/24
[52] U.S. Cl. .................. 364/571.01; 379/3; 379/402; 379/345; 375/345; 324/601; 324/605; 324/606; 324/607; 324/616
[58] Field of Search ................... 364/571.01; 379/3, 379/6, 31, 97–98, 345, 347, 402–404, 390, 395; 375/98, 345; 324/601, 605, 606, 607, 612, 616

[56] References Cited

U.S. PATENT DOCUMENTS

| | | | |
|---|---|---|---|
| 3,890,495 | 6/1975 | Bauer et al. | 235/153 AK |
| 4,112,264 | 9/1978 | Abramson et al. | 179/175.3 R |
| 4,192,974 | 3/1980 | Kiko | 179/16 F |
| 4,438,298 | 3/1984 | Rubin | 179/175.2 R |
| 4,611,101 | 9/1986 | Walter et al. | 179/175.3 R |
| 5,473,666 | 12/1995 | Szczebak, Jr. et al. | 379/3 |
| 5,521,904 | 5/1996 | Eriksson et al. | 370/15 |

OTHER PUBLICATIONS

VFR5050 Variable Voice Switched Gain Repeater, 1991.
"Interface Between Loop Carrier Systems and Loop Testing Systems," Bell Communications Research—Technical Reference TR–TSY–000465, Apr. 1987.
"Digital Data System Channel Interface Specification," Bell System Technical Reference—PUB 62310, Sep. 1983.

*Primary Examiner*—Emanuel T. Voeltz
*Assistant Examiner*—Hien Vo
*Attorney, Agent, or Firm*—Sidley & Austin

[57] ABSTRACT

A processor controlled test set for testing special service circuits of a telecommunication system. A microprocessor controls the overall operation of the test set, while a digital signal processor provides high speed timing signals to the various test circuits for generating the wave forms used in testing, as well as analyzes the test result signals that are converted into digital signals. A calibration of the test generator signals as well as the signal measuring path is carried out prior to the test sequence. The digital signal processor also provides gain control over a talking path to maintain stability thereof. An I/O circuit of the test set provides plural communication paths between remote equipment and the test set to initiate and carry out various tests. Processors in the I/O module are effective to convert the various protocols of the serial data, by way of software, to digital bit streams usable by the test set.

33 Claims, 31 Drawing Sheets

CPU

DSP

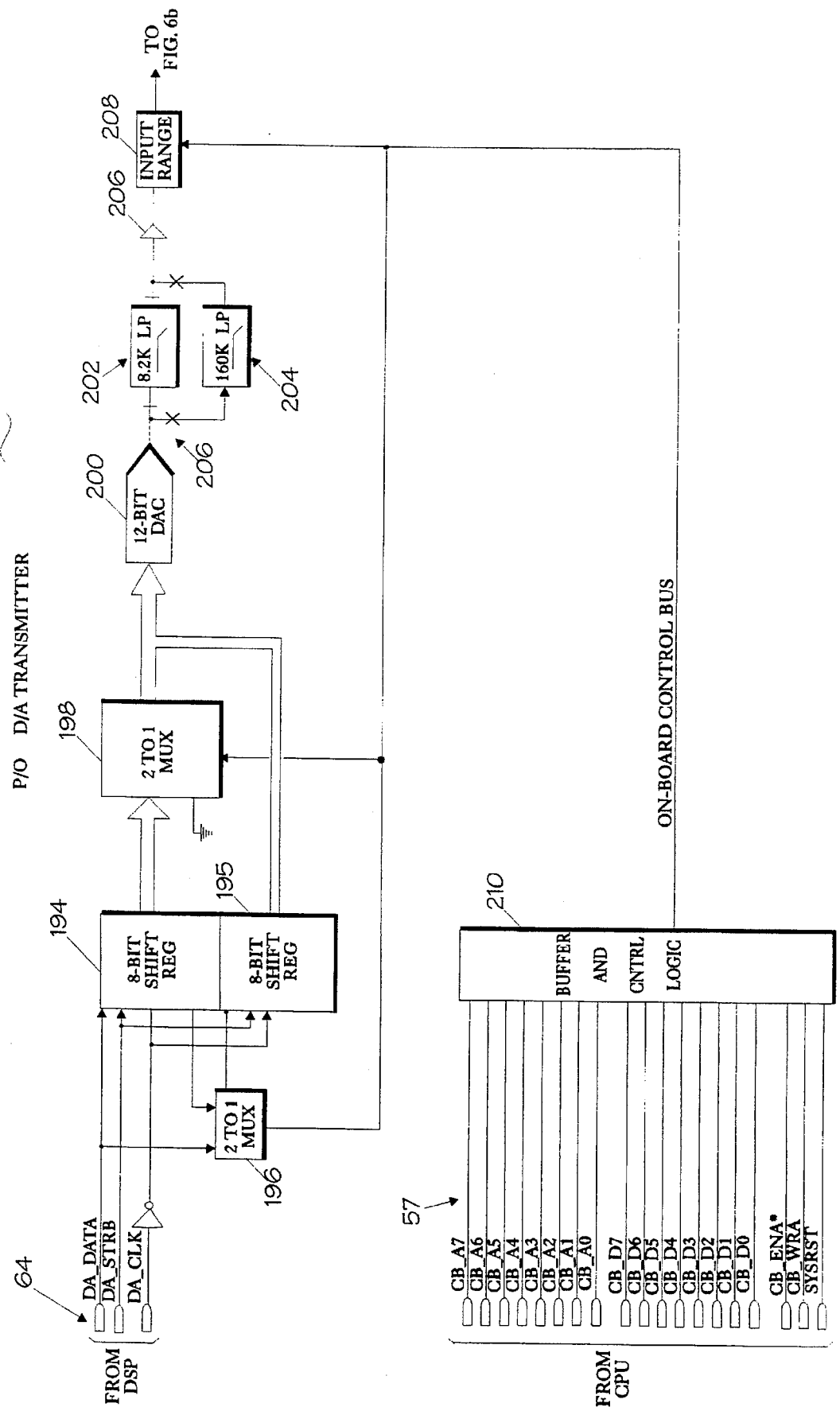
FIG. 6a  P/O D/A TRANSMITTER

A/D RECEIVER

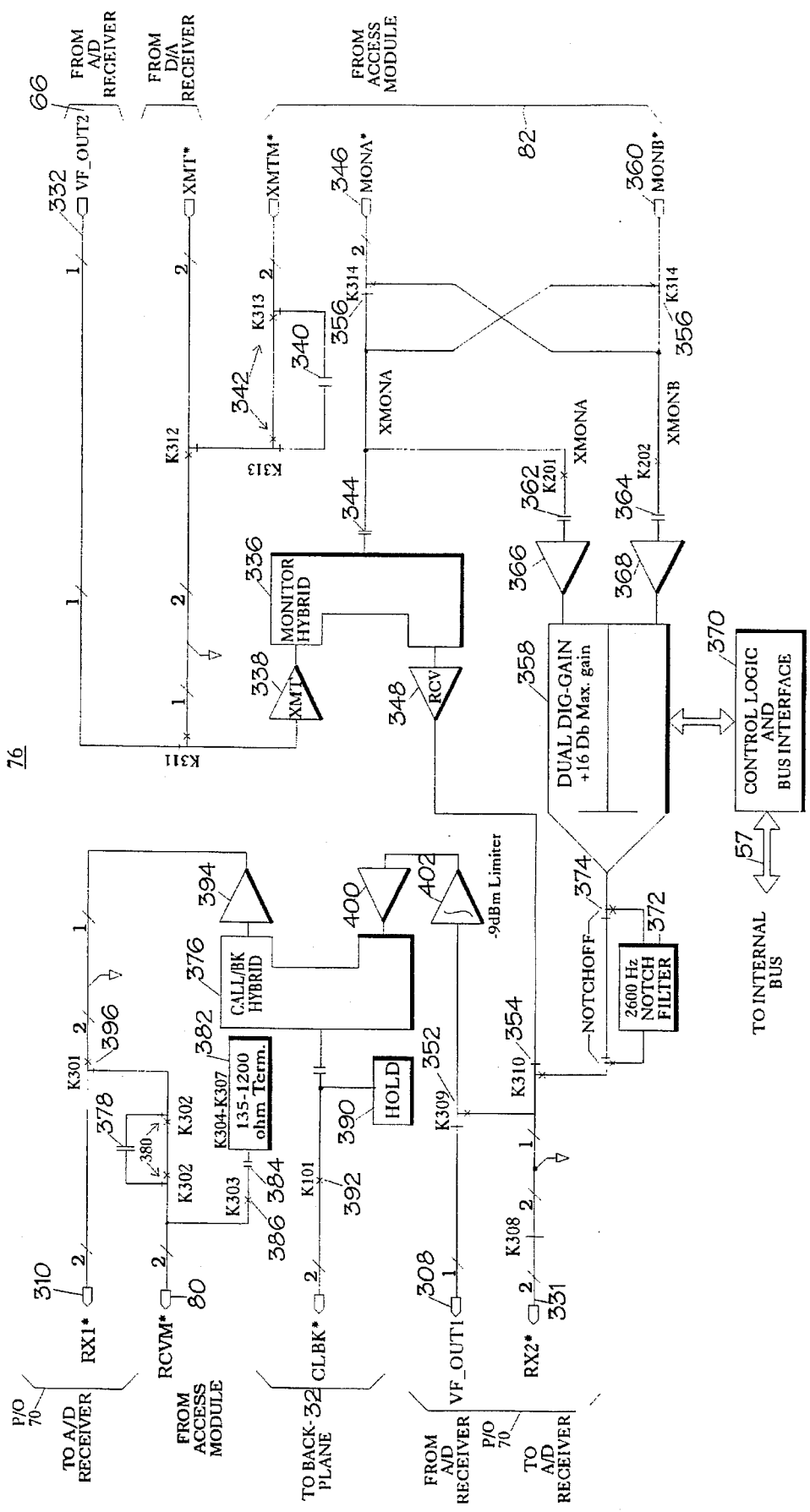

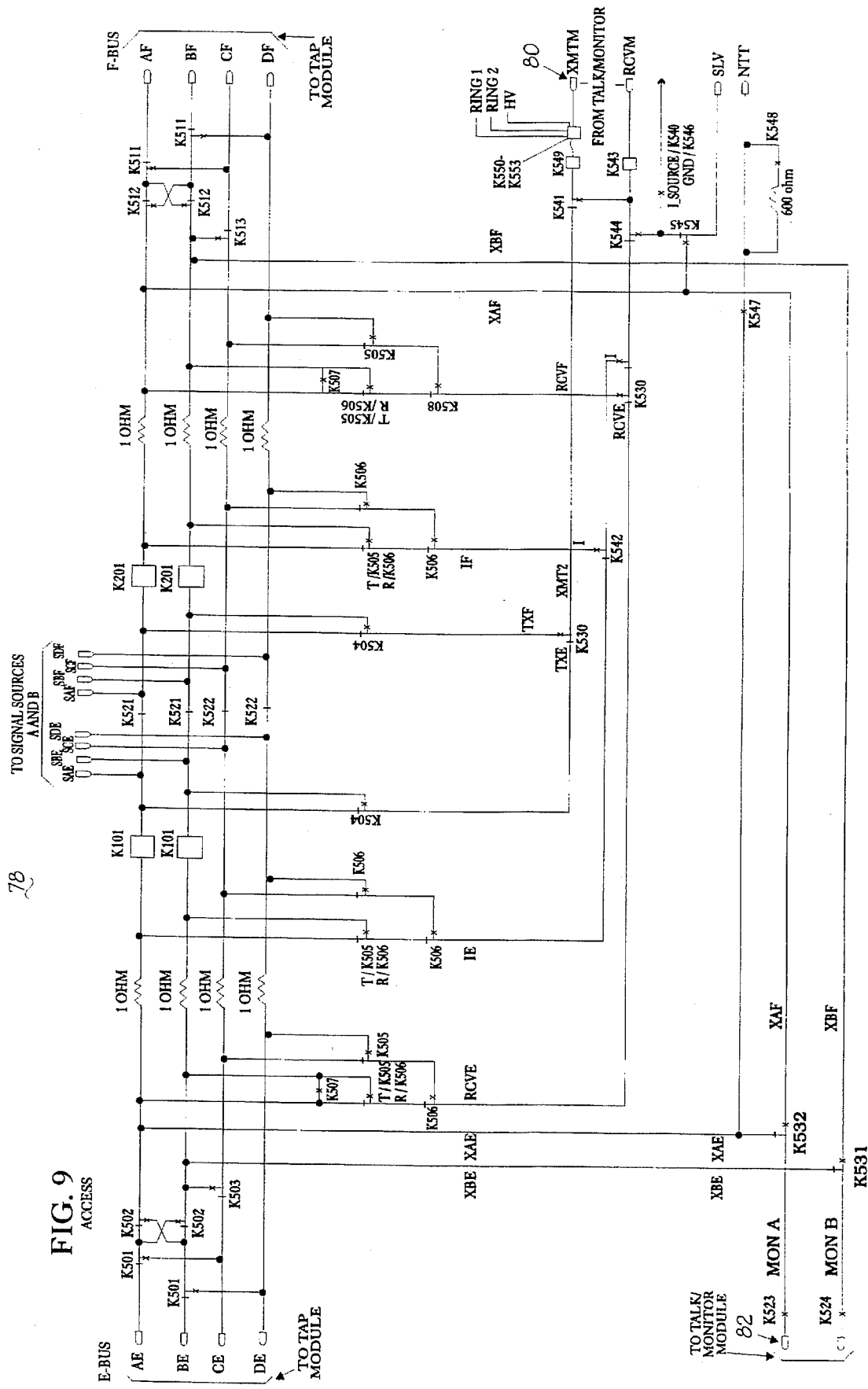
FIG. 9 ACCESS

TAP - MATRIX

TO FIG. 11b

CALIBRATE SOFTWARE

FIG. 11e
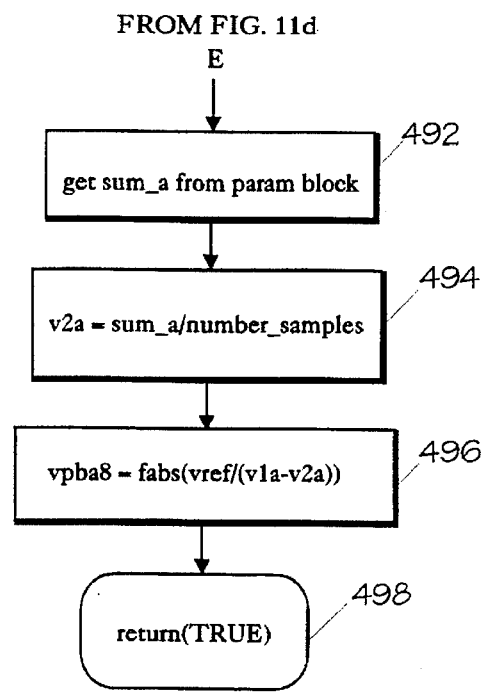
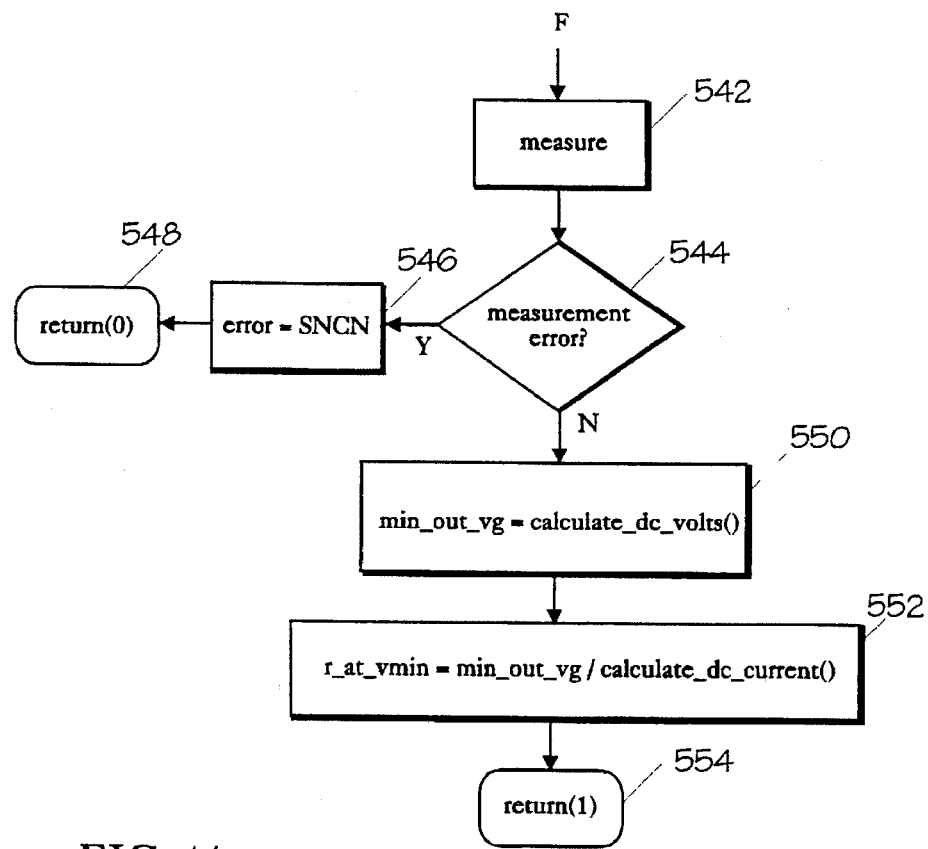
FIG. 11g

AGC Subroutine

800

METHOD AND APPARATUS FOR CALIBRATION OF DIGITAL TEST EQUIPMENT

RELATED APPLICATION

This is a divisional patent application of U.S. patent application Ser. No. 07/944,204, filed Sep. 11, 1992, now U.S. Pat. No. 5,473,666.

TECHNICAL FIELD OF THE INVENTION

The present invention relates in general to circuits and techniques for testing telecommunication equipment, and more particularly to methods and apparatus for testing special service circuits, such as analog private lines for voice and data communications.

BACKGROUND OF THE INVENTION

The capability of testing telephone lines and telephone equipment is a necessity in order to maintain high quality telephone service as well as to quickly detect faults, determine the problem and dispatch repairmen to remedy the problem. The testing of trunks, telephone lines and telephone sets was carried out early on by the use of a local test desk where personnel were able to establish a switched connection to provide a metallic test path directly to the subscriber line or telephone set. When the metallic test path was established, the test desk personnel could conduct simple continuity, resistance, capacitance, etc. measurements to determine the probable fault, or simply to ascertain that there was no imminent problem.

The usefulness of local test desk facilities, and the like, have by and large been antiquated, in view that telecommunication systems nowadays are highly developed and sophisticated computer or processor driven system that provide the switching of voice and data signals without the use of any metallic paths. Hence, simple DC and AC current and voltage tests can no longer be carried out via metallic paths with intervening switching systems between the test equipment and lines or telephone equipment to be tested. A similar aggravation to this test problem is the use of digital carrier systems which are often utilized between central offices and telephone subscribers. With digital carrier systems, such as the well-known T1 carrier system, the communication paths that exist between the central office and the subscribers carry multiplexed digital signals, and thus cannot be utilized for conventional DC or AC line tests. Digital carrier systems thus had to be equipped with ancillary metallic paths dedicated to testing of the lines. The dedicated test paths then necessitated additional connections and equipment for connecting to remote test equipment.

In order to accommodate the testing of both the carrier system, including the central office terminal (COT) and an associated remote terminal (RT) there is in widespread use a pair gain test controller that provides a test interface between a loop carrier system and a loop testing system. The pair gain test controller is situated in a central office switching system and is responsive to a maintenance center to provide a connection to a DC test pair, which comprises a metallic path, that extends from the central office out to the remote terminal. The DC test pair is switchably connected by the remote terminal so that DC and other conventional tests can be carried out on the customer loop. The pair gain test controller can also conduct certain tests on the channel units of the carrier system.

While the pair gain test controller is adequately adapted for carrying out tests on the carrier systems and the customer loops, such system is required to be situated in a central office, and cannot carry out sophisticated automated tests. As a result, a need exists for methods and apparatus for conducting more sophisticated and accurate tests on telephone equipment to determine the operability thereof. Another need exists for test equipment that can be situated at a location remote from the central office and communicate with a carrier remote terminal so that tests can be conducted on the subscriber equipment. A further need exists for a sophisticated processor-controlled test system that provides highly accurate test signals to the line under test, and provides a high degree of flexibility and accuracy in processing the signals received from the line under test.

SUMMARY OF THE INVENTION

In accordance with the principles and concepts of the invention, there are disclosed methods and apparatus well adapted for conducting enhanced tests on subscriber equipment. The test circuits of the invention are processor controlled to provide high speed tests as well as a high degree of versatility and accuracy for conducting different tests on the subscriber equipment.

According to an important feature of the invention, high precision voltage and current measurements are realized by utilizing readily available and low-cost integrated circuits and components. According to a preferred embodiment of the invention, voltage and current measurements made in an A/D receiver module of the test set are carried out by a relatively inexpensive A/D converter that is commercially available, and designed primarily for digital-audio applications. Such a converter maintains a high degree of linearity throughout its operating range, although the DC parameters, such as slope and DC offset, may vary with temperature, age, etc. According to an important aspect of the invention, calibration tests are carried out in the A/D converters in the voltage measuring path and the current measuring path of the A/D receiver module to characterize the slope and DC offset parameters of the converters, as well as to measure certain resistances in the test set that affect resistance measurements in the line under test. In particular, the tip pairs of the voltage and current measuring paths are connected to a precision reference voltage, while the respective ring conductors are grounded. A measurement of the outputs generated by the converters is made by a digital signal processor (DSP), which measurement defines one end point on the slopes of the respective converters. The reference voltage and the ground are then reversed on the tip and ring conductors, whereupon another measurement is made of the other slope end points of the converter outputs by the DSP. This defines the respective slopes of the A/D converters for the conditions to which the converters are then operating. The DC offset of the voltage measuring path is then carried out by grounding both the tip and ring conductors and measuring the output voltage produced by the associated AD converter. Other calibration tests are carried out to verify that the amplitude of the tone generation circuits is accurate, and if not, other calibration factors are generated based on the amplitude error. Lastly, a predefined voltage is selected for driving the voltage measuring path, whereupon a preselected resistor is placed in series with the voltage measuring path, and measurements are made to determine an input resistance of an operational amplifier in the A/D receiver module. When this resistance is characterized, it is utilized as a factor in measuring resistances of lines under test. The calibration factors are transmitted from the DSP to a CPU and thereafter used when conducting actual tests of lines.

In accordance with another feature of the invention, apparatus and methods are disclosed for digitally controlling the gain of voice signals in a bidirectional talk path. Signals from one audio source are coupled through a hybrid to a digital signal processor via a first coder-decoder (codec). The codec comprises a circuit for receiving analog signals and converting the same into a nonlinear digital format, and conversely for receiving nonlinear digital signals and converting the same to analog samples for output to the signal source. Another talk path is connected via a second hybrid and codec to the digital signal-processor. The processor receives digital samples from each codec, processes these samples to adjust the gain or amplitude thereof and transmits the respective processed digital samples via the codecs to the opposite destinations. In this manner the digital signal processor both adjusts the amplitudes of the digital signals, if need be, and provides a switching function to exchange or swap the digital signals from one signal source to the other signal source. The digital signal processor can be programmed to process the signals passing in opposite directions with different gains so that each communication channel can be characterized by different gain levels. Further, the digital samples of each channel are compared with respect to the gain factors and changed so that unity gain in the talk loop is not exceeded.

Yet another feature of the invention described are circuits and methods for converting DDS synchronous data transmissions into asynchronous transmissions, and vice versa, using a digital processor and associated circuits. A transceiver is coupled to the digital processor to receive and transmit on respective synchronous buses. The processor is connected to an asynchronous bus for receiving and transmitting asynchronous data. The positive and negative polarity pulses of synchronous transmissions received by the transceiver are converted to separate pulses and coupled to the digital processor, as well as clock signals recovered from the synchronous transmission. The clock signals provide an interrupt to the digital processor to process the synchronous pulses and convert the same to an asynchronous format. Further, the digital processor utilizes a shift register and number of flag registers to determine if the synchronous bit stream received constitutes a bipolar violation, and if so, substitutes different digital bits for subsequent asynchronous transmission, or otherwise processes the bipolar violation bits in a predefined manner. Asynchronous transmissions received on the asynchronous bus by the digital processor also provide an interrupt thereto so that the processor can convert the digital bits, including start and stop bits, into the synchronous format. The digital processor determines from flag register information whether the bits to be transmitted on the synchronous bus are to be positive or negative polarity bits. Bits can also be assembled and transmitted in accordance with a bipolar violation format. The transceiver receives the bits converted from the asynchronous format and transmits the same on the synchronous transmit line in accordance with time intervals of the recovered clock.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements throughout the views, and in which:

FIGS. 6a and 6b illustrate the detailed circuits of the D/A transmitter which provides precision test signals directed to the line under test;

FIG. 8 is a schematic illustration of the talk/monitor module having hybrid circuits for separating transmit and receive signals in the test system during a monitor mode and a talk mode;

FIG. 9 is a schematic illustration of the access module which controls the direction and selects the conductor pairs utilized during tests, and provides inputs for signalling circuits to provide appropriate telephony signalling to the line under test;

FIGS. 11a–g are flow charts depicting the operations of the digital signal processor in providing an automatic calibration of the signal measuring circuits;

DETAILED DESCRIPTION OF THE INVENTION

General

Figure 1:
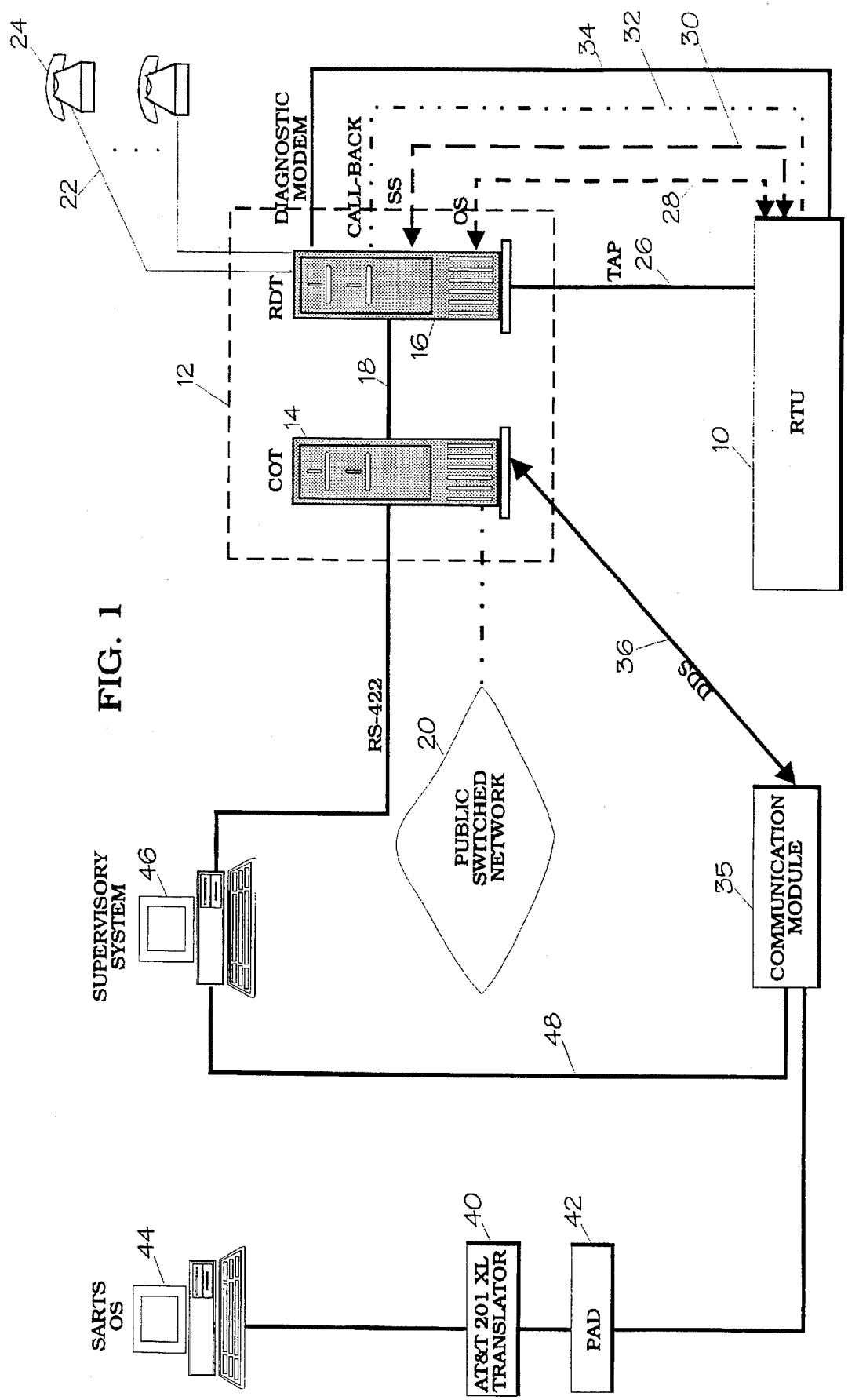
FIG. 1 is a generalized block diagram of an environment in which the invention may be advantageously practiced.

FIG. 1 illustrates one environment in which the test system of the invention may be used to advantage in a carrier system. It is to be understood that the principles and concepts of the invention can be advantageously used, either together or separately, in applications other than shown in FIG. 1. The test system of the invention, denoted in FIG. 1 as a remote test unit 10, is shown connected to a digital loop carrier system 12 comprising a central office terminal (COT) 14 and a remote digital terminal (RDT) 16 connected thereto by a digital carrier transmission line 18. Both the central office terminal channel unit and carrier equipment 14 as well as the remote digital terminal 16 are adapted for use with the remote test unit 10, and are available from reliance COMM/TEC, Bedford, Tex., under the trademark DISC*S™. The central office terminal 14 comprises conventional digital channel units that receive plural voice or data inputs and multiplex the same onto a carrier for transmission on the carrier transmission line 18. The analog or digital information input to the central office terminal 14 is generated by a central office switching system (not shown) comprising a part of the public switched network 20.

The remote digital terminal 16 receives bipolar digital signals on the carrier line 18, demultiplexes the digital signals and converts the same to analog voice signals for distribution to individual lines, customer or subscriber loops 22. As is well known, subscriber equipment, either digital or analog, such as a telephone set 24 or other equipment can be readily connected to the loop 22 for communicating via the carrier equipment to the public switched network 20. As will be described in more detail below, the remote test unit 10 of the invention is connected to the remote digital terminal 16 by one or more metallic lines 26 defined as test access points. An I/O port module of the remote test unit 10 has numerous connections to external systems, including the remote digital terminal 16. The connections to the RDT 16 are defined by an OS line 28 for receiving test commands from a switched access and remote test system (SARTS) 44 and for transmitting test results thereto. An SS line 30 is for communicating with a supervisory system 46 associated with the digital carrier system 12. The communications with the supervisory system 46 allow a test access pair to be made available to the test system 10 to carry out tests with respect to the facility or equipment sides of the remote digital terminal 16. When testing the facility side, the test system 10 is provided metallic access toward the RDT 16, and when testing the equipment side, metallic test access is provided toward the customer loop 22. A line 32 provides callback voice communications from the remote SARTS terminal 44, or the like. A line 34 comprising a diagnostic modem communication link provides diagnostic capabilities for the remote test system 10. Another I/O input to the test system 10 provides digital programming capabilities for programming the memories associated with a processing unit in the test system 10.

Communication circuits in both the test system 10 and a communication module 35 provide conversion between a DDS bipolar synchronous protocol and an asynchronous format. The communication module 35 receives asynchronous serial data from remote equipment, converts the same into DDS synchronous format for transmission through the carrier system 12, and corresponding circuits in an I/O module of the test system 10 reconvert the synchronous serial bipolar data signals into asynchronous serial unipolar data for convenient use and processing by the test system CPU processor.

The digital data signal (DDS) line 36 is connected between the communication module 35 and the central office terminal 14. The DDS port is a primary port in the test system for communicating with the SARTS terminal 44. This port supports a single 9600 baud asynchronous channel via switching systems where it will be connected to a pad 42 to convert the asynchronous digital signals to an X.25 format. The translator 40 converts the X.25 format data from the switched access and remote test system (SARTS) terminal 44 to the appropriate format for communicating with the communication module 35. The pad 42 is effective to convert the X.25 format data to a standard RS232 asynchronous protocol coupled to the communication module 35. As noted above, communication converter circuits in the communication module 35 are effective to convert asynchronous protocol to DDS synchronous digital data signal for output on the line 36. The digital data service line 36 is a conventional type of signaling on telephone lines. The supervisory system 46 is shown connected by an asynchronous 9600 baud line 48 to the communication module 35. The supervisory system 46 is also connected by an RS-422 asynchronous line to the central office terminal 14. While not shown, the test system 10 includes an RS-232 local craft port for providing asynchronous communications to equipment located locally with respect to the test system 10.

In operation, tests on special service circuits, such as the subscriber loops 22, are initiated by test personnel at the SARTS test terminal 44. A SARTS formatted message is transmitted to the translator 40 where it is translated into an X.25 format. The pad 42 converts the X.25 format protocol to standard RS 232 asynchronous signals for transmission to the communication module 35. A processor in the communication module 35 receives the command instructions, converts the asynchronous signals to synchronous bipolar digital data signals for transmission to the central office terminal 14, via the DDS line 36. The test system 10 receives the DDS synchronous signals on the OS line 28, converts the synchronous bipolar signals to asynchronous unipolar signals, and a CPU decodes the commands and configures the internal circuits for carrying out the tests specified in the command instruction. Numerous tests can be conducted in a sequence.

As will be described in more detail below, the test system 10 provides test system control functions, signaling and access configuration functions, and calibration functions. The measurements that can be carried out by the test system 10 include parametric tests for resistance, capacitance and voltage, and transmission impairment measurements, such as noise and impulse noise. The test system 10 is designed to provide highly accurate measurements in environmental conditions ranging in temperature between −40° and +65° C., and humidity between 5–95%. A processor in the test system 10 coordinates communications with the external systems to set up various tests, causes other processors to carry out the tests and report back the results. The signaling functions carried out by the test system 10 involve the placement of certain AC and/or DC conditions on the line under test to emulate one end of the circuit. The access configuration function involves the selecting of one of the test access points 26 to utilize, connecting the test access point to an appropriate internal circuit based on a configuration, e.g., two-wire A, two-wire B, four-wire E & M, etc., controlling the split state of the circuit and connecting the appropriate circuit points to transmit and receive test circuits in the test system 10.

An important feature of the invention is the processor conversion of signals in both the communication module 35 and the test system 10 of one format to another format. In response to the incoming command to test a circuit, the test system 10 transmits other instructions to the supervisory system 44 via the SS line 30 to set up the appropriate metallic test paths. The central office terminal 14 can then request that the remote digital terminal 16 idle the various circuits to be tested and otherwise allow tests to be carried out. The test system 10 then selects the appropriate test access pair 26 connected to the remote data terminal 16 to establish a metallic path or DC test pair to a selected one of the customer loops 22 on either the customer equipment side, or toward the RDT 16 on the facility side. The test circuits in the test system 10 are processor controlled to carry out the various tests and report the results thereof back to the SARTS test system terminal 44.

Another important feature of the invention is the automatic calibration of the test measuring circuits prior to actual testing of the line under test. Personnel at the SARTS terminal 44 may desire monitor capability or two-way voice communications on the line under test, whereupon the test system provides a voice path and continuously monitors the voice signals and adjusts the gain accordingly to maintain stability in the talking path. As will be described in more detail below, various tests are carried out in a more efficient manner to more accurately characterize the faults or the electrical characteristics of the subscriber loops 22 in a manner not previously achievable.

Test System Modules

Figure 2:
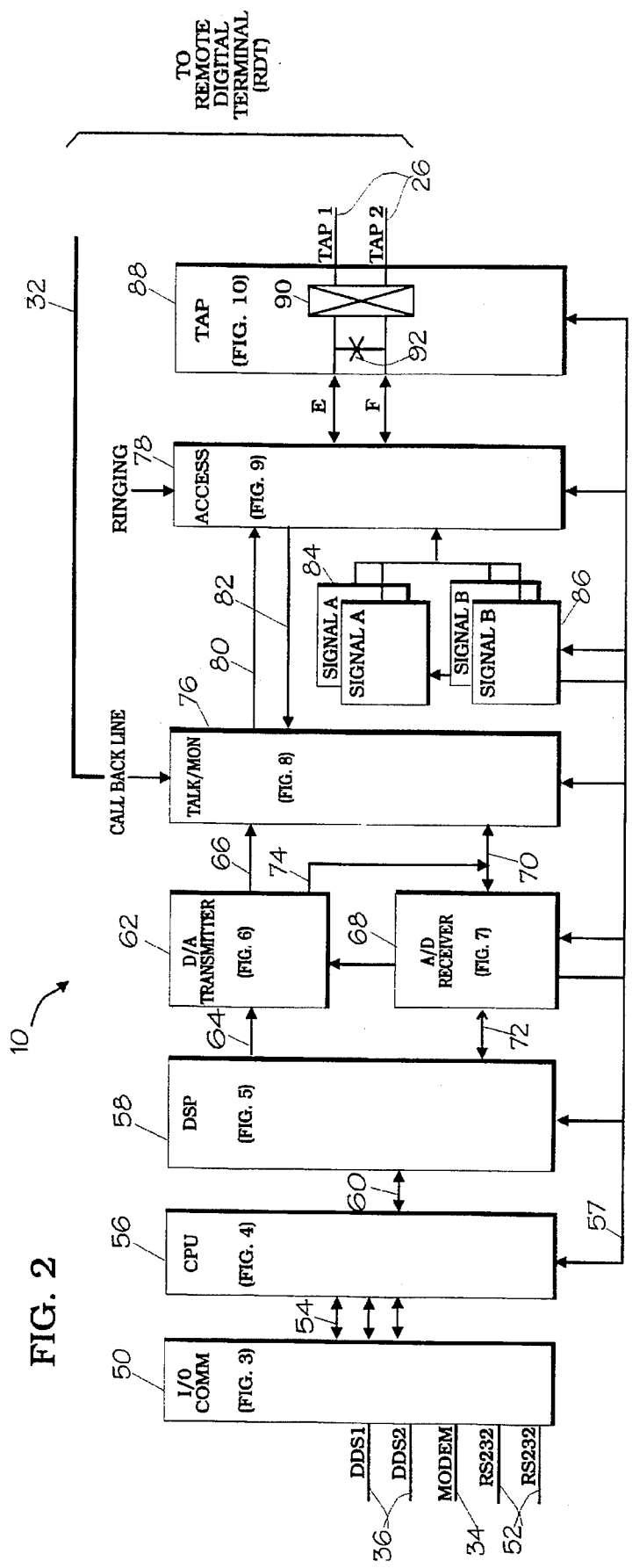
FIG. 2 is a detailed block diagram of the test system of the invention.

With reference now to FIG. 2, there is depicted the major circuits of the test system 10 according to the preferred embodiment of the invention. As noted above, those skilled in the art may prefer to utilize only certain test circuits of the invention, without incorporating the other circuits or all the attendant advantages thereof. It should also be understood that the various test circuits of the invention may find a variety of applications other than in the telecommunications field, and can be embodied in circuits or apparatus other than that disclosed herein.

The test system 10 of the invention includes an input/output (I/O) module 50 for providing data communications to and from the test system 10. The I/O module 50 includes a first DDS synchronous port designated DDS1 and a second synchronous port designated DDS2. The DDS1 and DDS2 communication channels 36 provide communications between a special service test set, the supervisory system 46 and the switched access and remote test system (SARTS) 44 via the communication module 35, the translator 40 and pad 42. The DDS communication channels 36 operate at 9600 bps. A pair of RS-232 asynchronous ports 52 are connected to the I/O module 50 for providing bidirectional communications with respect to the test system 10 for local craft access. A modem port 34 is also associated with the I/O module 50 to provide remote access to the test system 10 by craftsperson.

The I/O module 50 includes a number of bidirectional buses 54 for communicating via asynchronous buses with a central processing unit 56. The communications between the I/O module 50 and the CPU module 56 are buffered by appropriate TTL buffers. The CPU 56 is especially designed for use in receiving test commands and for carrying out the testing of special service circuits. The CPU module 56 controls and coordinates the overall activity of the test system 10. The CPU 56 includes a Motorola 68302 processor operating at about 16.67 MHz. The processor operates in conjunction with 64K×16 bits of EPROM, 256K×16 bits of flash memory, 128K×16 bits of SRAM and 2K×8 bits of battery backed RAM. The CPU module 56 communicates with the I/O module 50 by the three configurable asynchronous serial ports 54 With TTL level inputs and outputs. An internal bus 57 extends from the CPU module 56 to the other modules of the test system to latch data and other signals in the various modules to configure the system for the tests to be carried out.

The test system 10 includes a number of test circuits controlled by a digital signal processor (DSP) module 58 which, in turn, communicates with the CPU 56 by a multi-bit parallel bus 60, as well as the internal bus 57. Two primary functions of the digital signal processor module 58 are to 1) carry out digital measurements of the equipment or line under test, and 2) generate and control the test circuit timing. In carrying out this latter function, the DSP 58 generates the timing and sync pulses for controlling the operation of A/D and D/A converters. The DSP module 58 includes a receive DSP and a transmit DSP, both of the type DSP 56001 available from Motorola. This type of digital signal processor is a 24-bit general purpose DSP with 8K×24 bit local memories, and operates at a clock rate of 27 MHz. The sync and timing signals are generated in the DSP module 58 by two application specific integrated circuits (ASIC). The operation of the DSP module 58 is controlled in an overall manner in terms of the type of tests to be executed, by the CPU 56 via the parallel bus 60. Importantly, the communications from the CPU 56 to the DSP 58 are used to download measurement and signal generation algorithms and to return test results to the CPU 56.

The CPU 56 receives commands via the OS port to access particular lines or equipment to be tested. The CPU 56 processes the commands and dispatches associated instructions to the DSP 58 to carry out the particular tests. In addition, the CPU 56 sends out other commands via the SS port to the supervisory system, whereupon the supervisory system 46 dispatches commands back to the digital loop carrier system 12 to set up the appropriate connections to connect the subscriber lines 22 to be tested via the remote digital terminal 16 to outputs thereof which are connected to the test access points 26. It can be appreciated that the overall control of the test system 10 is carried out by the CPU 56, while the actual and detailed tests are carried out by the digital signal processor 58.

As noted above, one DSP in the module 58 generates signals to set up the test circuits and to carry out the tests, while another DSP is dedicated for processing test result signals that are received from A/D converter circuits. In a talk mode, the receive DSP functions to transmit and receive voice signals by way of the callback line 32 and control the gain in the voice path.

A digital-to-analog (D/A) transmitter 62 is connected to an output of the digital signal processor module 58 for providing the analog test signals to the line under test. The primary function of the D/A transmitter 62 is to generate various waveforms and test Voltages required by the test system 10. A high speed 12-bit D/A converter is driven by digital signals from the transmit DSP in the module 58, via the digital bus 64. The output signals on bus 66 of the D/A transmitter 62 are either steady-state DC voltages or analog voltages of various waveforms to provide a stimulus to the line under test. Power amplifiers are provided in the D/A transmitter 62 for achieving power levels sufficient for driving transmission lines, and the like.

Analog-to-digital (A/D) receiver 68 includes an input 70 for receiving analog signals, and includes a digital output 72 connected to the digital signal processor 58. The A/D receiver 68 is a high speed converter for converting analog test results from the line under test to corresponding digital signals which are analyzed by the digital signal processor 58. The actual pass-fail of the tests are determined by the digital signal processor 58, based on the signals with which the line under test is driven, and the signals resulting from the tests. The A/D receiver 68 includes a 16-bit A/D converter associated with a first measurement path, and a second 16-bit A/D converter associated with a second measurement path. Measurements of both current and voltage can be made by the A/D receiver 68. By utilizing the transmitter and receiver arrangement noted in FIG. 2, resistance, capacitance and AC impedance tests can be conducted, as well as other tests pertinent to the testing of telecommunications equipment. Importantly, the A/D receiver 68 can make simultaneous voltage and current measurements, and thus determine resistance and impedance parameters of the line under test. An output 74 of the D/A transmitter can be coupled to the input 70 of the A/D receiver 68 to provide loop-back capabilities and thereby calibrate the test system 10 before conducting actual tests. By providing a calibration cycle immediately prior to each test, a high degree of reliability and accuracy can be maintained with the test system 10. The A/D receiver also includes conventional codecs for converting voice signals in the talk path to digital signals for processing by the DSP module 58. In processing the digitized voice signals the DSP maintains control over amplitude thereof, and thus the gain in the talk path.

As noted in FIG. 2, both the D/A transmitter 68 and the A/D receiver 68 are connected to a talk/monitor module 76. Further, the callback line 32 is also connected as a port to the talk monitor module 76. The module 76 allows the monitoring and bidirectional communications between test personnel at the SARTS terminal 44 and the line under test. In addition, the talk/monitor 76 provides various AC terminations to carry out precise AC measurements. An access module 78 is connected to the talk/monitor module 76 by way of a unidirectional bus 80 extended to the access module 78, and a unidirectional bus 82 extending to the talk/monitor module 76. As noted above, the callback line 32 is extended indirectly to the SARTS monitor 44 so that maintenance personnel can communicate on the telephone line to either monitor the line or talk on the line being tested. Voice communications carried over the callback line 32 are converted to digital signals and processed by the digital signal processor 58 as to gain so as to control the voice line signals and prevent oscillations on the line. The talk/monitor module 76 includes two hybrid circuits to provide signals on a bidirectional bus to incoming and outgoing signals on different unidirectional buses. Hybrid circuits are well known in the art for this purpose.

The access module 78 functions to control the routing of test signals and test results between the internal circuits of the test system 10 and the external lines or equipment to be tested. The access module 78 controls a first 4-wire test path for transmitting signals and a second 4-wire path for receiving signals from the line under test. The transmit and receive lines are designated tip and ring, consistent with telephony terminology. An additional pair of sleeve wires provide control for signaling the line under test. The transmit and receive paths are generally not subjected to any signal conditioning in the access module 78, but rather are switched to accommodate the particular tests of concern. On the other hand, the sleeve pair can be referenced to signal ground and/or connected to a current source to provide appropriate signaling. One or more signal A modules 84 are connected to the access module 78 to provide standard signalling for the lines. In like manner, one or more signal B modules 86 are also coupled to the access module 78. The signal A and B modules 84 and 86 include an interface for the decoding of commands from the system parallel I/O bus. The modules 84 and 86 also utilize data from decoded commands to control relays and other circuits that connect analog circuits to the lines to be tested. The signal modules 84 and 86 also contain analog circuits that terminate or feed the selected A and B communication line pairs.

A test access point (TAP) module SS is connected between the access module 78 and a pair of outputs designated TAP1 and TAP2, for allowing test access to two different destinations. Either of the test access point outputs 26 can be connected to the remote digital terminal 16, as noted in FIG. 1, or connected to other equipment for providing test access to other telecommunication lines or equipment. The test access point module SS essentially provides connections to any one of the input A, B, C or D pairs of the equipment (E) side and facility (F) side to the TAP1 or TAP2 outputs 26. This multiplexing function is indicated by reference character 90 in FIG. 2. Further, loop back capabilities can be provided, as noted by reference character 92. The test system side of the TAP module 88 is known as the equipment (E) side, while the output port side of the module 88 is known as the facility (F) side. Software commands from the CPU 56 control the TAP module 88 to provide the appropriate connection of the input and output pairs.

I/O Module

Figure 3:
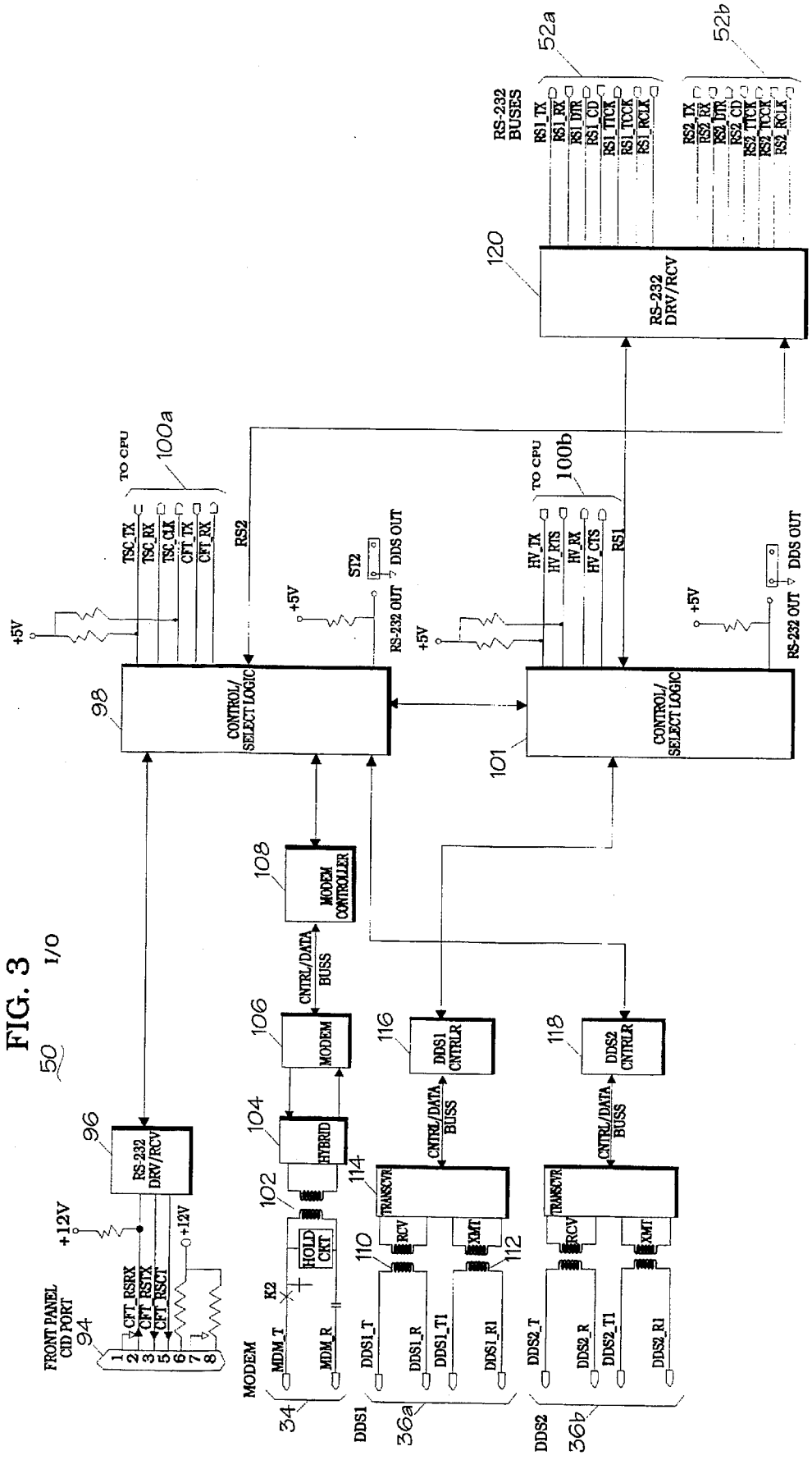
FIG. 3 is a schematic illustration of the I/O module which provides a number of ports for communicating with external systems and the test system of the invention.

With reference now to FIG. 3, there is shown a detailed schematic diagram of the I/O module 50. As noted above, the I/O module 50 provides the mechanism for communicating to and from the system 10. The I/O module 50 includes a front panel port 94 for input thereto of asynchronous or RS-232 type of data. A driver-receiver 96 converts the RS-232 bipolar pulses to digital signals communicated to a control/select logic circuit 98 which comprises a programmable logic device that provides multi-path multiplexing in response to input control signals 100 received from the CPU module 56. The signals 100a from the CPU 56 determine which physical serial I/O port DDS1, DDS2, RS-232 52a, 52a, modem port 34 or the craft port 94 is to be connected to the internal TTL bus. Programmable logic array device 100 functions in a similar manner in response to signals 100b.

The modem port 34 is coupled byway of a transformer 102 and a hybrid 104 to a standard modem 106. A modem controller 108 couples the transmit and receive data signals between the modem 106 and the programmable logic device 98.

The DDS1 port 36a includes a receive transformer 110 and a transmit transformer 112 coupled to a transceiver 114. A controller 116 controls the communications between the DDS1 port 36a and the programmable logic device 101. The DDS1 port controller 116 is connected to the control/select logic device 101, which functions as a multi-path multiplexer. The DDS2 port 36b is similarly controlled by a controller 118 which is connected to the multi-path multiplexer 98. In accordance with important features of the invention, both controllers 116 and 118 perform software conversions of synchronous bipolar DDS transmit and receive data to synchronous bus or physical I/O transmit and receive data conversions, synchronous DDS transmit and receive data to synchronous bus transmit and receive data and clock, set the transceiver bit rates, sense and control loop back, sense loss of DDS signal, reset the DDS transceivers, and generate carrier detect signals for the internal bus and physical I/O interfaces. Heretofore, such conversions were carried out by discrete circuits. An RS-232 driver/receiver circuit 120 has an input connected to each of the multi-path multiplexers 98 and 100. The driver/receiver 120 is a TTL to RS-232 level translator, as well as a RS-232 to TTL level receiver/translator. As can be appreciated, the I/O module 50 includes a number of I/O communication paths connected thereto, and provisions for routing or multiplexing the same under control of the CPU 56, via the control signals on buses 100a and 100b. Further, data input byway of any of the I/O ports can be coupled to the CPU 56 as an instruction or command to carry out one or more tests, or to return test result data to a remote test terminal.

CPU Module

Figure 4:
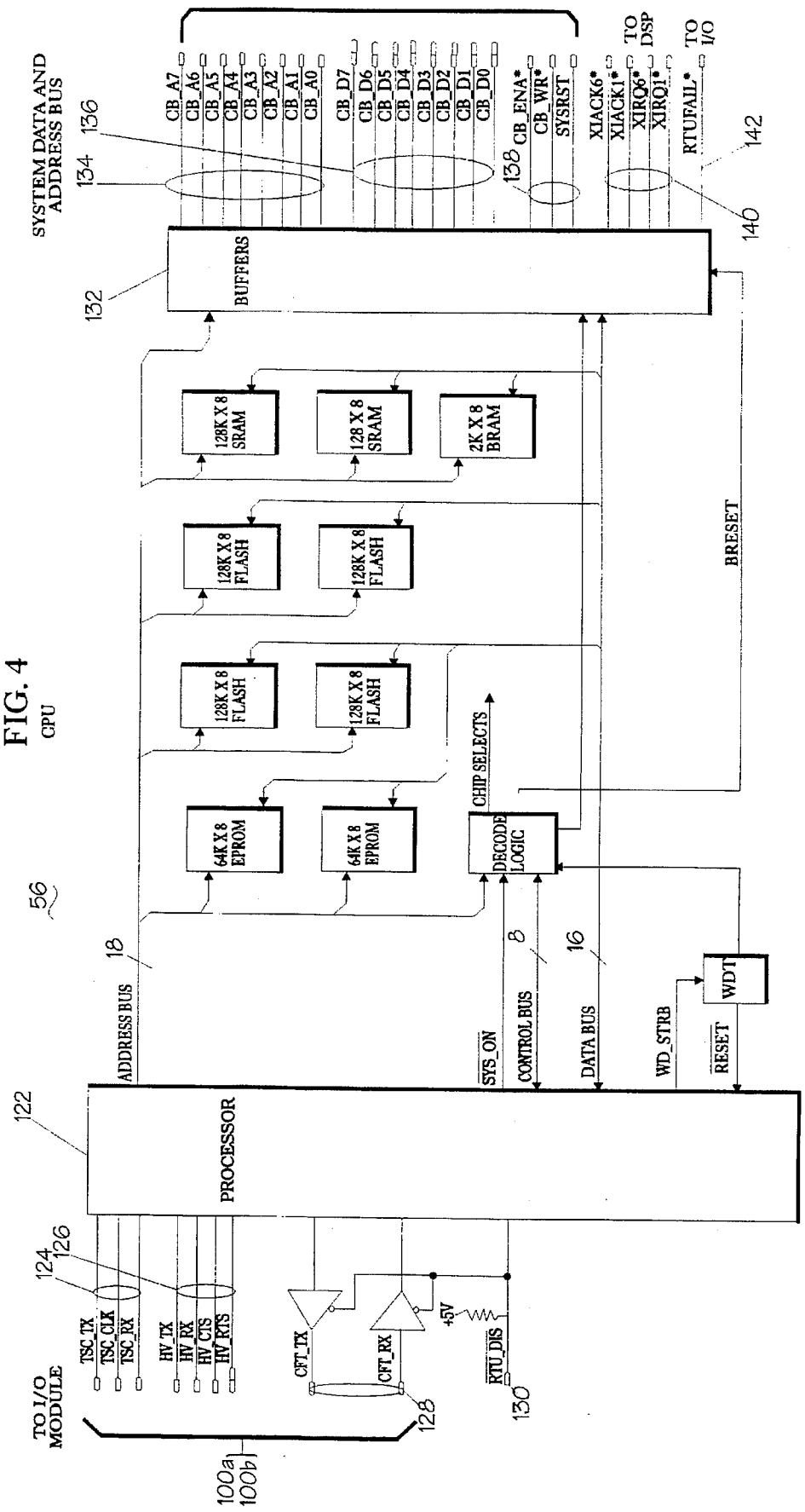
FIG. 4 is a schematic illustration of the CPU module which provides overall control of the test system.

FIG. 4 illustrates the details of the CPU module 56. As noted on the left of FIG. 4, the bus 100a, 100b is shown connected from a processor 122 and extended to the programmable logic devices comprising the multi-path multiplexers 98 and 101 of the I/O module 50. In the preferred form of the invention, the processor 122 comprises a Motorola 68302 microprocessor operating at 16.67 MHz. The processor 122 accommodates three synchronous/asynchronous programmable serial ports. One serial port 124 can transmit or receive serial data between the test system 10 and the 201 XL translator 40 via the communication module 35 (FIG. 1). Port 124 accommodates synchronous serial data. The second serial port 126 accommodates asynchronous data from either remote HV modules or remote SS metallic test access unit (MTAU) modules. The third serial port 128 is an asynchronous port for communicating with the local craft interface 94 (FIG. 3). The serial ports 124–126 are multi-functional ports operating at the TTL level and are configurable to operate in transmit or receive modes based on the logic state of the RTU-DIS processor input 130. As noted above, the processor 122 is supported by numerous types of memory as shown in FIG. 4, and identified above. A number of address and data buffers 132 buffer signals on the unidirectional outgoing address bus 134, as well as the bidirectional data bus 136. System reset, enable and read/write signal lines 138 are carried throughout the internal system bus with the address and data signals. An additional bus 140 is connected to the digital signal processor module 58 for interrupt and acknowledge functions. A failure of the CPU module 56 is communicated to the I/O module 10 by way of the signal line 142.

DSP Module

Figure 5:
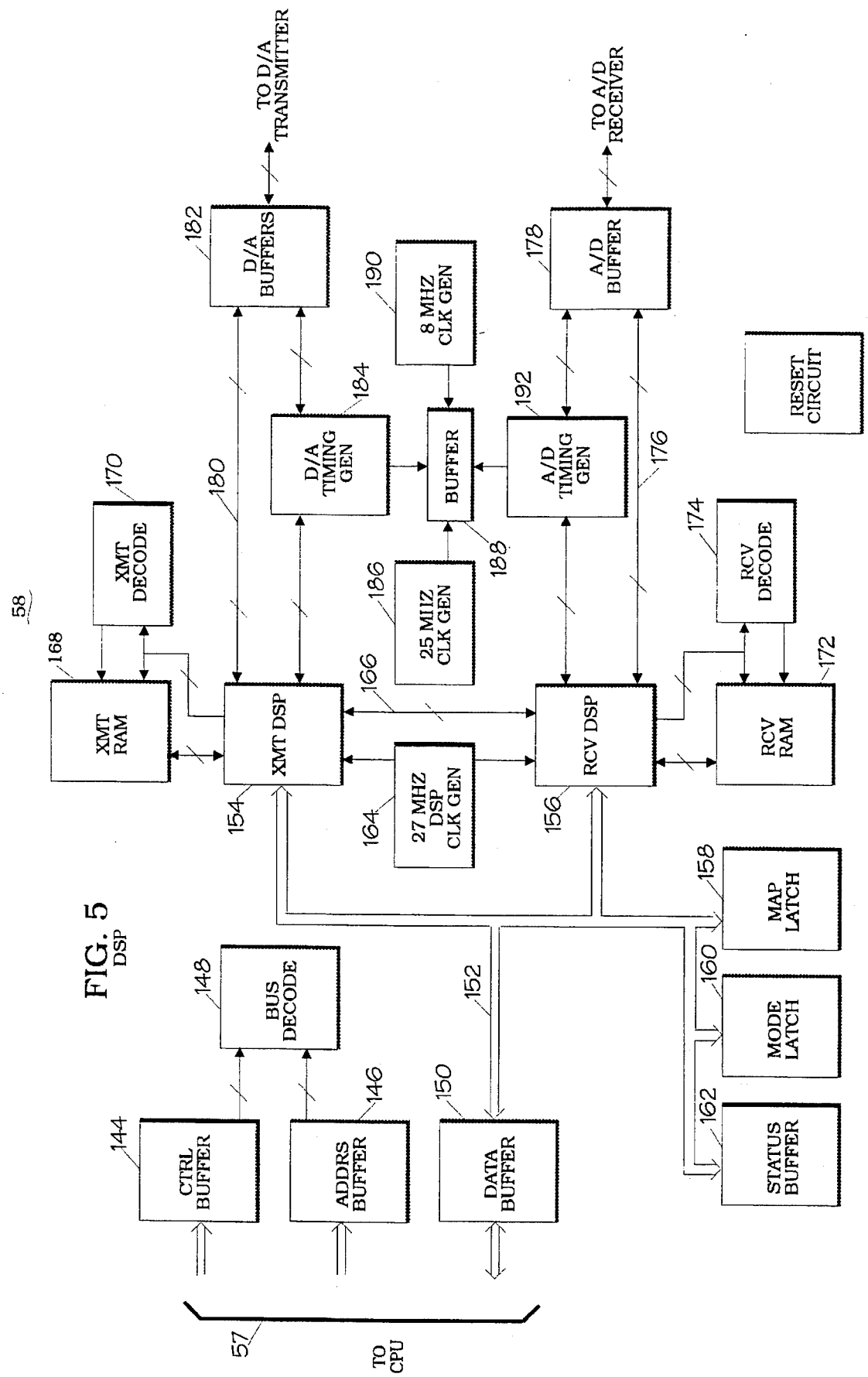
FIG. 5 is a schematic illustration of the digital signal processor module which generates the timing signals for the test circuits and the test signals, and analyzes the test results from the line under test.

In FIG. 5, the detailed functional circuits of the digital signal processor module 58 are shown. A receive control buffer 144 receives various control signals from the CPU module 56, such as the interrupt and acknowledge handshake signals. An address buffer 146 receives an 8-bit address from the CPU 56. The outputs of the control buffer 144 and the address buffer 146 are coupled to a bus decode circuit 148 to decode the signals for internal control and set up of the digital signal processor circuits. A data buffer 150 couples the 8-bit data bus from the CPU 56 to the digital signal processor module 58. As noted, the data buffer 150 is bidirectional for either receiving or transmitting data with respect to the CPU 56 and the DSP 58. An internal DSP data bus 152 couples data between the buffer 150 and a transmit digital signal processor 154, a receive digital signal processor 156, a map latch 158, a mode latch 160 and a status buffer 162.

The transmit section of the DSP module 58 includes a transmit DSP 154, comprising a Motorola 56001 digital signal processor operating at a clock rate of 27 MHz. A clock generator 164 is shown connected to both the transmit digital signal processor 154 and the receive digital signal processor 156. Further, a digital communication bus 166 is shown connecting the transmit DSP 154 and the receive DSP 156. The operation of the DSP module 58 is controlled by the parallel internal bus from the CPU 56 through the map latch 158, the mode latch 160 and the status buffer latch 162. The sampling rate for the transmit and receive paths are established by data written into the latches 158–162 by the CPU 56. As noted above, the parallel interface is utilized to download the measurement and generation algorithms to the DSP 58 and to return test results and status information from the DSP 58 to the CPU 56.

A random access memory 168 is available to the transmit DSP 154 for reading and writing information therefrom. A transmit decode circuit 170, comprising a programmable array logic, decodes information stored in the map latch 158 and from the address select lines from the transmit DSP 154 to allocate the 8K×24 transmit RAM 168 into data sections as well as program sections. The map latch 158 is utilized to control the reset lines of the transmit and receive DSPs 154 and 156 and determines the manner in which the static memories 168 and 172 for each DSP are mapped as between data and program space. The mode latch 160 is used to set the mode of operation and sampling rates for the receive and transmit data channels and to enable the features that synchronize the receive and transmit timing generators. The receive digital signal processor 156 and its associated RAM 172 and decode circuit 174 are structured in a manner similar to that described above in connection with the transmit DSP 154.

Each digital signal processor 154 and 156 has two serial I/O ports, a synchronous serial I/O port (SSI) and a serial communication I/O port (SCI). Converted test result data from the A/D converters in the module 68 (FIG. 2) is input to the DSP module 58 by way of the synchronous serial interface port 176 of the receive DSP 156. The SSI port 176 comprises a bit clock signal, a frame sync signal and channelized A/D data from the analog-to-digital converter of the A/D receiver 68. Signals of the SSI bus 176 are buffered by an A/D buffer 178. When the talk monitor mode of the test system 10 is active, the A/D data input is received from codec converters on the A/D receiver 68, and the data out of the receive DSP 156 is routed via the SSI port 176 back to the A/D receiver 68. In this mode of operation, the receive digital signal processor 156 provides an automatic level and path control for voice frequency signals. The serial communication interface 166 is interconnected between the transmit DSP 154 and the receive DSP 156 to provide communications therebetween. A synchronous serial I/O port 180 associated with the transmit DSP 154 is connected to a D/A buffer 182. Serial data from the transmit DSP 154 is output via the SSI port 180 to the D/A transmitter 62, via the buffer 182.

A timing generator 184 produces clock and strobe signals for providing clock and frame sync signals to the D/A transmitter 62. A first clock generator 186 provides a 25.6 MHz squarewave signal to a buffer 188. In like manner, a second clock generator 190 generates an 8.092 MHz squarewave and couples the same to the buffer 188. The buffered signals are provided to both the D/A timing generator 184 and the A/D timing generator 192. The buffer 188 also includes a divider which provides output 12.8 MHz and 4.096 MHz timing signals to the timing generators 184 and 192. The 8 MHz clock generator 190 is programmed as a 9-bit counter and includes several multiplexers. Inputs to the clock generator 190 are the 12.8 MHz and the 4.096 MHz clock signals, as well as other signals from the mode latch 160. Four output signals are generated for use by the A/D receiver 68. The four signals are generated by selecting various outputs of the counter chain in the clock generator 190 according to the logic signals from the mode select latch 160.

The D/A timing generator 184 comprises an application specific integrated circuit programmed as a 9-bit counter and also includes several multiplexers. The inputs to the timing generator 184 are the 12.8 MHz and the 4.096 MHz clock signals, as well as other signals generated by the mode latch 160. Two output signals are generated by the timing generator 184 for use by the D/A transmitter 62. The output signals are generated by selecting various outputs of a counter chain in the timing generator according to data from the mode select latch 160. Because of the programmable nature of the latches 158–162 by the CPU 56, the digital signal processor 58 is highly versatile for providing timing and control signals for use by the D/A transmitter 62, as well as other timing and control signals to the A/D receiver 68. Because the transmit and receive digital signal processors 154 and 156 are high speed devices, complex and accurate signals can be generated as well as analyzed by the test system 10.

D/A Transmitter Module

Figure 6B:
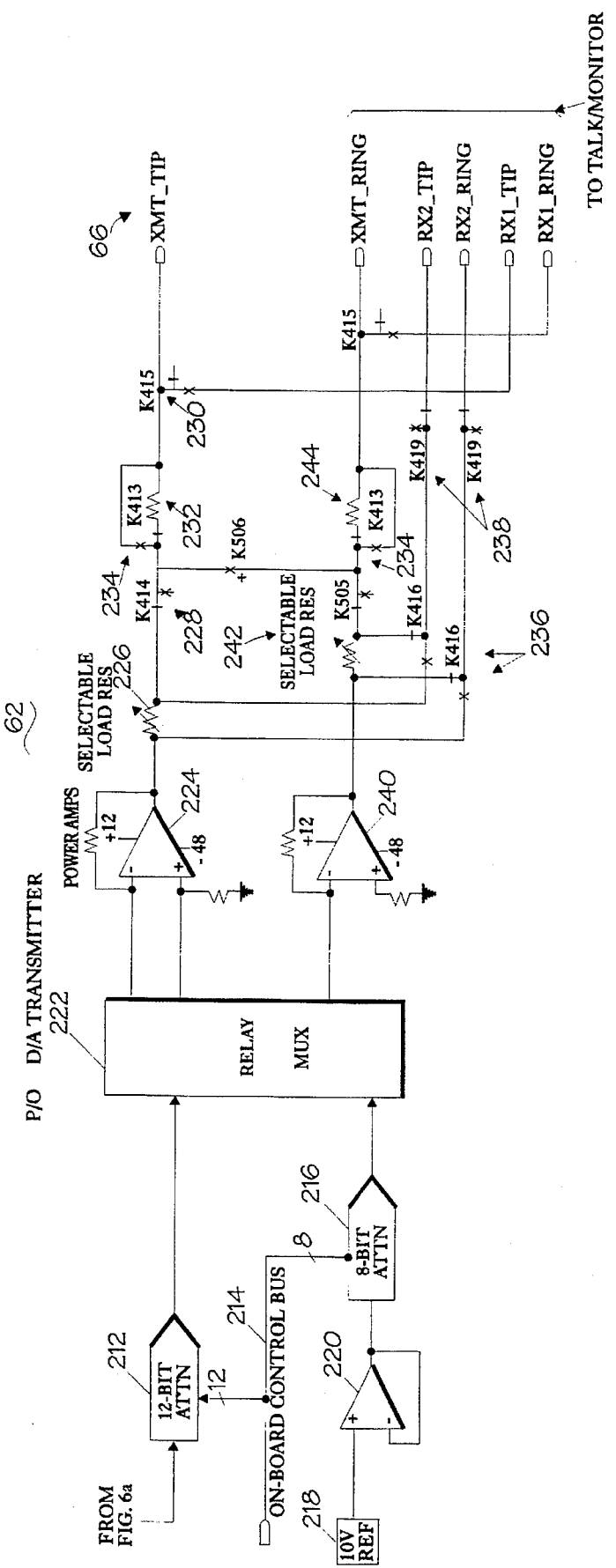

FIGS. 6a and 6b illustrate in detail the circuits of the D/A transmitter 62. With respect to FIG. 6a, it is noted that the function of the D/A transmitter 62 is to generate the waveforms and test voltages for carrying out tests on special service circuits and other telephone and telecommunication equipment. Serial data is input to the D/A transmitter 62 from the DSP module 58, converted to parallel form and applied to a precision 12-bit digital-to-analog converter. The input serial data is applied to a pair of 8-bit shift registers 194 and 195. A pair 2:1 multiplexers 196 and 198 operate in conjunction with the shift registers 194 and 195 to provide a narrow band and wide-band mode of operation. The multiplexers 196 and 198 have A and B inputs, that are selectable for coupling to a single output. In the narrow band mode, the transmit DSP 154 transmits sixteen bits of serial data to the shift registers 194 and 195. The multiplexers 196 and 198 select the "A" signal inputs to be applied to the D/A converter (DAC) 200. The multiplexer 196 selects the output of shift register 194 to be used as the data input to the other shift register 195. While the transmit DSP 154 transmits sixteen bits of data, only the upper twelve bits are utilized by the DAC 200. Once all sixteen bits of the data have been shifted into the circuit, the shift register outputs are latched and updated by the strobe signal.

In the wide-band mode of operation, the transmit DSP 154 transmits only eight bits of serial data to the D/A transmitter 62. The multiplexers 196 and 198 are controlled to select the "B" inputs thereof and apply the data to the DAC 200. In the wide-band mode of operation, the lower four bits of the DAC 200 are grounded, and only the upper eight bits are used. The DAC 200 is a high speed, current output type of converter, identified as type AD565, obtainable from Analog Devices. The converted output current of the DAC 200 is further converted to a voltage by an operational amplifier (not shown) and associated components. The output voltage is in a range from about −2.5 volts to about +2.5 volts. The analog signal output by the DAC and amplifier is selectably filtered by either an 8.2 KHz lowpass filter 202, or a 160 KHz lowpass filter 204. A switch, such as a relay 206 couples the output of the DAC 200 to either the narrow band filter 202 or the wide-band filter 204. The purpose of the filters is to smooth the output of the DAC 200 so that all output signal frequencies above about one-half the sampling frequency are attenuated. Filter 202 is a seventh order elliptic narrow band filter with a pass band of 8.2 KHz and 0.2 dB ripple. The cutoff frequency is 16 KHz with an attenuation at the cutoff frequency of about 90 dB. The wide-band filter 204 constitutes an eighth order Chebychev filter with a pass band of 160 KHz and a pass band ripple of 0.60 dB. The filter cutoff frequency is 256 KHz and the attenuation at the cutoff frequency is 48 dB. The wide-band filter 204 has a nominal gain factor of about two. An amplifier 206 amplifies the output of the selected filter 202 or 204 by a factor of four (12 dB) so that the full scale output of the amplifier 206 is about 10 volts pk-pk. Input range circuits 208 are coupled between the output of the amplifier 206 and an attenuation circuit (FIG. 6b). The multiplexers 196 and 198, as well as the input range circuit 208 are controlled by a buffer and control logic 210. Address data and control signals from the CPU 56 are coupled on the internal bus to the buffer and control logic 210 for controlling the D/A transmitter 62.

With respect to FIG. 6b, the analog signal generated by the DAC 200, as filtered and amplified, is applied to a 12-bit attenuator 212. The attenuator comprises a 12-bit digital-to-analog converter having a digital input controlled by bus 214. In the attenuator 212, the DAC converter is coupled to a differential amplifier which functions as a current-to-voltage converter. More particularly, the output analog signal from the circuit of FIG. 6a is coupled to the reference voltage input of the attenuator 212. The attenuator 212 functions as a programmable AC attenuator for controlling the amplitude of generated AC waveforms.

The attenuation circuit also includes an 8-bit attenuator 216 and associated circuits that function as a DC attenuator. The DC attenuator includes a 10-volt reference 218, the output of which is coupled through a unity gain buffer amplifier 220 to the reference input of a digital-to-analog converter in the 8-bit attenuator 216. Again, a differential amplifier coupled to the output of the DC attenuator functions as a current-to-voltage converter for controlling the DC voltage generated by the D/A transmitter 62. The outputs of the AC and DC attenuators 212 and 216 are connected to a relay multiplexer 222. The relay matrix 222 has internal switched contacts that can individually ground the output of the attenuators 212 or 216, or connect such outputs through resistances to the inputs of a transmit tip amplifier 224. The transmit power amplifier 224 is configured to achieve a DC gain of five and an AC gain of unity. The output current of the transmit amplifier 224 is established by a series output resistor to be a nominal 70 milliamp. In practice, the variable resistance 226 constitutes a number of parallel resistors, each having a switch contact to achieve a desired transmit output impedance. The relays associated with the switch contacts are controlled by the internal data bus extended from the CPU 56. The selected resistance 226 together with the resistance in the transmit ring path combine to create the desired output impedances of 135, 150, 430, 600, 900 or 1200 ohms. A relay contact 228 is utilized to disconnect the transmit tip lead from the remainder of the system. Relay contacts 230 are utilized to apply the transmit output in a loop back manner to the A/D receiver module 68. A high voltage protection resistor 232 is in series with the transmit tip lead and can be short circuited by operation of relay contacts 234. Relay contacts 236 are employed to select the voltage present across either the transmit tip or the transmit ring output resistor for use by the RX2-tip/ring lead. Relay contacts 238 are utilized to isolate the D/A transmit module 62 from the RX2-tip and RX2-ring signal pair.

The relay multiplexer 222 also drives a transmit ring power amplifier 240, which is essentially configured the same as the transmit tip power amplifier 224. Both power amplifiers operate with supply voltages of +12 V and −48 V. However, the transmit ring output amplifier 240 cannot generate a DC bias as can the transmit tip amplifier 224, and the amplifier 240 is configured to be an AC inverting amplifier with unity gain. The output of the transmit ring output amplifier 240 drives a selectable load resistance 242 similar to the load resistance 226. A high voltage protection resistor 244 is also connected in series with the transmit ring lead, and is short circuited by relay contacts 234 that operate simultaneously with respect to the transmit ring series resistance 232. While not shown, the D/A transmitter 62 has a number of relay drivers and decode circuits for configuring the transmitter in a desired manner.

A/D Receiver Module

Figure 7:
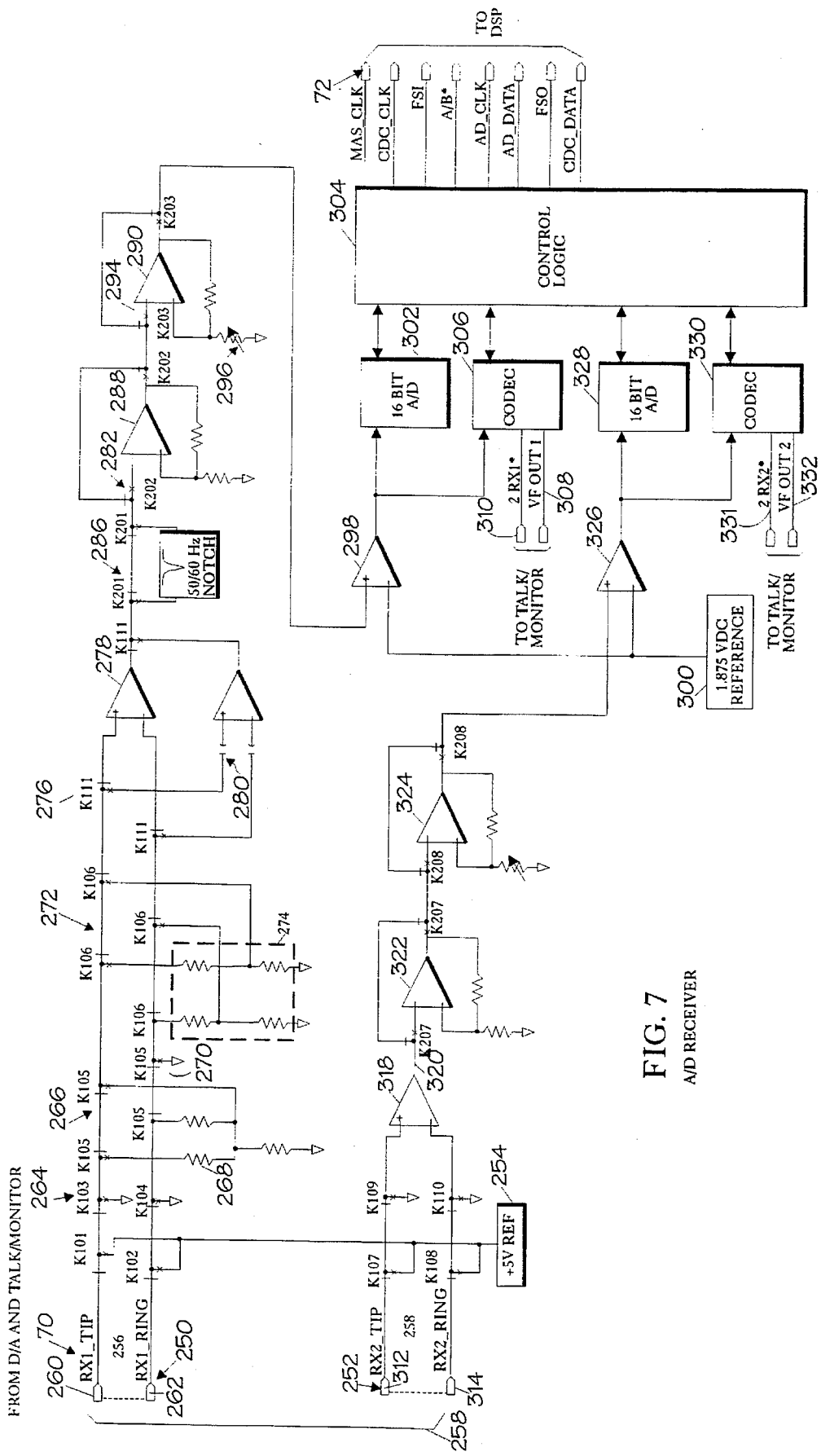
FIG. 7 is an electrical illustration of the A/D receiver which receives analog signals resulting from tests, and digitizes the resulting test signals for processing by the digital signal processor.

FIG. 7 schematically depicts the circuits of the A/D receiver module 68. The A/D receiver 68 includes two signal processing paths, one associated with the RX1 pair 250 and one associated with the RX2 pair 252. The signal processing path associated with the RX1 pair 250 measures voltage resulting from an input stimulus applied to the line under test. The signal process path associated with the RX2 pair 252 measures current With respect to the line under test. The programmed operation of the test system 10 causes two measurements to be made for every test conducted under the line under test. First, the driving signal is measured and characteristics thereof for calibration purposes, and then both sides of the line under test are measured to obtain the step distance and the DC offset voltage. The A/D receiver 68 can thus measure both the driving stimulus of a line under test, as well as the response thereto, both with respect to voltage and current.

A precision reference voltage 254 can be switchably connected to each of the conductors of the RX1 and RX2 pairs 250 and 252 to provide a known and precise voltage applied to both the voltage processing path 256 and the current processing path 258 of the A/D receiver 68. All measurements of the stimulus and response to the line under test are measured with respect to the reference voltage 254. The ability to calibrate the A/D receiver 68 is critical to provide precision measurements under severe environmental conditions. It is required to know within 0.1 dB the exact amplitude of the AC signal that is transmitted to the line under test. The transmission amplitude is measured by coupling the output of the D/A transmitter 62 to the input of the A/C receiver 68, as shown in FIG. 2. By conducting a calibration measurement through the A/D transmitter 62 and receiver 68 prior to an actual test measurement, any inaccuracies in the measuring circuit can be accounted for and considered when conducting the actual test measurement of a line under test. In practice, it is noted that most of the error in the measuring circuits arise from A/D converters, primarily because of DC offset voltage errors as well as errors attendant with the magnitude represented by each bit in the A/D converter. Unless extremely expensive A/D converters are employed, conventional converters also generate inaccuracies based on temperature and time. Hence, in every calibration measurement carried out by the A/D receiver 68, the DC offset and the magnitude represented by each bit of the A/D converters are calculated and used to mathematically correct the actual test measurements on the line under test. The calibration sequence will be described in more detail below following the detailed description of the A/D receiver operation.

With reference back to FIG. 7, the structure and operation of the voltage measuring path 256 of the A/D receiver 68 will be described. The voltage measuring path 256 includes a tip conductor 260 and a ring conductor 262 which are indirectly connected to the corresponding tip and ring of the line under test during test measurements, or to a corresponding transmitter pair 74 from the D/A transmitter 62 during calibration. Relay contacts 264 can be employed to ground the tip and ring for test measurement noise purposes. Further, contacts 266 are connected in the tip and ring measuring path to connect resistors 268 thereto for providing a specified resistance termination to the line to conduct noise-to-ground measurements. Further contacts 270 of the relay open the ring conductor contacts during such noise measurements. An additional set of relay contacts 272 in the tip and ring conductors can be operated to connect attenuation resistors 274 between the tip and ring conductors and ground and thereby provide an attenuation to reduce the signal voltage on the tip and ring conductors. The attenuation resistors 274 are employed when the signal amplitude on the tip and ring conductors is beyond about 10 volts, thereby reducing the amplitude so as to reduce overdrive of amplifiers connected in the voltage processing path 256. Essentially, the resistive network 274 provides an attenuation factor of about 42.2.

The tip and ring conductors 260, 262 are connected by way of relay contacts 276 to either a common mode rejection amplifier 278, or AC coupled via capacitors 280 to another differential amplifier 282. The amplifier 278 has a gain of about zero dB and provides good common mode rejection of signals appearing between the inverting and noninverting inputs thereof. When switched by relay contacts 276, the amplifier 282 provides a gain of about 40 dB to AC signals appearing on the tip and ring conductors. The series capacitors 280 block any DC signal component from being coupled to the inputs of the amplifier 282. The amplifier 282 is switched into the signal path for conducting low signal noise measurements. As noted, relay contacts appearing at the output of amplifiers 278 and 282 are simultaneously switched when contacts 276 are switched, thereby preventing short circuiting of the amplifier outputs.

A notch filter 284 can be switched into the voltage measuring path by way of contacts 286. The notch filter provides a high degree of attenuation to 50–60 hertz frequencies caused by power line interference on the line under test or the test set 10 itself. As noted from FIG. 7, the outputs of amplifiers 278 and 282 result in a single conductor voltage measuring path.

Amplifiers 288 and 290 are a series arrangement of amplifiers that can be switchably connected into the voltage measuring path 256 to provide appropriate gain to the test result signals before being applied to an A/D converter. Amplifier 288 is configured to achieve a gain of about 30 dB, but depending upon the position of switchable contacts 292, the gain can be unity. With respect to amplifier 290, its gain can also be configured for unity by the switchable contacts 294, but can also achieve various gains depending upon the switchable setting of the variable resistor 296. The variable resistor 296 constitutes a number of resistors switchable into the circuit to achieve a desired gain of amplifier 290. The gain of amplifier 290 can be switchably configured for gains of 10 dB, 20 dB and 30 dB, respectively. It can be appreciated that the signal appearing at the output of amplifier 290 is referenced with respect to ground.

The output of amplifier 290 is coupled to the noninverting input of a differential amplifier 298. The inverting input of amplifier 298 is connected to a precision voltage reference 300, providing a voltage of about 1.875 volt DC. This voltage provides a reference to amplifier 298 to shift the DC level of the signal to a range appropriate for input to a 16-bit A/D converter 302.

It is highly important that the A/D converter 302 be of the type having a high degree of precision and many bits to improve the accuracy in measuring the test result signals. In the preferred form of the invention, the A/D converter 302 is model 56ADC16, obtainable from Motorola. The A/D converter 302 is of the Delta-Sigma type having 16 bits of resolution or accuracy. With this type of resolution, a large 100 dB dynamic range (−dBm 2+10 dBm) is achievable. Hence, each bit results in a range of about 6 dB. In accordance with an important feature of the invention, the A/D converters 302 and 328 are selected because they are not expensive, and they are designed for a high degree of linearity—for digital audio purposes. The linearity of such converters is maintained over the operating temperature range of the test set 10. As noted above, the amplifier gain stages 290 and 298 can be configured to provide the appropriate gain, and amplifier 298 centers the test result signal in the dynamic range for input to the A/D converter 302. The output of the A/D converter 302 is a 16-bit digital signal coupled to control logic 304. The multi-bit output of the control logic 304 comprises the 16 bits of the converter 302, as well as other control signals coupled to the digital signal processor on bus 72 for clock set-up, handshake, etc.

A conventional codec 306 is connected between the output of the level shifting amplifier 298 and the control logic 304. The codec 306 is utilized in the talk mode for converting analog voice signals to corresponding digital signals, and vice versa. The digitized Voice signals are coupled via the control logic 304 to the DSP 58. The control logic 304 includes a multiplexer controlled by the DSP for controlling the receipt and transmission of digitized voice signals with respect to both the codecs 306 and 330. Various clock and conversion signals are provided from the control logic 304 to both the precision A/D converter 302 and the codec 306. The various signals include a master clock, a codec clock, a frame sync incoming, an A/B signal to determine if codec 306 or codec 330 is selected, an analog-to-digital converter clock, analog-to-digital converter data, frame sync outgoing, and codec data. The codec 306 digitized voice frequency output 308 is coupled to the talk/monitor module 76, to be discussed below. An analog output of the talk/monitor module 76 is coupled as an analog signal to another input 310 of the codec 306. Such signals can be converted to corresponding digital signals by the converter 306. The voice path though the codecs 306 and 330 will be described below with the hybrids in the talk/monitor module 76. While the A/D converters 302 and 328 are described in connection with carrying out analog tests on the line under test, those skilled in the art may find that for certain tests the codecs 306 and 330 may be utilized in testing the line in lieu of A/D converters 302 and 328. In other words, the codecs 306 and 330 can be used both for test purposes as well as for talk-monitor purposes. Also, the test set 10 can be adapted for directly testing a digital channel, such as a DSO within a T1 carrier unit, by connecting the DSO digital signal directly to the control logic 304 where the codec is shown connected. Alternatively, a 2:1 multiplexer can be utilized for switchably coupling the digital output of the codec 330 or the DSO digital signals to the input of the control logic unit 304. The DSP 58 can receive digital signals from each source for processing thereof, and provide digital signals either for conversion by the codec 330 or as test digital signals for the digital channel unit. In this manner, testing capabilities can be provided to the digital channel via the DSP 58, and talk capabilities with automatic gain control are also available.

With reference to the current measuring path 258 of the A/D receiver 68, it is noted that the tip and ring inputs 252 of the current measuring path 258 are switched across the series load resistors 226 or 242 of the D/A transmitter tip and ring conductors (FIG. 6b) to measure the current therethrough. The precision 5.0 volt reference 254 can be switchably connected to the tip line 312 and to the ring line 314. It should be noted that with respect to both the voltage measuring path 256 and the current measuring path 258, the relay contacts that switchably connect the precision voltage reference 254 are each individually selectable to apply the reference voltage to either the voltage or the current measuring path. Similar to the voltage measuring path 256, relay contacts 316 can be switched to connect the tip 312 and ring 314 lines to ground. A zero dB gain amplifier 318 differentially amplifies the current signal on the current measuring path 258. The amplifier 318 thereby converts the differential signal on the current measuring path 258 to a single-ended signal on output 320. Switchable amplifiers 322 and 324 are substantially identical to amplifiers 288 and 290 in the voltage measuring path, and are switchable to provide the same gain factors. The output of amplifier 324 is a voltage representative of the current being measured in the line under test. The current measuring path 258 can also be used for calibration purposes when the output of the D/A transmitter 62 is coupled to the input of the D/A receiver 68.

A level shifting amplifier 326 receives the signal output from the amplifier 324. The inverting input of level shifter amplifier 326 also is coupled to the precision 1.875 reference voltage 300. The output of the level shifter amplifier 326 is connected to the analog input of a precision 16-bit A/D converter 328 which is the same type and operates substantially identically to A/D converter 302. The codecs 306 and 330 of FIG. 7 are utilized for the conversion of voice frequency signals, one for each direction of transmission. The digital output of the 16-bit converter 328 is coupled to the control logic 304 for providing the digitized current signal to the DSP 58 for further processing. In like manner, a codec 330 is used for processing voice signals and converting the same to digitized signals. The outputs 331 and 332 of the codec 330 is coupled to the talk/monitor 76.

From the foregoing, the A/D receiver 68 is seen to include a voltage measuring path and a current measuring path, each providing precision measurements of the test signal results to provide the digital signal processor 58 with corresponding digital signals to conduct further processing and analysis thereof. In essence, the digital signal processor 58 receives the digitized test results, compares the same with predefined parameters, and determines whether the line under test passes or fails the tests. If the line under test fails or passes the tests, the digital signal processor 58 provides an indication thereof to the supervisory system 46.

The calibration sequence for initially calibrating the A/D receiver 68 prior to each measurement is carried out according to the following scheme. First, the precision five volt reference 254 is connected to the tip and ring side of the voltage measuring path 256 and the current measuring path 258 to determine the step size and DC offset of the respective paths. Essentially, the precision five volt reference 254, and any inaccuracies resulting in the measuring path, are measured by the respective A/D converters 302 and 328 and provided to the digital signal processor 58. The actual measured value of the five volt reference 254 is thus considered by the digital signal processor 58 as the new reference, which takes into account any inaccuracies in the measuring path. In practice, the precision five volt reference 254 is applied to the tip conductors 260 and 312 to measure a resulting positive reference voltage, and then the reference voltage 254 is applied to the ring conductors 262 and 314 to measure a negative reference voltage.

Then, the reference voltage 254 is removed from the measuring paths 256 and 258, and relays 264 and 316 are operated to ground the tip and ring conductors of each path. In this manner, the DC offset voltage in each path is determined, and the DC offset value is digitized and coupled to the digital signal processor 58 for storage therein. It should be noted that the CPU 56 couples commands to the DSP 58 for conducting the initial calibration tests. Since the calibration procedure can be carried out in a very short period of time, such a procedure is carried out before each different test applied to the line under test. After the calibration procedure, the D/A transmitter output 74 is disconnected from the A/D receiver input 70, and the test signals are coupled from the transmitter 62 to the line under test via the test access point module 88. The test results are received from the test access point module 88, coupled to the A/D receiver 68, digitized and coupled to the DSP 58 for processing. The digitized test results are readjusted based on the errors in the step size and DC offset caused by the A/D converters in the measuring paths, and a final determination is made as to whether the adjusted test results pass or fail. A calibration sequence according to the preferred embodiment will be discussed in more detail below.

Talk Monitor Module

FIG. 8 illustrates the detailed circuitry of the talk/monitor module 76. As noted above, the primary function of the talk/monitor module 76 is to allow either monitoring or bidirectional communications between the callback line 32 and the line under test. Analog signals are received from the access module 78 and coupled on a tip and ring pair 82 to a monitor hybrid 336. The signal path 82 shown in FIG. 8 constitutes two wires (tip and ring) coupled through various switch contacts to the differential input of an amplifier 338, which in turn, is coupled to the two-to-four wire monitor hybrid 336. The monitor hybrid 336 is a 600 ohm hybrid circuit that allows bidirectional transmitting and receiving of analog signals on the monitor A line 346 when operating with split 2-wire equipment or facility lines. The bidirectional output of the monitor hybrid 336 only transmits to the monitor A line 346 in a split 4-wire facility arrangement, and transmits to the monitor B output 360 in a split 4-wire equipment configuration. The monitor hybrid 336 includes a transformer and other conventional circuits that provide a unity gain transfer function between the inputs and outputs. The tip and ring of the measurement transmitter pair 82 can be AC coupled via capacitor 340, depending on the switch position of contacts 342. The bidirectional output of the monitor hybrid 336 is coupled by way of capacitor 344 to either the monitor A (MONA) output 346 which is extended to the access module 78, or switched to the monitor B output 360.

Incoming signals on the monitor A pair 346 are coupled via the capacitor 344 through the hybrid 336 and output by way of a receive amplifier 348 and through the talk/monitor module 76 to the RX2 output 331 by way of other switched contacts. With this arrangement, incoming signals on conductor pair 82 can be coupled through the monitor hybrid 336 and output on the monitor A output 346 or monitor B output 360. Other signals coupled inwardly on the monitor A 346 can be coupled through the monitor hybrid 336, via the amplifier 348, to the RX2 output 331. The source with respect to the monitor hybrid 336 can be selected depending on the switch position of relay contact 352 and 354. Further, the monitor A lines 346 are normally connected to the bidirectional portion of the monitor hybrid 336 by way of contacts 356 but, alternatively, a secondary monitor pair, monitor B, can be connected to the monitor hybrid 336 by operating the contacts.

A pair of digital gain stages 358 are also employed in the talk/monitor module 76. These gain stages are used only in the monitor mode, and set to unity by the CPU 56 in the talk mode. One digital gain stage in circuit 358 is associated with the monitor A pair 346, while the other digital gain stage is associated with the monitor B pair 360. The respective monitor inputs 346 and 360 are coupled respectively through coupling capacitors 362 and 364 to respective amplifiers 366 and 368. While not shown, the inputs of the digital gain stages can be connected to ground by relay contacts, when such stages are not utilized. Each digital gain stage 358 is substantially identical, comprising separate operational amplifiers configurable with switched resistors to achieve desired gain factors. Each digital gain stage is independently configurable. A digital logic and bus interface circuit 370 provides an 8-bit digital signal to a latch and resistor network to provide 256 difference gain factors for each stage. The gain factors can be selectable from −45 dB (0) to +0 dB (255). The output of each digital gain stage 358 is summed into a common output and is amplified by +16 dB before being coupled to a 2600 hertz notch filter 372. The notch filter is switchable into the output of the digital gain stage 358 by respective relay contacts 374. While not shown, the notch filter 372 can be placed in an active or inactive state by a digital signal from the control logic and bus interface 370. The notch filter 372 is of conventional design for reducing the 2600 hertz content of the composite signal. The bandwidth of the filter 372 is about 500 hertz, and centered with respect to the 2600 hertz frequency. The output impedance of the notch filter is about 600 ohms, and is switchable byway of the contacts 354 and 352 to a callback hybrid circuit 376.

A measurement receiver pair of conductors 80 extends from the talk/monitor module 76 to the access module 78. The measurement receiver signal pair 80 couples defaults to AC byway of respective coupling capacitors 378 which can be switched into or out of the circuit by contacts 380. A precision termination network 382 is also connectable to the measurement receiver pair 80, via capacitors 384 and contacts 386. The precision termination 382 includes a number of resistors and relay contacts for providing numerous impedances connected to the measurement receiver pair 80. The impedances range from 135–1200 ohm.

Associated with the callback hybrid 376, and particularly the bidirectional callback line 32 is a constant current hold circuit 390. The hold circuit 390 comprises a constant current source for delivering about 20 milliamp of current to maintain the telephone loop connection in an off-hook state. The current hold circuit 390 can be coupled to the callback line 32 by contacts 392 when the central office line voltage is greater than about 6 volts. The current hold circuit 390 is designed to be insensitive to polarity of the line voltage.

The callback hybrid 376 is similar to the monitor hybrid 336, in that it is a two-to-four wire, 600 ohm transformer-type of hybrid with capabilities of separate transmitting and receiving of analog signals on the callback line 32. The hybrid is characterized by a unity gain transfer function in the callback line 32 and the transmitter or receiver. The callback hybrid 376 is connected to the callback line 32 byway of the contacts 392 which also function as a hook switch in the telephone circuits. The transmitted source With respect to the callback hybrid 376 can be selected by operating the relay contacts 352 and 354. The unidirectional output of the callback hybrid 376 is coupled through an amplifier 394 through switched contacts 396 to either the A/D receiver via lines 398 or the access module 78 via lines 80 on the pair denotes RCVM.

The unidirectional input to the callback hybrid 376 is byway of an amplifier 400. Unidirectional signals input into the callback hybrid 376 are first processed by a limiter 402 to limit the signal strength of signals to about −9 dBm. This limiting factor assures that the amplitude of signals is maintained at a specified level, or below, in the case of instability.

It should be noted that in the event the line under test is a two-wire line, then both hybrids 336 and 376 are utilized. On the other hand, if the line under test is a four-wire line, then neither hybrid is utilized.

It should also be noted that the voice frequency signals carried on the callback line 32 are digitized by the A/D receiver 68 and processed by the digital signal processor 58. In the talk mode, an algorithm in the DSP 58 constantly monitors the amplitude of the voice signals in both directions, and maintains the levels to assure that the voice circuit does not become unstable. The DSP 58 adjusts the amplitude of the digitized voice samples to maintain a generally constant level. If the amplitude of the voice signals becomes too high, then the gain can be adjusted such that the total bidirectional gain is less than unity, thereby preventing oscillations. This feature of the invention will be described in more detail below.

A transmit path with respect to the test system 10 in a 4-wire configuration is the receipt of voice signals on the bidirectional call back line 32 and coupling the same to the bidirectional port of the call back hybrid 376, the outputting of the analog voice signals via the amplifier 394 to the RX1, input of the codec 306 (FIG. 7). The codec 306 digitizes the analog signals and clocks the digital signals to the DSP 58 via the control logic 304. The DSP 58 processes the digital voice signals according to an algorithm to dynamically change the gain to maintain stability, and outputs the processed digital signals via the control logic 304 to the digital input of the other codec 330. Codec 330 converts the digital signals to corresponding analog signals and outputs the same via the VF OUT2 output 332 to the transmit amplifier 338 of the monitor hybrid 336. The-bidirectional output of the monitor hybrid 336 is switched to the monitor B output 360 of the talk/monitor module 76. This completes the transmit path through the test system 10 between the call back line 32 and the line under test.

In the noted configuration, the receive path receives analog voice signals over the monitor A input 346 of the talk/monitor module 76. The monitor A input signals are coupled through amplifier 368, the digital gain circuit 358 which is configured for unity gain in the talk mode, and to the RX2* input of codec 330. The digitized output of codec 330 is coupled to the DSP 58 via the control logic 304 and processed with respect to gain. The digital output of the DSP 58 is coupled to the codec 306, converted to corresponding analog voice signals and coupled out the VF OUT1 output 308 to amplifier 400 of the call back hybrid 376. The output of the call back hybrid 376 is transmitted on the call back line 32.

Access Module

FIG. 9 shows the details of the access module 78. As noted above, the primary purpose of the access module 78 is to route the various measurement signals generated by the test system 10 to the external lines to be tested. The test signals, as transmitted to or received from the access module 78, are not processed or conditioned, but rather are simply routed by switched connections. The sleeve conductor or signalling conductors routed through the access module 78 may undergo conditioning to provide signals to the line under test for signalling purposes rather than test purposes. The access module 78 controls an E and F signal bus extending between the access module 78 and the test access point module 88. Moreover, the equipment (E) bus includes four tip and ring signal pairs, designated AE, BE, CE and DE. Similarly, the facility (F) bus includes four tip and ring signal pairs designated AF, BF, CF and DF. In FIG. 9, each illustrated bus in practice includes a tip and ring pair, and thus each switch or component associated with the bus shown in FIG. 9 actually includes two elements. As further noted in FIG. 9, the monitor A and monitor B pairs forming bus 82 is directed to the talk/monitor module 76, while the measurement transmit and measurement receive pairs forming bus 80 are directed from the talk/monitor module 76 to the access module 78.

Generally, the paths shown in FIG. 9 are switched in pairs (tip and ring) unless otherwise noted. While not shown, the access module 78 includes a control logic circuit and a bus interface for connection to the internal bus and for decoding address and data signals from the CPU 56. The control logic and bus interface circuit drives a relay matrix for operating the various contacts noted in FIG. 9 to achieve the desired connections with respect to the E and F buses, as well as to provide signalling from signal source A 84 or signal source B 86 (FIG. 2).

With respect to the E bus, relay contacts K501 are effective to internally disconnect the AE and BE buses and connect thereto the CE and DE buses. The relay contacts designated K502 allow the AE and BE buses to be reversed. Both sets of relay contacts can be activated to switch the CE to the internal BE bus, and switch the DE to the internal AE bus. Similar contacts associated with the F bus can accomplish similar switching between the pairs of the F bus. Relay contacts designated K503 allow the internal CE bus to be replaced with the BE bus. By also operating the relay K501 or K502, the internal CE bus may be replaced by the DE or AE buses respectively. Relay K503 is associated with the F bus performs a similar function. Relay contacts K521 and K522 can be operated to connect the corresponding signal pairs of the E bus to those of the F bus. The XMT signal source can be removed or selected from one of the four possible inputs XMTM, HV, ring 1 and ring 2. The selection is made by the operation or nonoperation of combinations of the relays K550-K553. The internal signal lead XMT can be swapped (tip and ring) by the operation of relay K549. The operation of relay K542 allows the signal conductors XMT2 (an internal version of XMT) to be switched from the E bus side to the F bus side. Relay contacts K504 allow the generator signal XMT2 to be switched from the signal line A to B for the E bus and the F bus. Relay K543 is effective to reverse the tip and ring conductors of the RCVM bus. The RCVM signal bus is utilized to measure signal amplitude or current flow in the main portion of the matrix which consists of signals A through D on the E bus and F bus. Signal amplitude is usually developed across the tip and ring conductors of the selected signal by relays K540, K505, K506 and K508, but may also be any combination of tips or rings of signals XA and XB by using relays K505, K506 and K507. The RCVM bus can also be switched to measure the tip or ring current between the signalling modules 84 and 86 and the AE-DE, or AF-DF signals with relays 528 (tip) and 529 (ring). The normal connection of the RCVM bus is to the AE-DE and AF-DF matrix, but can be switched to measure the SLY signal with the use of relay K544. The SLV conductor is normally not connected to the matrix, but may be connected to XAF with relay K545. The SLV lead may also replace the normal measurement path of RCVM with relay K544. The sleeve conductors may be connected to I source and ground (GND) independently with relays K540 and K546 for the sleeve and return leads respectively. The current of I source is set to either high or low by use of a relay K701. The no test trunk (NTT) lead is normally not connected, but may be connected to XAE with relay K547.

In addition, the NTT lead may also be connected to a 604 ohm resistor by relay K548.

The two paths MONA and MONB of the talk monitor module 76 can be connected to the XA and XB buses byway of relays K523 and K524, respectively. The signal conductors MONA and MONB are normally connected to the E-bus, but may be connected to the F-bus by operating relays K532 and K531.

In a split 2-wire equipment or facility configuration, one conductor of the AE pair and the AF pair are switched to the monitor A pair, while the other conductor of the AE and AF pairs are switched to monitor B pair. In a split 4-wire equipment configuration, the AE pair is switched to the monitor A pair, while the BE pair is switched to the monitor B pair. In a split 4-wire facility configuration the AF pair is switched to the monitor A pair, and the BF pair is switched to the monitor B pair.

From the foregoing, it can be appreciated that the access module 78 is controlled by the CPU 56, via an internal bus, to operate or release numerous relays to achieve a desired signal paths between the talk/monitor module 76 and the access module 78.

Signalling Modules

The signal A module 84 of FIG. 2 is connected to the access module 78, to either the E bus or F bus to provide analog signalling to the lines under test or to terminate or feed the communication line pairs. While not shown, the signal A module 84 includes a control logic and bus interface circuit to receive address and data signals from the internal bus, decode the same and operate desired relays to connect the various signalling circuits to the lines in the access module 78. The various signalling circuits provided in the signal A module 84 include a −48 volt negative current feed circuit, a +24 volt positive current feed circuit, a −20 volt bidirectional current feed circuit, a positive current feed to ground circuit equivalent to a 5–10 Henry inductor with or without a resistor in series for DC impedance, and a resistor in series with a capacitor for AC impedance purposes. DC hold circuits are also provided.

The signal B module 86 of FIG. 2 includes control logic and bus interface circuits similar to that of the signal A module 84 for providing line conditioning to selected lines in the access module 78. Relay circuits in the signal B module 86 are effective to connect the impedances of 132, 150, 600, 900 or 1200 ohms at 1 KHz on the A line pair. A similar circuit is effective to connect the same impedances to the B line pair. A signal circuit is provided in the signal B module 86 for providing a three ringer load on the B line pair. Further, another circuit generates a 2600 hertz tone on the A line pair or the B line pair depending upon the operation of relays. Those skilled in the art may find it advantageous to combine the signal A and signal B circuits, or to utilize additional signalling as may be required for test purposes.

The test access pair 88 is responsive to software commands of the CPU 56 to connect the "A" side of the ABCD pairs of the access module 78, on the equipment and facility sides, to TAP1 or TAP2 of the test access pair module 88. The module 88 can also provide loop back connections between the equipment and facility sides. The same capability is provided for the "B" side pairs.

Test Access Fair Module

Figure 10A:
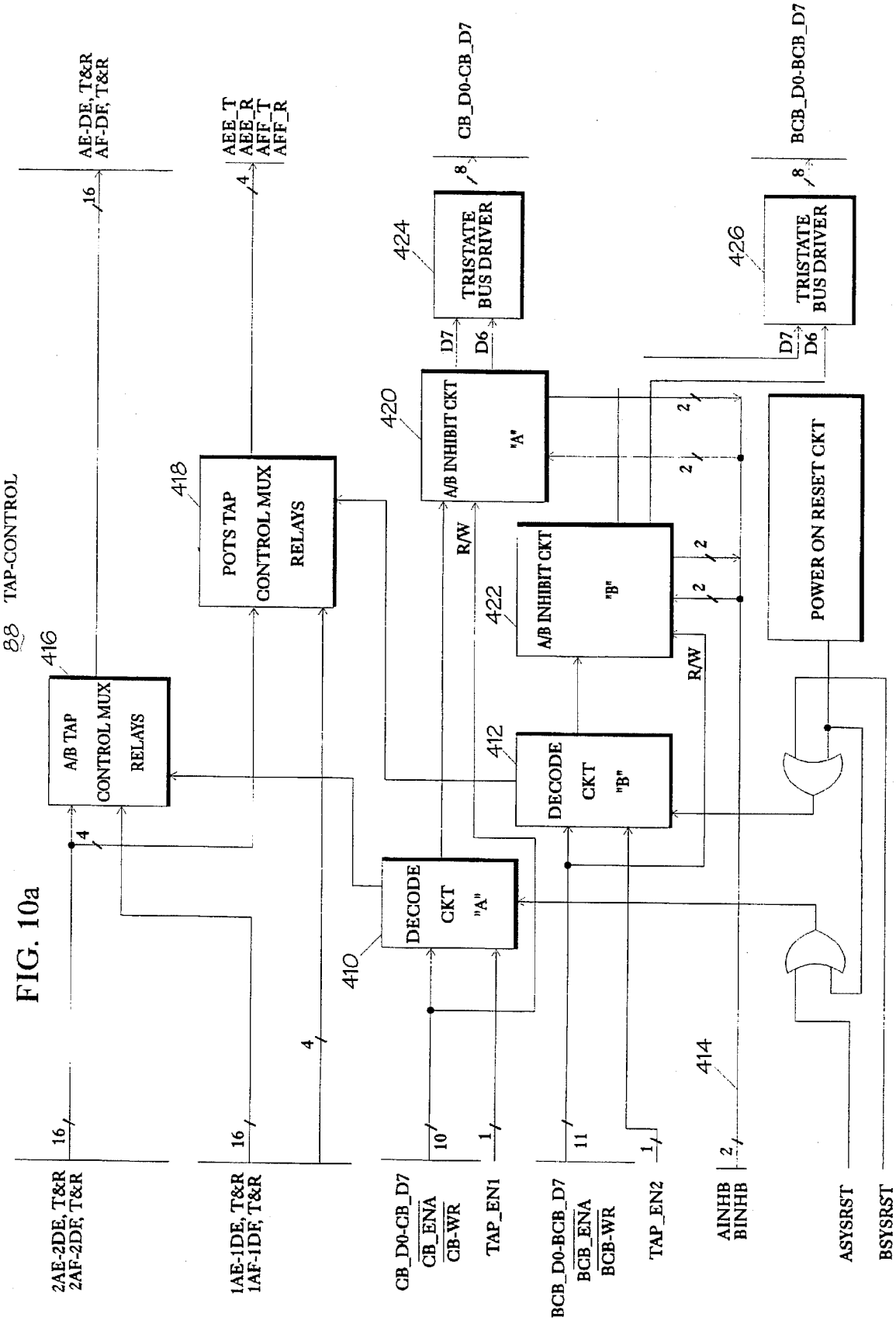
FIGS. 10a and 10b illustrate in simplified form the test access point module that provides a multiplexing function for the output of the test system to select a path for testing a line under test.
Figure 10B:
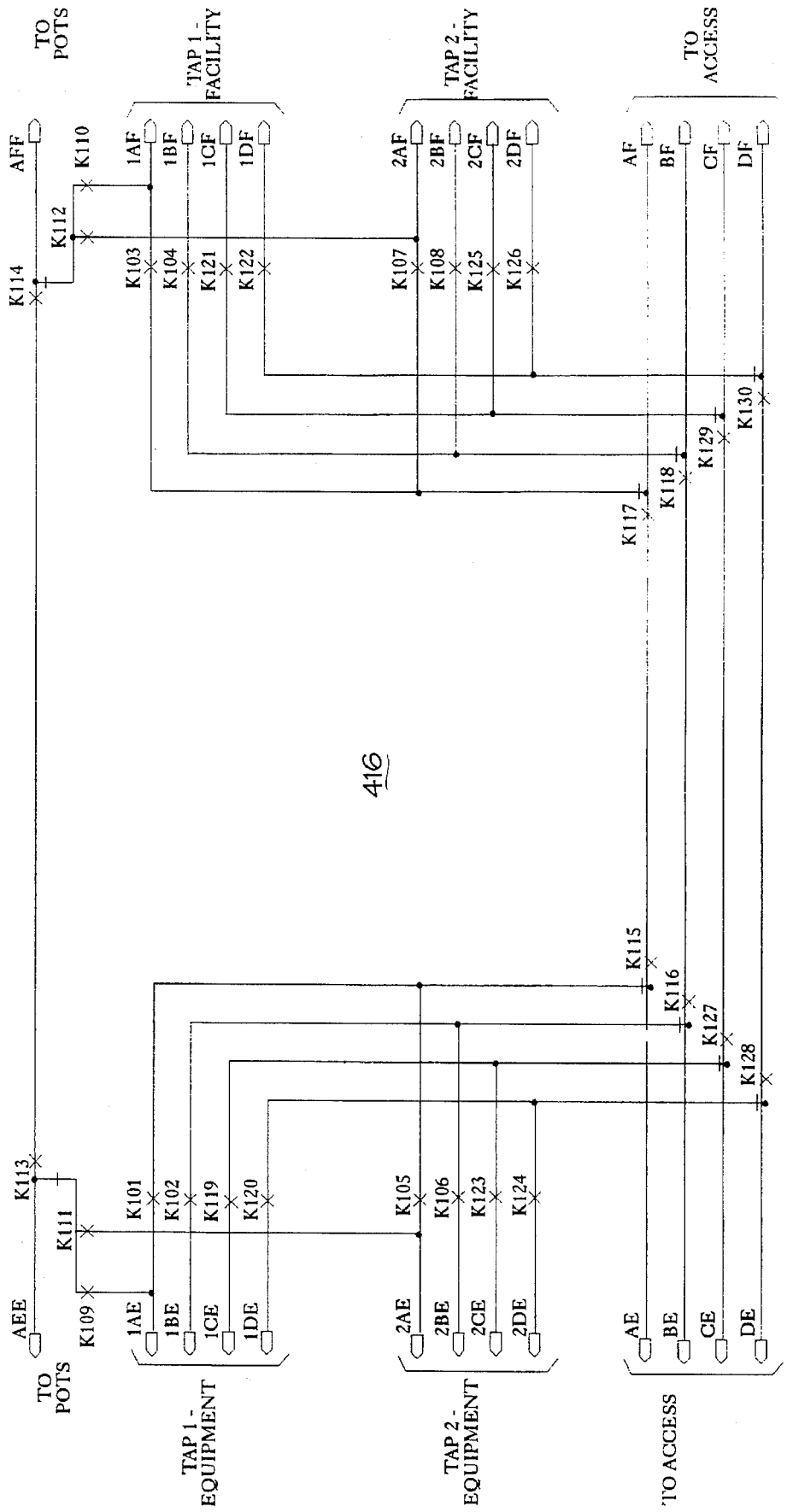

FIG. 10a illustrates the control for controlling the noted interconnections, while FIG. 10b illustrates the connection matrix itself. Again, each signal conductor shown in FIG. 10b is in actuality a tip and ring and thus the contacts illustrated are duplicated to accommodate the other conductor of the pair.

The A decode circuit 410 and the B decode circuit 412 each receive eight parallel data bits, and different enable signals for separately enabling the circuits and decoding the data bits to selectively operate relays to achieve the desired connections between the test set 10 and the TAP1 AND TAP2 lines. In selecting the various relays, data bit 0 and data bit 1 respectively select whether TAP1 or TAP2 is to be connected to the line under test, while the other data bits are decoded to operate various relays. In like manner, data bits 6 and 7 are utilized to ground the A and B inhibit leads 414. The A/B relay multiplexer 416 receives the A-D conductors on the equipment side as well as the A-D conductors on the facility side, provides switching therebetween, and provides the corresponding outputs. An additional relay matrix 418 provides four conductors for switching to a plain old telephone service (POTS) output. The actual relay contact switch arrangement is shown in FIG. 10b. The TAP control circuits further include an A and B inhibit circuits 420 and 422, the function of which is to provide an indication of which TAP circuit (TAP1 or TAP2) is active, as the test system 10 can only conduct tests through one TAP output at a time. Thus, if one TAP circuit is in use, it inhibits the concurrent use of the other TAP circuit for testing another line. The output of the inhibit circuits 420 and 422 are connected to respective bus drivers 424 and 426 to provide output data during a read cycle of the TAP module 88. Further noted in FIG. 10a are various power reset circuits for placing the TAP module 88 into a predetermined state when the system is initially powered up.

With regard to FIG. 10b, there are shown the relay contact arrangements for connecting the equipment and the facility buses from the access module 78 to the equipment and facility sides of both the TAP1 and TAP2 buses that are connected to remote equipment for carrying out tests on the various lines. Also shown are the switched connections to the POTS auxiliary circuits.

Test Set Calibration

With reference now to FIGS. 11a–g, there are shown by way of flow charts the CPU processor operation in providing an automatic calibration to the signal measuring circuits of the invention. The flow charts particularly illustrate the functions carried out by the CPU 56 for calibrating the D/A transmitter module 62 and the A/D receiver module 68. The calibration of the A/D receiver module 68 involves ascertaining the slope and DC offset parameters of the A/D converters 302 and 328, as well as the input resistance of the operation amplifier 278. Tone amplitude calibrations are carried out in the tone generation circuits of the D/A transmitter module 62.

Figure 11A:
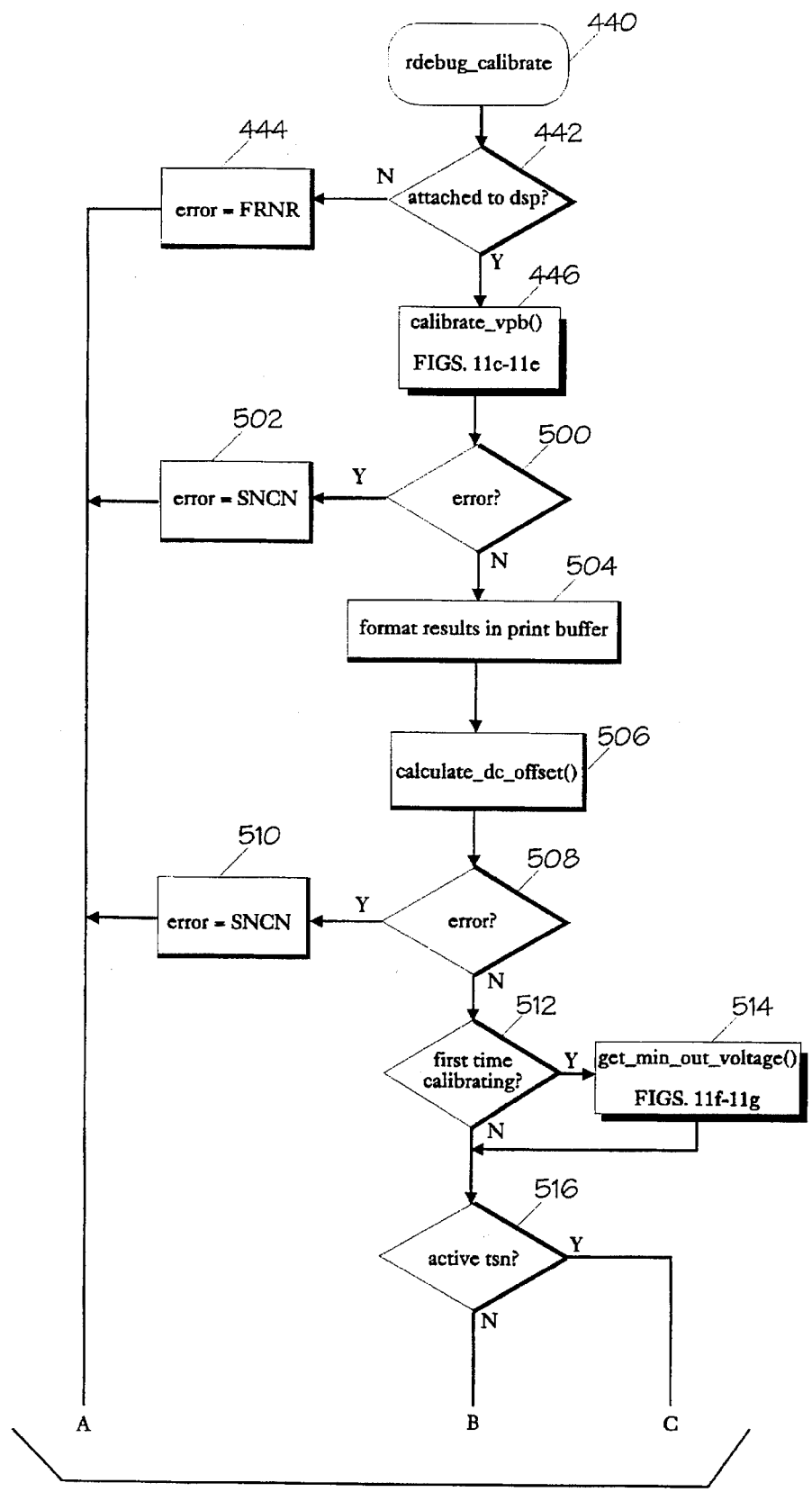
Figure 11B:
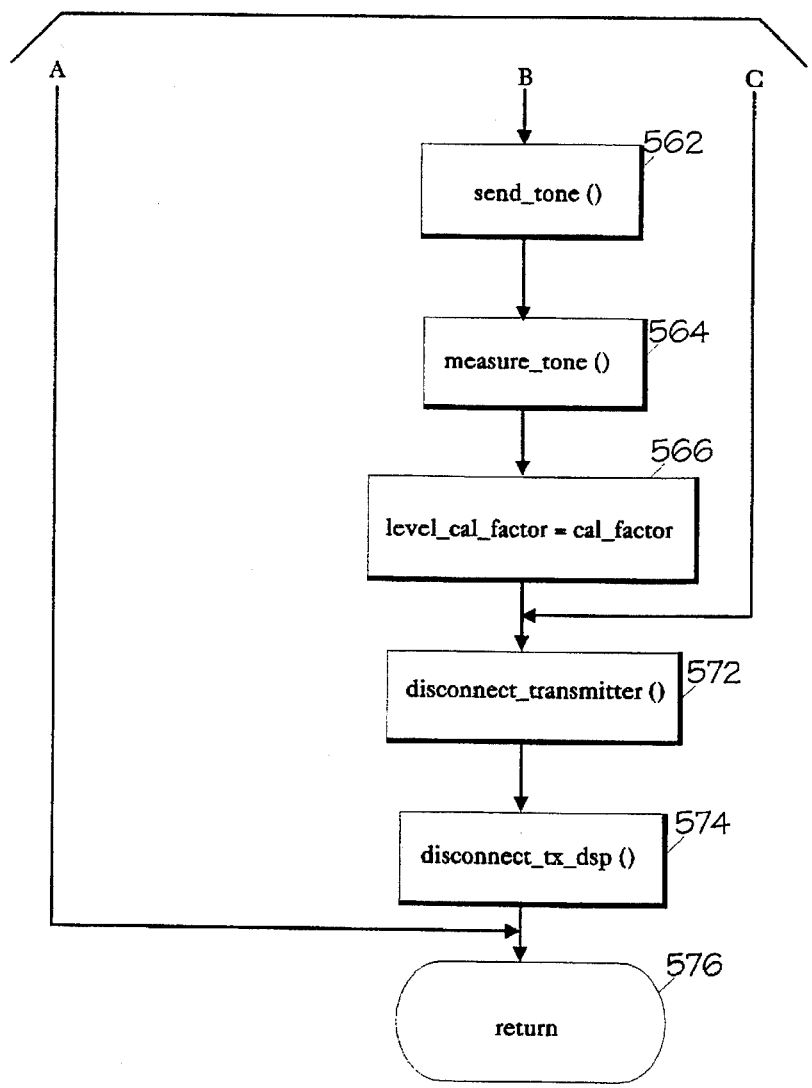

Reference character 440 in FIG. 11a illustrates the entry point of the calibrate software module, as carried out by the microprocessor 122 in the CPU 56. The CPU 56 carries out the calibrate algorithm by controlling the setup of the D/A transmitter 62 and the A/D receiver 68, with the DSP 58 reading the digital output of the A/D receiver 68 to measure the various parameters. The DSP 58 then returns the values of the parameters back to the CPU 56. As noted above, the DSP 58 generates the clock signals for the converters in the D/A transmitter 62 and the A/D receiver 68.

In decision block 442, the CPU 56 conducts communications with the DSP 58 via the internal bus 57 to determine that the DSP is operational and does not have any hardware failures. If such a failure in the DSP 58 is detected, program flow branches to block 444 where an error message code (FRNR) is returned to SARTS terminal 44, if it is the originating terminal that has initiated a test command. It should be noted that the CPU 56 is programmed to carry out the calibration module every time a new test sequence is requested either by the SARTS terminal 44 or if system calibration is requested by craftspersons. The four digit code FRNR and the other four digit codes noted below are codes recognizable by the SARTS terminal 44 of trouble conditions in the test set 10. If the CPU 56 of the test system can communicate with the DSP 58, then program flow branches from block 442 to the routine 446.

Figure 11C:
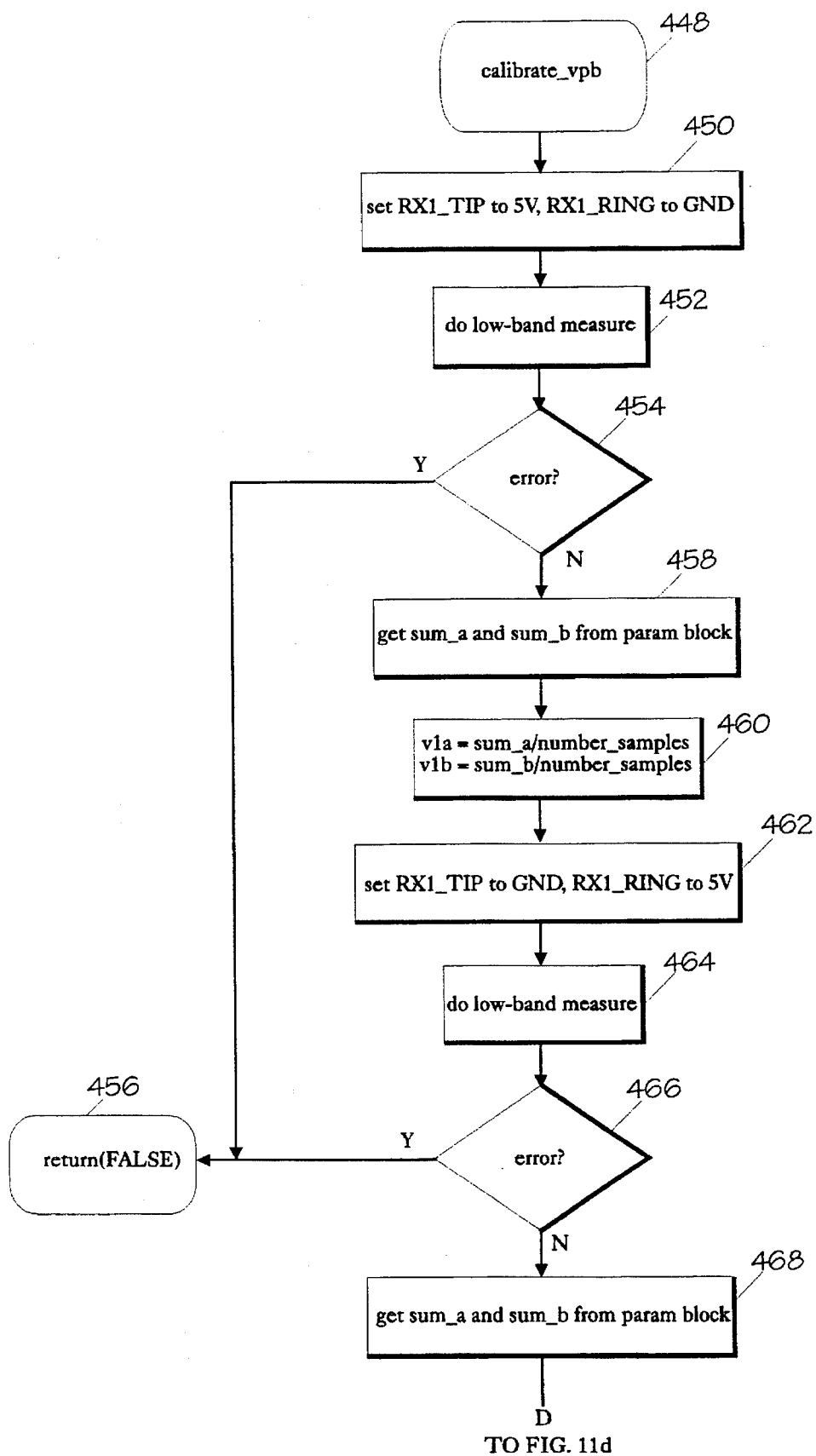
Figure 11D:
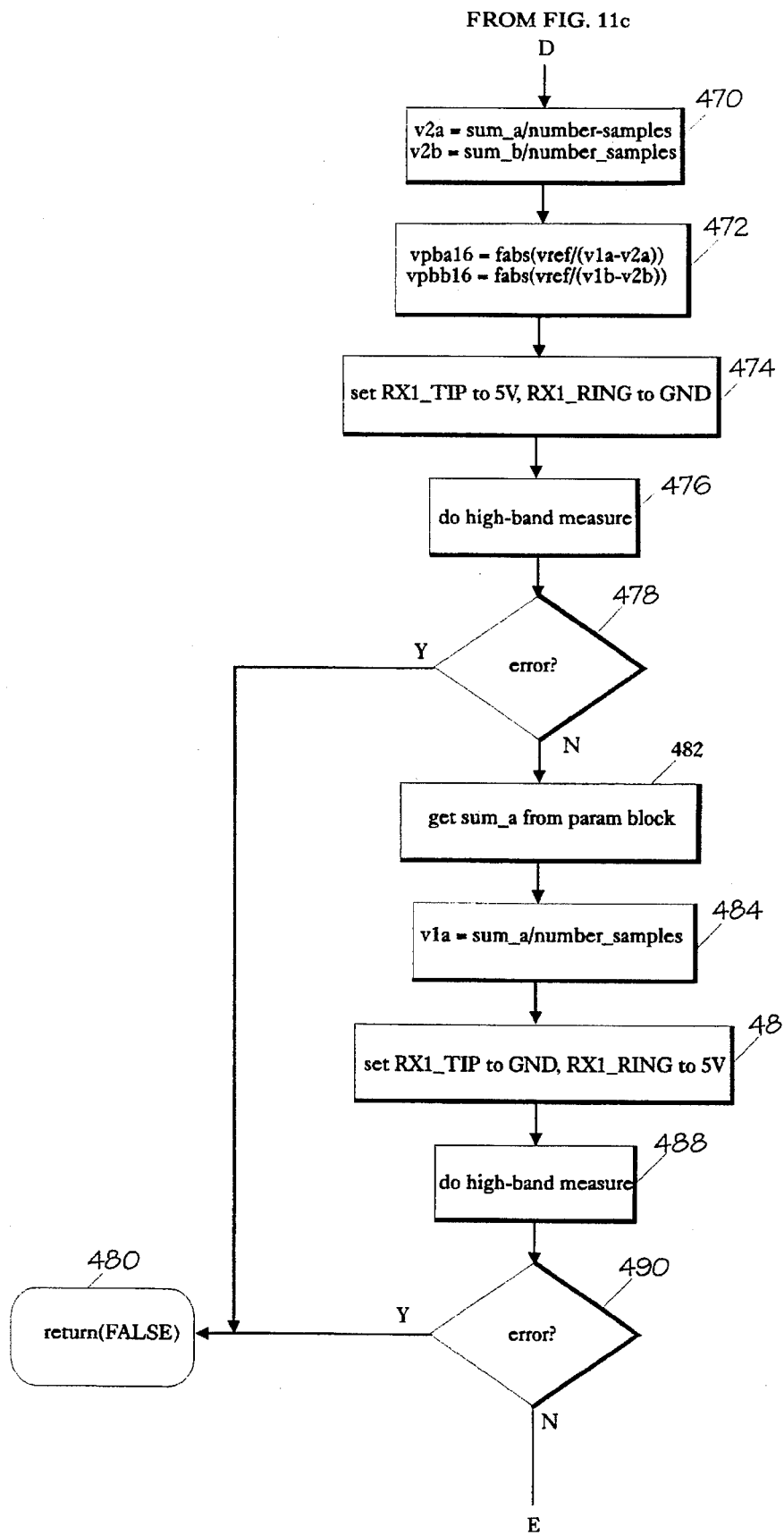

The calibrate routine 446 includes a number of instructions which, when carried out, calibrate the volts per bit (VPB) and thus the slope of the digital-voice grade A/D converters 302 and 328 in the A/D receiver 68 (FIG. 7). FIGS. 11c–e illustrate the slope calibration functions carried out on the A/D converters 302 and 328. The VPB calibrate routine is entered via program flow block 448 of FIG. 11c. The instructions carried out by program block 450 cause the precision five volt reference 254 (FIG. 7) to be connected to the RX1 tip 260 of the voltage measuring path 256 (A path), and a circuit ground to be connected to the RX1 ring 262. The precision five volts 254 and the circuit ground are also connected to the respective tip 312 and ring 314 of the current measuring path (B path) 258. After the initial conditions are established at the input of the A/D receiver 68, program block 452 is carried out, whereby the DSP 58 carries out a low-band measurement from the outputs of the A/D converters 302 and 328. In the low-band measurement mode, the DSP 58 provides a 32 KHz Clock signal for controlling the sampling rate of the converters 302 and 328 via the control logic 304. The 16-bit output of the converters 302 and 328 is obtained (via the control logic 304) by the DSP 58, as noted in FIG. 7.

In program block 454, the CPU 56 determines if any error has occurred in the DSP 58 that would prevent the carrying out oft he low-band measurement. If an error did occur, a "false" indication is noted by the CPU by way of program block 456 and a return to the monitor program is made. On the other hand, if the DSP 58 carried out the measurement according to block 452 without error, the low-band measurement digital number is returned by the DSP 58 to the CPU 56 in block data form, termed a parameter block. In the parameter block, the number of samples taken by the DSP of the outputs of the converters 302 and 328 is noted. The CPU 56 instructs the DSP 58 with respect to the number of samples to be taken.

According to program flow block 458, the CPU 56 obtains the sum-A and sum-B parameters from the parameter block returned to the CPU memory from the DSP 58. In program block 460, the CPU 56 divides the sum-A parameter by the number of samples taken to arrive at an arithmetic average to eliminate the effects of electrical noise and 60 cycle power line interference. The same average is taken of the sum-B parameter with respect to the number of samples taken. The result of the calculations noted in program block 460 comprises V1A and V1B and is one point on each of the slopes that is characteristic of the A/D converters 302 and 328.

In program flow block 462, the precision five volt reference 254 and the circuit ground voltages are reversed with respect to the tip and ring conductors of both the A measuring path (voltage) 256 and the B measuring path (current) 258. In block 464, another low-band measurement is taken by the DSP 58 over a number of samples, at a 32 KHz rate.

If an error occurs (block 466) an indication thereof is noted in the CPU 56 and return is made to the monitor program. According to block 468, the CPU 56 retrieves the sum-A and sum-B parameters from the parameter block transmitted from the DSP 58 to the CPU memory. In program flow block 470, intermediate values V2A and V2B are calculated to determine the second points to determine the slopes of the A/D converters 302 and 328.

The CPU 56 calculates the volts per bit (VPB) for both the A voltage measuring path 256 and the B current measuring path 258. The VPB of the A/D converter 302 comprises a 16-bit number, and constitutes a floating point-absolute calculation made by dividing the five volt reference 254 by the V1A parameter calculated in program flow block 460 subtracted from V2A, the parameter determined in program flow block 470. A similar calculation is made for the current measuring path to determine the 16-bit VPB of the A/D converter 328. Since the linearity of the particular converters 302 and 328 does not change over a wide temperature range or age, the slope thereof can be calculated by determining the two points. The slope of each converter is the imaginary line drawn through the two points calculated and is used in the actual measurement of voltages and currents of a line under test. For a low-band measurement, the CPU 56 stores a 16-bit word for the volts per bit parameter of each of the A/D converters 302 and 328.

In program flow blocks 474–490, a high-band measurement is taken of only the A voltage measuring path 256. In high-band measurements, only 8 bits are retained by the CPU 56 as the other least significant bits are not meaningful. According to block 474, the RX1 tip conductor 260 is connected to the five volt precision reference 254, while the RX1 ring conductor 262 is connected to circuit ground. In block 476, the DSP 58 conducts a high-band measurement, by generating a 500 KHz clock which is Coupled via the control logic 304 to the A/D converter 302. Because high frequency current measurements are not required in the preferred embodiment of the invention, no high-band measurement is conducted on the B current measuring path 258. If an error is incurred pursuant to decision block 478, such error condition is processed by block 480. On the other hand, if no error occurs, program flow continues to block 482 where sum-A is obtained from the parameter block transferred to the CPU memory by the DSP 58. In program flow block 484, the intermediate value V1A is calculated by dividing sum-A by the number of samples taken. In block 486, the five volt reference 254 and circuit ground are reversed with respect to the tip conductor 260 and the ring conductor 262, and another high-band measurement is taken according to block 488. Decision block 490 determines if an error has occurred. Sum-A is obtained from the parameter block and the intermediate value V2A is calculated to determine the average sum over the number of samples. This is shown in block 494. The high-band volts per bit value is determined by program flow block 496, and stored as an 8-bit value. Program flow returns to the calibration routine (FIG. 11a) pursuant to block 498.

After the A/D Converter slope calibration is carried out, the CPU 56 determines if an error has occurred (block 500), and if so, the SNCN error code is returned, according to block 502. If no error has occurred, the results of the slope calibration are transmitted to the print buffer for printout to craftsmen or maintenance person.

In program flow block 506, the DC offset characteristics of the A/D converters 302 and 328 are determined. In doing so, both the tip and ring inputs of the A voltage measuring path 256 and the tip and ring inputs of the B current measuring path 258 are connected to circuit ground. The converters 302 and 328 then convert any residual or DC offset voltage appearing at the respective inputs thereof into corresponding digital signals. The DSP 58 converts these digitized signals into raw DC voltage numbers and forward the same for storage in the memory of the CPU 56. Error conditions are determined according to block 508, and the error code SNCN is returned 510 if such an error occurs. If not, decision block 512 is processed to determine if this branch of the program was traversed previously in calibrating the measuring paths of the test set 10. If the result of decision block 512 is negative, then processing continues with 516. On the other hand, if the test system 10 was not calibrated before, then the CPU 56 proceeds to subroutine 514 to obtain the minimum out voltage and determine the DC offset voltage characteristics of the A/D converters 302 and 328.

Figure 11F:
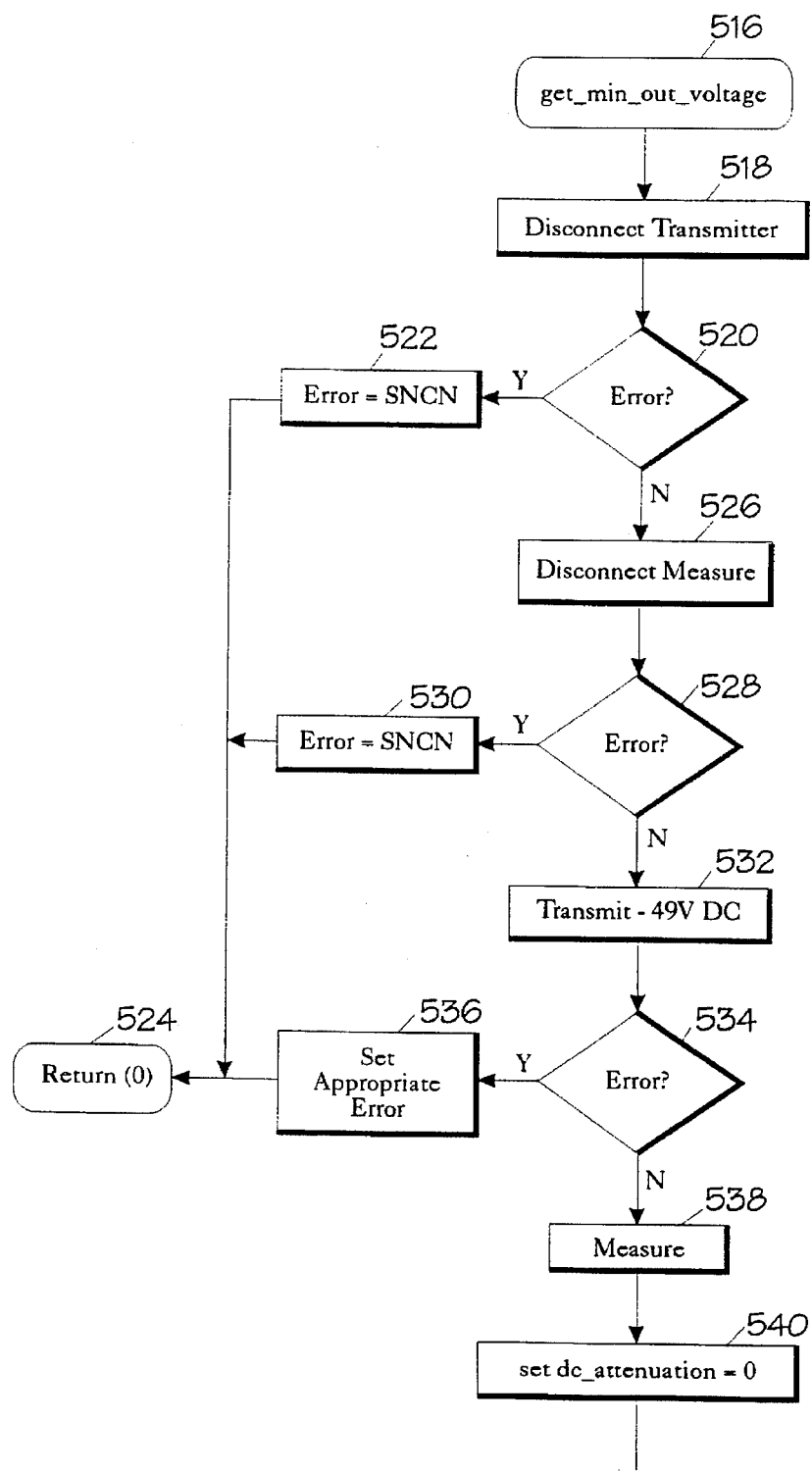

FIGS. 11f and 11g illustrate the subroutine 516 carried out by the CPU 56 to determine the input resistance of amplifier 278 in the voltage measuring path 256 of the A/D receiver module 68. In proceeding to program flow block 518, the CPU disconnects the output bus 66 of the D/A transmitter 62 from the talk monitor module 76. The transmitter 62 is, however, connected from its output to the input of the A/D receiver 68, via bus 74. Decision block 520 determines if an error has occurred in the system, and if so, an error code SNCN is transmitted, as noted by block 522. If no error occurs, processing proceeds to block 526 where the CPU56 disconnects the measuring paths of the A/D receiver 68 from the talk monitor module 76. Again, a determination 528 is made if an error occurs, and if so, an SNCN error code is transmitted 530. If no error has occurred in such disconnection, processing proceeds to block 532 where the D/A transmitter 62 is configured for an attempt to transmit −49 volt DC. According to this configuration, the power amplifiers 224 and 240, which are connected between the rails of +12 volts and −48 volts, are provided with inputs in an attempt to drive the outputs thereof to −49 volts. This is accomplished by the CPU 56 providing via bus 214 (FIG. 6b) digits for driving the attenuation amplifier 216 to such a voltage which, when coupled through the relay multiplexer 222, biases the inverting inputs of power amplifiers 224 and 240 sufficiently positive to drive the outputs thereof to the negative voltage rail. Since the power amplifiers 224 and 240 cannot produce an output of −49 volts, the power amplifiers provide outputs as close to the −48 volt rail as permitted by the internal circuits of the amplifiers. As noted above, the attenuation amplifier 216 is utilized by the CPU 56 for driving the power amplifiers 224 and 240 with DC voltages, while the attenuation amplifier 212 is utilized when it is desired to produce output AC voltages by the D/A transmitter 62.

Decision block 534 is processed by the CPU 56 to determine if an error has occurred, and sets the appropriate error flag 536 and returns via program flow 524. If no error has occurred, then the CPU 56 processes the instructions according to program flow block 538, wherein the DSP 58 is caused to measure the output conductors XMIT-tip and XMT-ring (bus 66) of the D/A transmitter 62. This measurement occurs by coupling the output of the transmitter bus 66 to the input of the A/D receiver 68 and measuring the voltages, as converted into digital signals by the A/D converters 302 and 328. The DSP synchronizes its retrieval of the digital signals from the converters 302 and 328 with the clock samples generated for controlling the A/D converters.

In program flow block 540, the attenuation amplifier 216 is driven by the CPU 56 to drive the power amplifiers 224 and 240 to the opposite voltage rail, which in the preferred embodiment of the invention is +12 volts. The DSP 58 obtains the converted digital signals to corresponding digital bits representative of the measured voltage. At this time the current is also measured through the series resistors 226 and 242 in the tip and ring transmitter paths. This is shown in block 542. Again, the CPU determines if an error has occurred (block 544), and if an affirmative response occurs, an SNCN error code is transmitted (block 546) and the CPU returns to main processing via block 548. If no error occurs, the OPU 56 proceeds to block 550 where the minimum output voltage is set equal to the parameter calculate-DC-volts. Essentially, this computation converts the digital number produced by the A/D converters 302 and 328 into another digital number that is representative of the corresponding voltage measured. Next, the CPU 56 carries out the calculation of block 552 to determine the input resistance of operational amplifier 278 that is in the A voltage measuring path 256 of the. A/D receiver 68. The resistance is calculated by dividing the minimum output voltage by the DC current. As noted above, the voltage was measured in the A path 256, while the current in the voltage measuring path was measured in the B path 258 of the A/D receiver 68.

After determining the input resistance of the amplifier 278, the CPU 56 returns 554 to the processing path noted in FIG. 11a, also noted by block 560. This routine is carried out if the transmitter circuits incur inaccuracies in transmitting tone amplitudes of consistent magnitude as specified by the CPU 56. If the D/A transmitter 62 as long term amplitude accuracy, then this routine can be omitted. Here, the CPU 56 determines if the test session number (TSN) is active, and if so, branches to block 572. The test session number, if active, indicates that the test set is presently connected to a line under test. If the determination of block 560 is negative, processing continues with block 562. In block 562, the transmitter 62 is configured to transmit a tone of a designated amplitude and nominal frequency. This calibration sequence is to determine the error, if any, in the amplitude of transmitted tones, when the amplifier attenuator 212 is programmed to cause the transmission of a specified tone amplitude. In other words, the CPU programs the D/A transmitter 62 to produce a tone of a specified amplitude, and the calibration procedure determines if such amplitude was indeed produced, and if not, determines the error. Once this error is determined, the CPU 56 can use the error information to readjust the input to the attenuator amplifier 212 so that the D/A transmitter 62 produces the actual amplitude specified by the CPU 56. Having set into the attenuation amplifier 212 a specified digital word corresponding to an AC tone amplitude, the CPU 56 causes the DSP 58 to measure (via the A/D receiver 68) the amplitude of the tone produced by the D/A transmitter 62. This is shown in block 564. Again, the measurement of the tone amplitude is made by connecting the output of the D/A transmitter 62 to the input of the voltage measuring path 256 of the A/D receiver 68. The output bus 72 of the A/D receiver 68 is connected to the DSP 58 for carrying out the measuring function. The instructions of block 566 are carried out in order to set the calibration factor for amplitude adjustments of tones to be transmitted to the line under test.

In block 572, the CPU 56 disconnects the D/A transmitter 62 and in block 574 disconnects the transmit digital signal processor. Return to the monitor program is then made by the CPU via block 576, whereupon the calibration software module is completed.

After the CPU 56 carries out the calibration software module, the slope and DC offset characteristics of the A/D converters 302 and 328 are known and the input resistance of the amplifier 278 of the A/D receiver 68 is also known. These parameters are used by the CPU 56 when conducting actual tests on the line under test. The volts per bit (VPB) calibration parameter is utilized when conducting AC measurements, such as level measurements, noise measurements, etc. The VPB calibration factor is utilized in the following manner:

Calculated AC measurement=VPB (raw measurement)

The raw measurement noted in the above equation is the digital number generated by the A/D converters 302 and 328 in measuring the response of the line under test, as further processed by the DSP 58 in producing an RMS value voltage. The VPB factor is then applied in the above equation to obtain the actual calculated AC measurement of the line under test.

The VPB calibration parameter is also utilized when taking DC measurements of the line under test. The VPB calibration parameter is used in such measurements in the following manner:

*Calculated DC value=VPB (raw DC measurement)−DC offset*

In the above equation, it can be seen that the raw DC measurement is adjusted by the VPB calibration factor used as a multiplier, as well as by the DC offset that was also measured and characterized as a calibration factor. It should be noted that the DC offset factor can be either positive or negative.

In making DC resistance measurements of the line under test, it should be noted that the A/D receiver 68 is first connected to the line under test to determine if a voltage appears at the terminals thereof, and the magnitude and polarity of the voltage. When this is determined, the CPU 56 causes the D/A transmitter 62 to generate a voltage of similar magnitude and polarity so that the output thereof is not substantially different from that of the line under test. If these two voltages were substantially different, then the measuring circuits may not be able to accommodate such a wide difference in voltages, thereby leading to error. Thereafter, the D/A transmitter 62 is configured to produce a DC voltage output, as well as a specified series resistance of the selectable load resistors 226 and 242 (FIG. 6b). The resistance of the line under test is in parallel to the series resistance, as is the input resistance in the A/D receiver amplifier 278. Since the voltage input to the line under test is known, as well as the series resistance 226 and 242, as well as the input resistance of the A/D receiver amplifier 278, the CPU can calculate the DC resistance of the line under test. All other measurements carried out by the test set 10 generally utilize one or more of the calibration factors noted above.

Automatic Gain Control

As noted above, the test set 10 has provisions for a bidirectional communication path to be established between the SARTS terminal 44 and a line under test. A bidirectional voice communication path is established by command instructions sent by the operator from the SARTS terminal 44. The command instruction dispatched by the SARTS terminal 44 defines whether the talk path is to be set up with respect to the equipment side or the facility side of the remote digital terminal 16, to which the line under test is connected. The call back line 32 (FIG. 2) is a two-wire line, while the line under test can be either two-wire or four-wire.. If the line under test is a four-wire circuit, then the talk receive path is byway of bus 82 from the access module 78 to the talk/monitor module 76, and the transmit path is by way of bus 80. If the line under test is a two-wire circuit, then one conductor of path 80 is utilized for transmit and one path of conductor 82 is used for receive. The access module 78 thus configures the talk path depending upon whether the line under test is a two-wire or four-wire circuit. Only the A-pair is used if the line under test is two-wire, while both the A and B pairs are utilized if the line under test is a four wire circuit. The configuration of the talk/monitor hybrids in the module 76 is also configured for two-wire or four-wire configurations of the line under test, as described above in connection with the talk/monitor module 76. In the A/D receiver module 68 (FIG. 7) one codec, such as 306, functions to convert analog signals to corresponding digital signals, and vice versa, for transfer of voice signals in one direction, while the other codec, such as 330, functions to convert analog signals to corresponding=digital signals, and vice versa, for transmit in the other direction. Also as noted above, the digital output of each codec 306 and 330 is connected via the control logic 304 to the DSP 58 which exchanges digitized voice signals between the codecs 306 and 330 after processing the digital signals to achieve desired gain characteristics. As is conventional for digitizing voice signals, a sampling rate of 8 KHz is utilized in each codec 306 and 330. In one frame, the DSP 58 receives unprocessed digital samples from one codec, and in the next frame transmits processed digital signals from the other codec to the one codec. The same action occurs with respect to the other codec in frames three and four so that voice signals can be passed, for example, from the SARTS operator to the line under test, and in the opposite direction from the line under test back to the SARTS operator. In exchanging the digital signals between the codecs, the DSP operates at 32 KHz.

A flow chart depicting the operations of the DSP 58 is shown in FIGS. 12a–12j for controlling the gain of the digital samples of the bidirectional communications between the SARTS terminal 44 and the line under test. In setting up a talk path through the test set 10, the CPU 56 receives such instructions from the SARTS terminal 44, and in response thereto transmits data and control signals on the internal bus 57 to the various modules to establish a talk path, depending upon whether equipment or facility is specified, and whether two-wire or four-wire lines are to be tested. All of the set up steps of the test set 10 for providing bidirectional talk capabilities are entirely transparent to the DSP 58, which merely has downloaded thereto the program for carrying out the gain control algorithm and for producing signals to start and stop processing of the codec digital signals. While the following description describes the processing of the digital signals by the DSP 58, it is the receive digital signal processor 156 in the DSP module 58 that is programmed to process the digital signals in accordance with the instructions depicted by the following flow charts.

Figure 13:
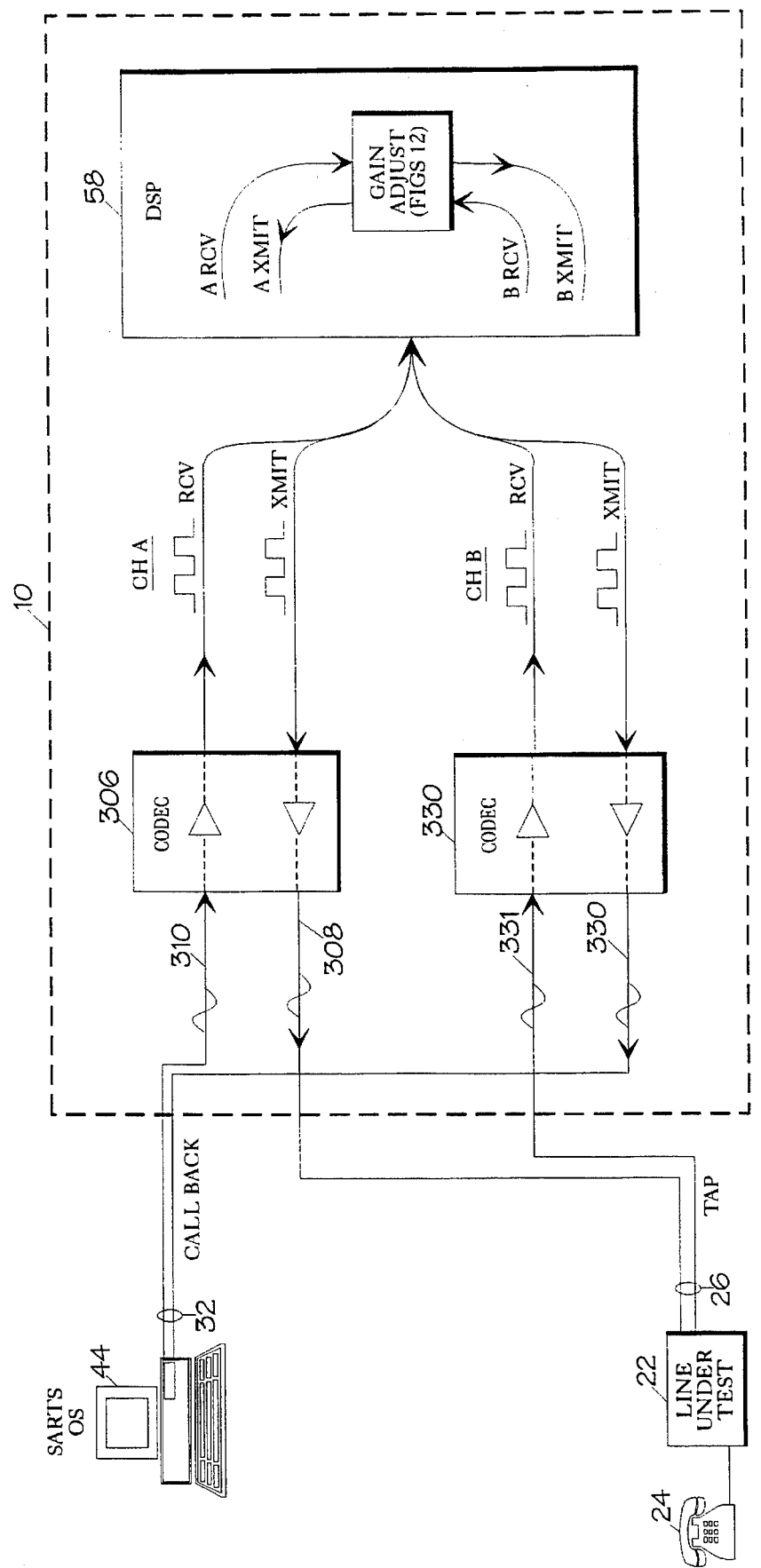
FIG. 13 illustrates in simplified functional form the analog and digital signal flow of the talk path provided by the test set of the invention.

With brief reference to FIG. 13, there is illustrated in simplified form the analog and digital paths of voice information between the SARTS terminal 44 and the line under test. Voice signals from the SARTS terminal 44 are carried to the test set via the call back line 32, the call back hybrid 376 and input to codec 306, converted to µ-law digital signals and transferred to the DSP on channel A. The DSP 58 converts the received signals to linear format, processes the linear signals to adjust the gain, reconverts the processed signals to µ-law format and transmits the signals to codec 330 on channel B. The codec 330 converts the digital signals to analog samples and transmits the analog voice signals via the monitor hybrid 336 and the test access pair 26 to the line under test 22. The converse of this operation is carried out in the opposite direction for analog voice signals transmitted from the line under test 22 through the test set 10, to the SARTS terminal 44. In practice, the digital connection to the DSP 58 is a single line operating in four time intervals or frames. In frame 1, digital signals are received by the DSP from codec 306, and in frame 2 other digital signals previously received from the other codec 330 and processed with respect to gain by the DSP are transmitted to the codec 306. In frames three and four the same receipt and transmission of digital signals are carried out between the DSP and codec 330. This structure and operation is highly flexible and facilitates the dynamic control over gain in the entire talk loop.

Figure 12A:
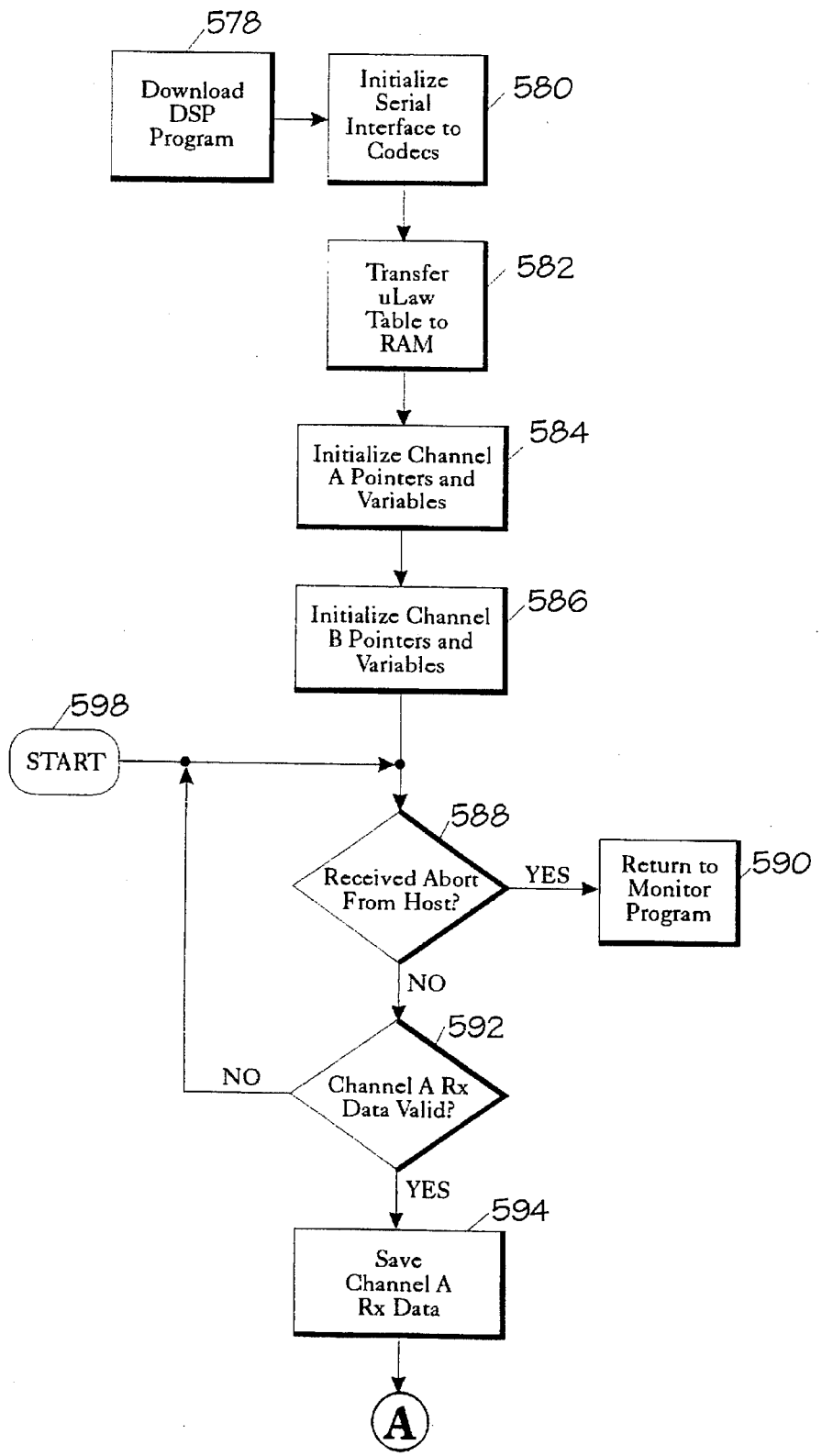
FIGS. 12a–j are flow charts depicting the operations of the digital signal processor in automatically controlling the gain in the voice path through the talk/monitor module when placed in the talk mode.
Figure 12B:
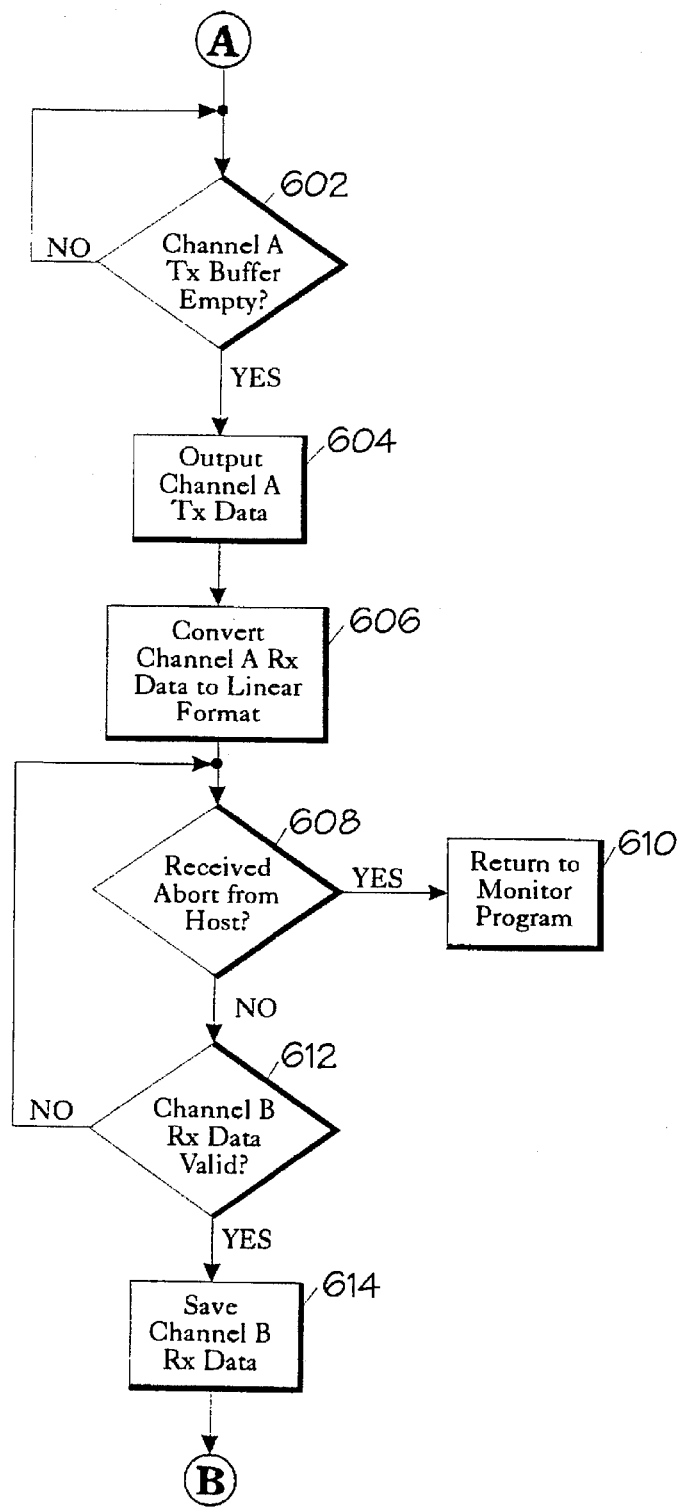

With regard to FIG. 12a, program flow block 578 indicates the steps carried out in which the software program is downloaded from the CPU 56 to the dynamic memory of the DSP 58. Further, the CPU 56 signals the DSP 58 to commence processing of the instructions depicted by the flow chart. In program flow block 580, the DSP initializes its serial interface to both codecs 302 and 330. This involves setting up the appropriate frame sync clocks, the sampling rate, etc. With respect to program block 582, the μ-law table is transferred to the dynamic memory of the DSP 58. The μ-law conversion table defines the DSP encoding scheme to convert the digital signals which are encoded in μ-law form by the codecs, into linear format. When converted into the linear format by the DSP, the digital signals are processed to change the amplitude thereof to achieve a desired gain. In program flow blocks 584 and 586, the pointers and variables of channel A and channel B are initialized. In the test system 10, channel A identifies one directional flow of voice information, and channel B illustrates an opposite direction of voice signal flow. Further, each channel has a transmit path and a receive path, as each codec can receive and transmit analog signals on different lines.

Program flow block 588 is checked by the DSP 58 to determine if the CPU 56 has issued an abort command. If the result of decision block 588 is affirmative, then the DSP 58 returns to the monitor program, as noted in program flow block 590. On a negative result of decision block 588, the DSP 58 proceeds to block 592 where a determination is made as to whether the channel A receive data is valid. In other words, the DSP 58 determines whether the full 8 bits of data are received from the channel A codec and whether the digital word is properly framed. A flag in a register of the DSP determines whether the data of a particular channel is valid. Since the DSP 58 can operate substantially faster than the codecs, if the channel data is not valid, the DSP executes the loop between program flow blocks 588 and 592. For purposes of example, codec 306 is considered channel A and codec 330 is considered is considered channel B. The DSP has a transmit and receive buffer for the data of each channel.

When a valid digital word is received in the register of the DSP 58, the receive data of channel A is saved, as noted by block 594. Proceeding to program flow block 602 (FIG. 12b), the DSP 58 determines whether the transmit buffer of channel A has completed transmission of bits to codec 306 and is empty. If not, a program loop is executed until the transmit buffer of channel A is empty. In program flow block 604, the DSP 58 outputs the channel A transmit data to the codec for transmitting to the output 308. It should be noted that with regard to block 594, unprocessed data (as to gain) is received by the DSP 58, while in block 604, a different digitized voice sample that has been processed with regard to gain characteristics is transmitted to codec 306, converted to analog form, and transmitted via the output 308 to the call back line 32, and therefrom to the SARTS operator.

In block 606, the DSP 58 converts the channel A receive data received according to program block 594, from a μ-law or other applicable nonlinear format to a linear format. Again, the DSP 58 checks to determine if an abort command has been received from the CPU 56, as noted by block 608, and if so, return is made to the monitor program (block 610). If no abort command has been received, the channel B receive data is checked to determine if it is valid, and if not, the loop between blocks 608 and 612 is carried out. When the channel B receive data is valid, processing continues from program block 612 to program block 614. In block 614, after the channel B data is determined to be valid, it is saved. In other words, the analog signals received by the input of codec 330 are converted to serial digital signals, are saved by the DSP when such signals are determined to be complete and valid.

Figure 12C:
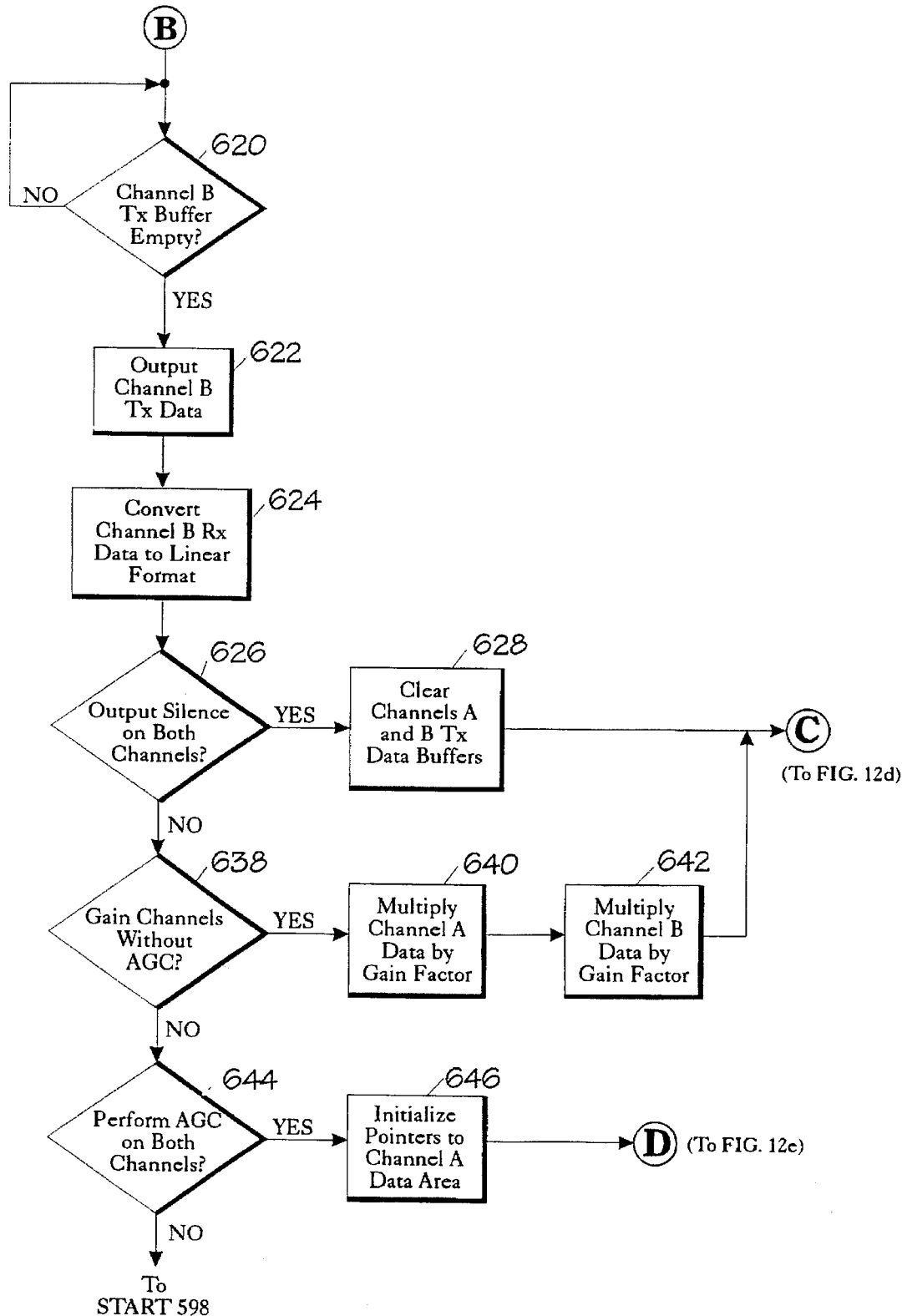

With regard to FIG. 12c, the DSP 58 continues processing to determine if the channel B transmit buffer is empty. This is shown in program block 620. If the channel B transmit buffer is not empty, the loop continues to be executed, until it is empty, whereupon program block 622 is carried out. In this program block, the digitized voice samples that have been processed with respect to gain are transmitted to the codec 330 for conversion into analog samples and transmitted on the output 332. The output 332 is transferred through the monitor hybrid 336 and to the line under test, via the monitor A or monitor B lines, depending upon the type of line under test. As between program flow blocks 612 and 622, the digital samples from codec 330 have been received and stored in the digital signal processor in one frame, and in the next frame digital samples processed with regard to gain have been output to the same codec 330.

The instructions illustrated by program block 624, when carried out by the DSP 58, convert the channel B receive data to a linear format. Proceeding to decision block 626, the DSP determines if the newly received digital signals from both channels constitute silence. Essentially, the DSP 58 analyzes the absolute value of the digital signals of both channels to determine if they are below a minimum threshold which constitute electrical noise or silence. In other words, when the A and B channels are idle and constitute essentially electronic noise, such samples are not processed, but rather are determined to be quiet tone, or silence. If both channels are silent, then according to block 628, the channel A and B transmit data buffers are cleared so that noise and other unintelligible signals are not carried through the system. From block 628, processing continues to FIG. 12d where program block 630 illustrates that the DSP 58 converts the channel A and channel B transmit zero data to μ-law format. It should be noted that program block 630 essentially converts the cleared or zeroed buffers to a μ-law, as a linear digital zero is not digitally equivalent to a μ-law zero.

In program flow block 632, the channel A transmit data is stored in the channel B transmit buffer. This function essentially swaps the analog samples received and digitized by codec 306 for processing and transmission to the codec 330. The converse swap of digital samples from channel B to the channel A transmit buffer is shown in program block 634. Program flow then jumps to the start or entry instruction, as noted in block 598 of FIG. 12a, where the receipt of digital samples, the swapping and saving is carried out with respect to channel A and channel B as described above. The quiet tone converted to μ-law is then transmitted to the respective codecs in program flow blocks 604 and 622.

Figure 12D:
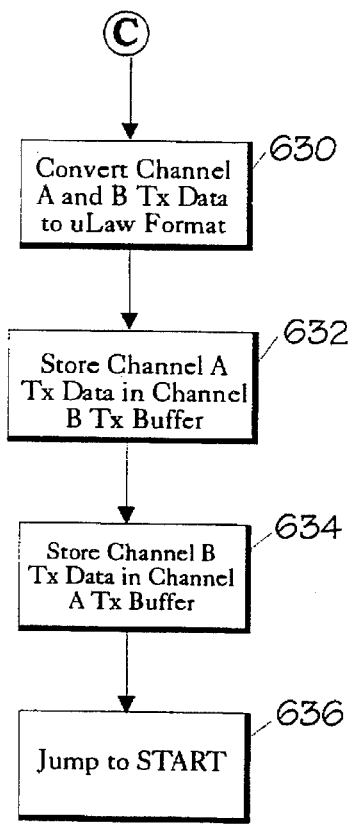

With reference again to decision block 626 (FIG. 12c) if the digital signals in both channels are not representative of silence, then processing proceeds to decision block 638. Here, the DSP 58 determines whether the digital signals are to be processed with respect to a constant gain factor, or by automatic gain control (AGC). In the event the digital signals are to be processed with respect to a constant gain, processing proceeds to block 640 where channel A data is multiplied by a specified gain factor. According to block 642, channel B is also multiplied by a specified gain factor, which factor need not be the same as that applied to the channel A data. As to which processing branch is followed with respect to block 638, the CPU 56 initially establishes flags in the DSP 58 as to whether a constant gain or AGC is to be applied to the digital signals. In doing so, the CPU can determine what audio level is to be output with respect to channel A and channel B, calculate the respective factors, and transfer such factors so that the DSP 58 can carry out processing with respect to blocks 640 and 642. In this mode the gain factor remains constant. After channel A and channel B have been multiplied by the respective gain factors, processing proceeds to FIG. 12d, as described above. In the processing of FIG. 12d, the channel A data and channel B data is swapped between the respective DSP buffers and output in the respective blocks 604 and 622.

In the event that the DSP is flagged in decision block 638 of FIG. 12c to apply AGC processing to the digital samples, then processing proceeds to block 644. If the determination of block 644 is in the negative, then processing proceeds to the start block 598. On the other hand, if AGC is to be performed on the digital signals, the DSP 58 initializes the numerous pointers to the channel A data area, as noted by block 646. The various pointers relate to the performance of the AGC processing on the digital signal. From block 646, processing continues to FIG. 12e.

The AGC processing routine is encountered by the DSP 58 by carrying out the instructions of block 650. Here, the DSP jumps to the AGC subroutine of FIG. 12f. In the example, the AGC subroutine is carried out first for channel A data and then for channel B data. With reference now to FIG. 12f, the entry to the AGC subroutine is noted by block 652. In block 654, a flag is set indicating that the gain has not changed from that of the previous sample of the channel. Such a flag is deliberately set in this program step, even if the gain has in fact changed.

In program block 656, the channel receive data is multiplied by a gain factor previously calculated to achieve a specified transmission level. Initially, when the talk channel was requested by the SARTS terminal 44, a target transmission level was also specified for transmit and receive paths. Such a target level is one of the initialization factors established in program blocks 584 and 586 of FIG. 12a. It is to be noted that the gain factors with respect to both channel A and channel B most likely will be different, but need not be. In carrying out the instructions of block 656, the DSP determines the present level or amplitude of the digital sample and the level desired for transmission. Accordingly, the gain factor can be calculated and multiplied with the digital sample to achieve the specified transmission. Of course, the calculated gain will take into consideration the other gain or losses in the codecs, filters, etc.

In program block 658 of the AGC routine, the digital sample processed with respect to gain, namely, the sample multiplied by a calculated gain factor, is stored in the channel A transmit buffer, if channel A is presently being processed, or the channel B transmit buffer if channel B is being processed in the AGC routine. In program block 660, the stored data in the channel transmit buffer is rectified, meaning, with respect to digital signal processing, the absolute value of the channel data is taken. This step is similar to an electrical diode rectification of bipolar signals. The processing of program flow block 662 by the DSP arithmetically adds the rectified data to an output accumulator. The DSP output accumulator is essentially RAM memory. The channel receive buffer data of the channel presently being processed is obtained according to block 664 and rectified, as noted by block 666. In program flow block 668, the channel receive buffer data is added to a channel input accumulator. The input accumulator is also RAM memory of the DSP. In program flow block 670, the accumulator counter is decremented by one. The overall functions carried out in blocks 658–670 are similar to an analog integration function.

In the processing of the AGC subroutine, the DSP utilizes pointers to keep track of which channel data is being processed. For example, the DSP sets a pointer to channel A data and traverses the AGC subroutine once for the channel A data, whereupon the channel A data is added to the channel A accumulator, and the accumulator is decremented. In the subsequent traversal of the AGC subroutine, the channel B data is pointed to and is processed, whereupon the data is added to the channel B accumulator and the channel B accumulator counter is decremented. With respect to both the channel A data and channel B data, the integration is carried out over a large number of digital samples, after a corresponding number of traversals through the AGC subroutine. In the preferred embodiment of the invention, the integration is carried out over 64 digital samples of each channel, and thus the accumulator counter for each channel is initially set to 64.

With respect to decision block 672, the DSP determines if the accumulator count equals zero. If the answer is negative, then processing proceeds via the return program block 674 to block 650 (FIG. 12e) and then to block 688. If, on the other hand, the count of the accumulator is zero, then the accumulator counter is set to the digital number 64, as noted by block 676 of FIG. 12f. From the foregoing, it can be seen that the AGC subroutine essentially averages 64 samples before calculating a new gain factor to be applied to the particular channel. Thus, for every time slot or frame, digitized voice samples are input and output by the codecs, but the gain of each of the 64 samples is processed with respect to one gain factor, and then the next 64 samples determines whether the gain factor should be changed. This processing prevents abrupt changes in amplitude of the digitized voice signals.

In program block 680, the gain error for the particular channel being processed is calculated. This is carried out by ascertaining the difference between the actual gain and the gain desired in order to achieve the transmission level specified by the SARTS operator. In other words, for all 64 samples an overall average amplitude is calculated. With respect to program block 682, each of the 64 calculated sample amplitudes is integrated by arithmetically summing all 64 amplitudes, and dividing by 64. The average amplitude of the 64 samples is then compared to the target voice level to determine if there is a difference, and if so, whether the presently set gain factor should be increased or decreased to achieve the target level. According to block 684, the gain flag is set to represent a change, it being realized that in block 654, the gain flag was set to specify that the gain had not changed. Return of the program processing to the AGC subroutine block 650 (FIG. 12e) is carried out, as noted by block 686.

Figure 12E:
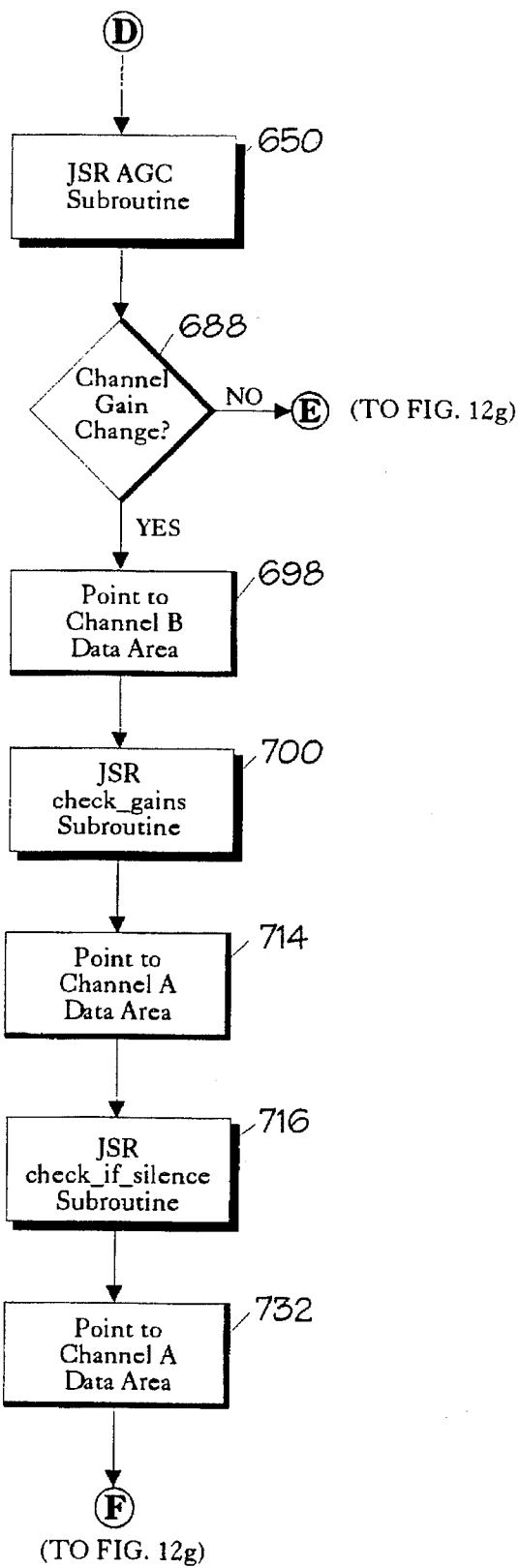
Figure 12F:
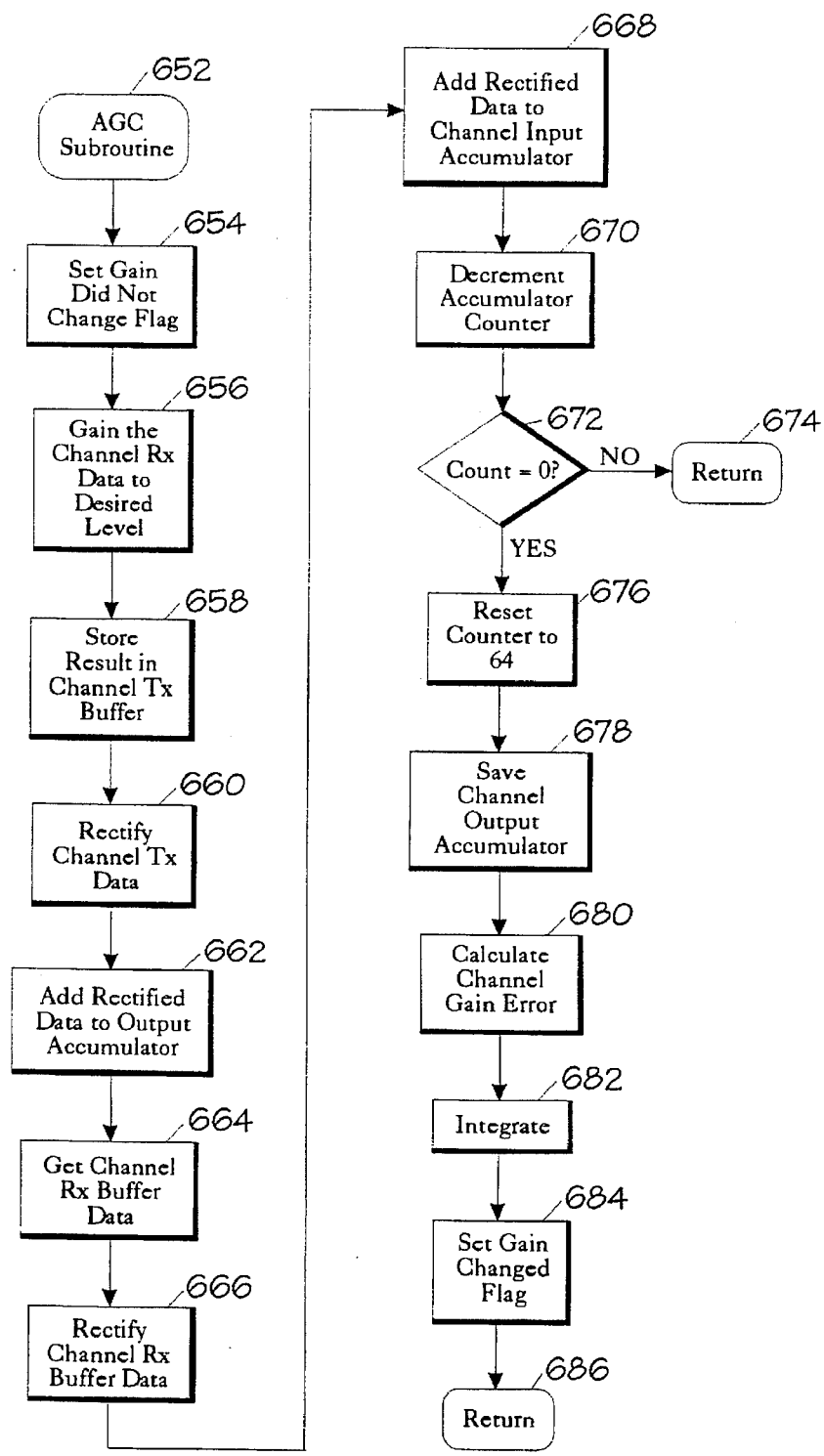
Figure 12G:
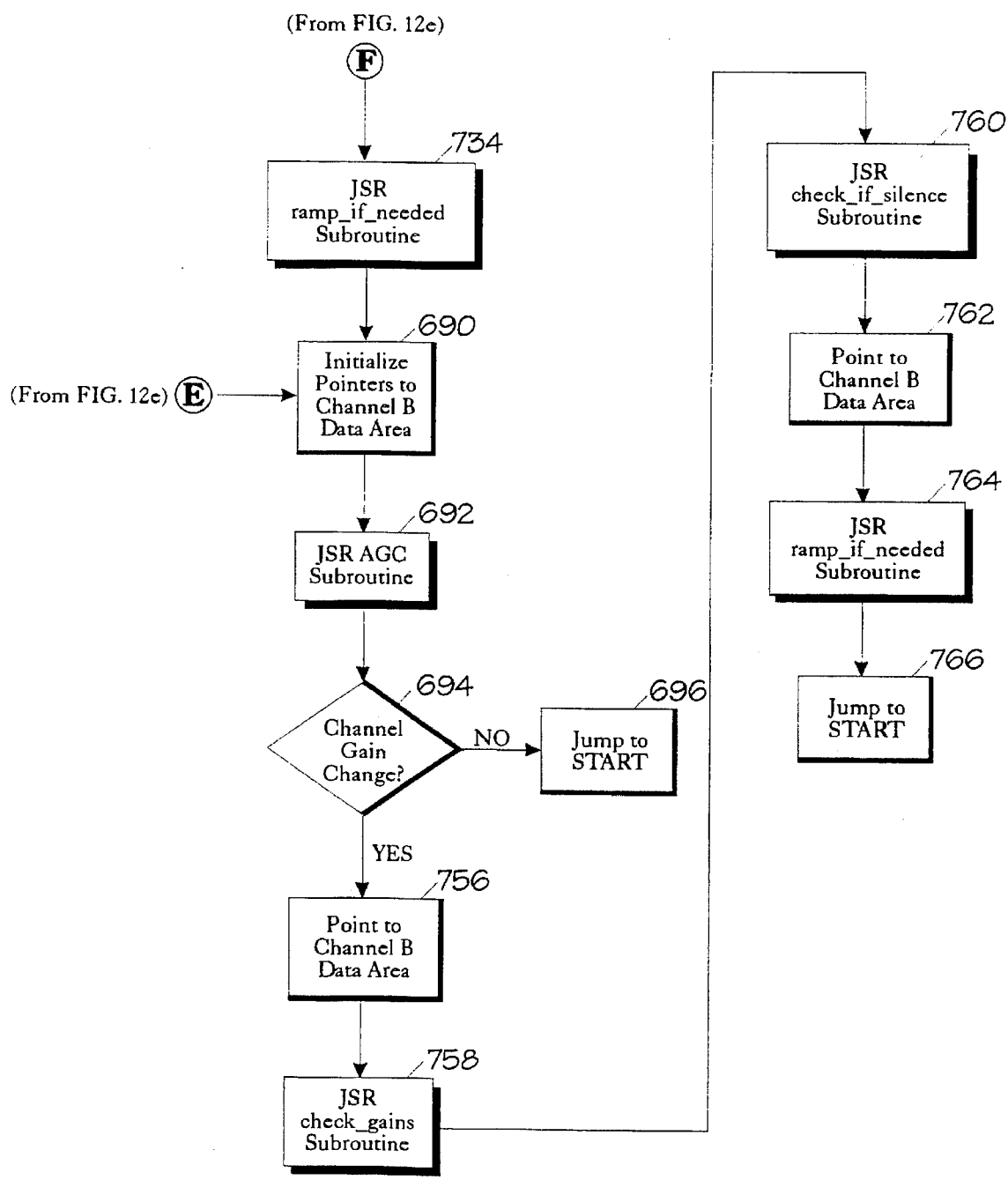
Figure 12H:
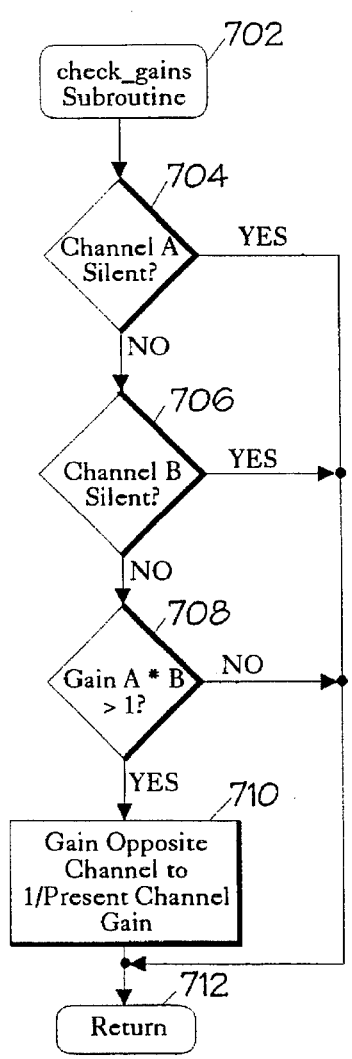

When the AGC subroutine of FIG. 12f has been completed with regard to channel A, processing exits the AGC subroutine block 650 and proceeds to decisional block 688 of FIG. 12e. Here, the DSP 58 determines whether the channel gain has been changed with respect to channel A. Various flags are checked to determine whether gain did not change pursuant to program flow block 654 (FIG. 12f) or block 684 of the AGC subroutine. If the gain has not changed over the 64 integrated samples, then processing proceeds to program block 690 of FIG. 12g. In block 690, the pointers of channel B data area are initialized, similar to that of the channel A pointers in block 646 (FIG. 12e). The pointer initializations with regard to blocks 646 and 690 provide the DSP with flag information to determine which channel it is operating on when in the AGC subroutine. Processing continues to program flow block 692 where a jump is accomplished to the AGC subroutine of FIG. 12f. The entire AGC subroutine of FIG. 12f is again processed but with regard to the samples of channel B. On return from the AGC subroutine, program block 694 is checked to determine if the 64 integrated samples of channel B have changed with respect to gain. If the channel B gain did not change, then program flow branches from block 694 to block 696 where a jump is effected to the program start 598 where channel A receive data is again processed. Proceeding from decision block 694 to the start of the program in accordance with this branching, it must have been found that both channel A and B gains have not changed over the 64 samples from that of the previous frame of the respective channel samples.

With reference back to decision block 688 (FIG. 12e), if the channel A gain was found to have changed because of the processing of the AGC subroutine, the DSP 58 is directed to the channel B data area, as noted by program block 698. The DSP is then operating in the program with respect to the channel B data. Proceeding to program block 700, a jump is made to the check-gains subroutine of FIG. 12h. Program block 702 indicates the entry into such subroutine. Decision block 704 is first encountered by the DSP 58 where it is determined whether the channel A data is silent or quiet. The instructions of this decision block are carried out by again looking at the 64 integrated samples of the channel A data which was saved in the AGC subroutine, to determine if the integrated 64 digital words fall below a specified threshold so as to be considered silent. If the determination is in the affirmative, branching proceeds to block 712, where return is made to the block 700 (FIG. 12e). If the channel A gain is not silent pursuant to block 704, then decision block 706 is encountered, where it is determined whether the channel B is silent. Again, the DSP looks at the integrated 64 digital words to determine if the integrated result thereof saved in the AGC subroutine falls below the threshold, and if so, processing returns to block 700 via the return instruction 712. If both channel A data and channel B data are not considered to be silent, processing proceeds to block 708 where it is determined if the product of the previously established A channel and B channel gains are greater than unity. In the event the previously established gains are not greater than unity, then the loop gain of the talk path will be stable, and the DSP 58 again proceeds to block 700, via the return instruction of block 712. On the other hand, if the product of the established A and B gains is greater than unity, processing proceeds to block 710 where the DSP 58 sets the gain of the other channel to the reciprocal of the gain of the present channel being processed. According to program flow block 698 (FIG. 12e), channel B data is presently pointed to, and thus in block 710, the channel A gain is set to the reciprocal of the gain of channel A. In other words, if the channel A gain is presently set to a factor of 2.0, then the gain of channel A will be set to 0.5 so that the product thereof will be unity. As noted from the description above, the gain of each channel was initially set so that when applied to the digital signals of the respective channels, the amplitudes thereof match the target level desired by the SARTS operator. Program flow exits block 710 and returns via instruction 712 to block 714 of FIG. 12e.

In program flow block 714 the pointer is set to the channel A data area so that the DSP 58 now operates on channel A data. According to program flow block 716, the DSP jumps to the check-if-silent subroutine illustrated by the flow chart of FIG. 12i. The silence checking subroutine is entered via program flow block 718. The decision block 720 determines if the channel A data is below a specified minimum level, such as a threshold level. As noted above, if the channel data is below such a level, it is considered quiet, and branching proceeds to block 722. In block 722, the DSP 58 determines if such channel has already been detected as being silent in the immediate preceding frame, and if so, then a return to block 716 (FIG. 12e) is made via the return instruction 728. If the preceding frame of the channel being processed has not been detected as being silent, then the channel ramp line is set to equal the present gain, as noted by program block 724. By this it is meant that if silence is detected during a change in the gain, the ramping of the gain does not need to be continued. Rather, the gain is simply set to an initial or start-up value. Processing proceeds to block 726 where the channel silent flag is set for the channel A data, and return is made to the JSR block 716.

Figure 12I:
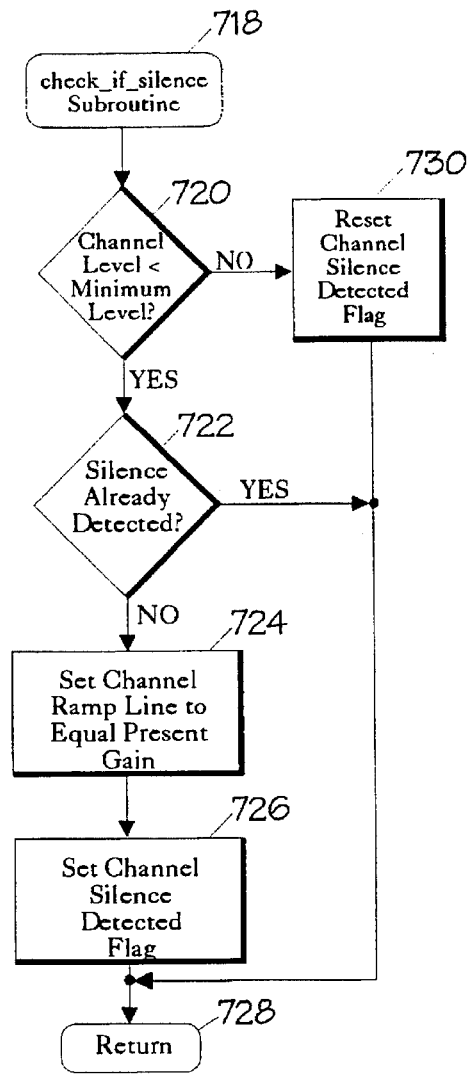
Figure 12J:
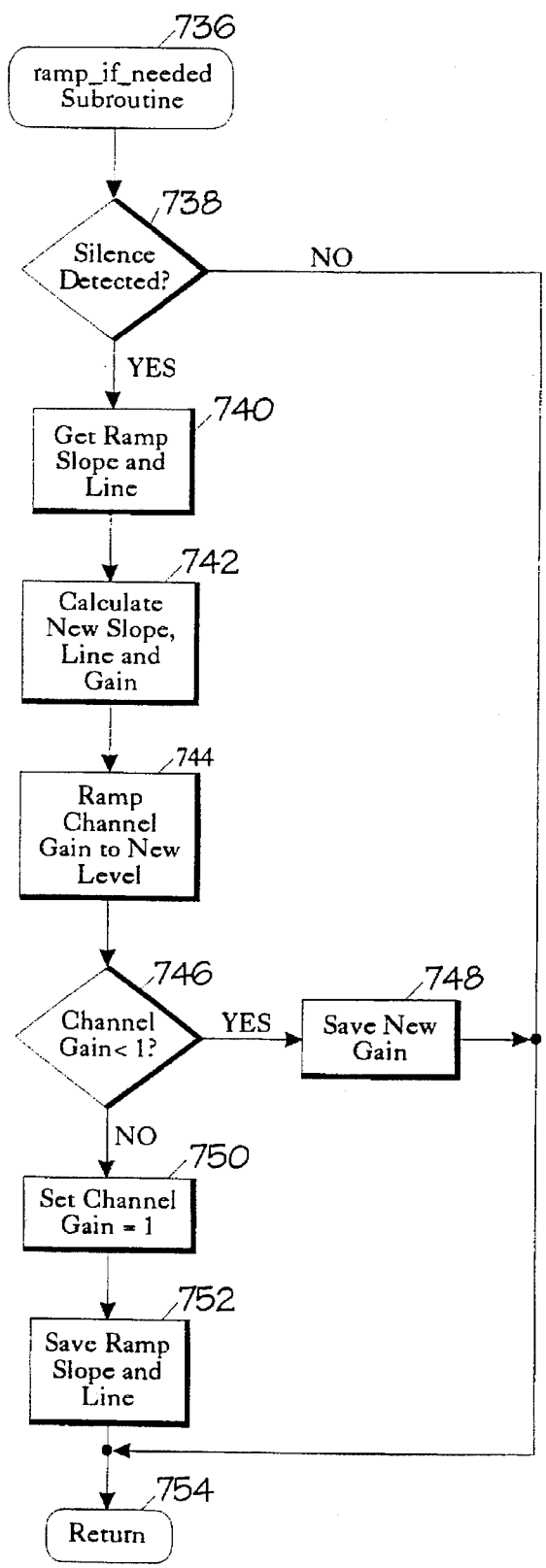

With reference again to program block 720 of FIG. 12i, if the determination of block 720 is negative, the DSP 58 resets the channel silence detected flag, and returns to block 732 via the subroutine of block 716. From the check-if-silent subroutine of FIG. 12i, processing proceeds to block 732 of FIG. 12e where the DSP 58 is directed to the processing of channel A data. From program block 732, the DSP proceeds to instructions which are illustrated by the flow chart of FIG. 12g, and particularly block 734 thereof. Here, the DSP 58 jumps to the subroutine identified as ramp-if-needed, shown in FIG. 12j. The subroutine of FIG. 12j functions to provide a ramp up or ramp down of the channel gain so that instantaneous or abrupt changes in the gain do not produce impulses or audible clicks on the channel.

In program flow block 738, the flag is checked with regard to channel A to determine if silence was detected. As was pointed out in program flow block 732 (FIG. 12e) the channel A data area is pointed to at this time. If silence is not detected, processing branches from decision block 738 and returns to block 734 (FIG. 12g) via the return instruction 754. On the other hand, if silence is detected, instructions of program block 740 are carried out to obtain the ramp slope and line parameters set according to program block 724 (FIG. 12i). While the slope of the ramp is generally constant, the start and end points thereof will be different depending upon the extent of the change to be made in the gain. Program block 742 causes the DSP 58 to calculate the new slope, line and gain. By experimentation, it was found that a constant slope of about 0.95 provides a satisfactory rate of change in either negative or positive slopes. With these parameters, the processor can calculate the incremental change in gain for each iteration in order to achieve the desired end point gain. In program flow block 744, the gain of channel A is actually changed an incremental amount, in an increasing or decreasing manner, depending upon the direction in which the gain is to be changed. It may take numerous traversals of this process flow in order to gradually change the gain so that abrupt amplitude changes in the voice signals are eliminated.

In carrying out the instructions of decisional block 746, the DSP 58 determines if the channel A gain as a result of the previous processing is less than unity. If it is, then the gain value is saved in block 748, and processing returns to block 734 of FIG. 12g. On the other hand, if the gain of channel A is greater than unity, the instructions of program block 750 are carried out to cause the gain of channel A to be decreased and set equal to unity. In block 752, the DSP 85 saves the parameters concerning the ramp slope and line presently calculated for channel A. Program flow then returns to block 734 of FIG. 12g.

From block 734, processing continues to program flow block 690 where the channel B pointes are initialized so that the DSP 58 carries out processing with regard to channel B data. Again, AGC subroutine of FIG. 12f is carried out, and return is made to decision block 694. In the event the channel B gain has changed, the pointer is set to indicate the channel B data area, as noted by program block 756. In block 758, the DSP 58 jumps to the check-gains subroutine of FIG. 12h that is determined if either channel A or channel B is silent, or both. On return from the check-gain subroutine, the DSP 58 jumps to the check-if-silent subroutine (FIG. 12i), as noted by program block 760. In block 718 of FIG. 12i processing proceeds as noted above in connection with channel A data. Return is made to FIG. 12g where in block 762 the channel B data area is pointed to, and operated on by the DSP 58. In block 764, the DSP 58 jumps to the ramp-if-needed subroutine of FIG. 12j. In traversing this program subroutine, the DSP operates on the channel B data to ramp up or down the gain as needed. After the incremental gain of channel B is carried out, program flow returns to FIG. 12g, block 766, where the DSP 58 jumps to the program start 598 of FIG. 12a.

Returning again to the negative determination of block 644 (FIG. 12c), if AGC processing is not to be performed on both channels, processing continues to program block 630 (FIG. 12d) where the channel A and B transmit data are converted to µ-law format, the digital signals are swapped between the channels, and processing continues to the start where entire sequence is commenced again by receiving new digital signals from the codecs and transmitting to the codecs the transmit data that was converted into the µ-law format by the DSP 58.

From the foregoing operations carried out by the digital signal processor 58, the gain characteristics are independently programmable with respect to each channel, and the gains are changed dynamically to achieve an overall level with respect to one channel and the other channel, but both not to exceed unity. The flexibility of controlling gain of a bidirectional path could not easily be accomplished by the traditional analog AGC circuits, as the gain in both directions would be extremely difficult to control and to coordinate, as well as to change.

Conversion Between Synchronous and Asynchronous Formats

Another feature of the invention are the methods and structure by which synchronous bipolar data streams are converted to serial asynchronous data streams, and vice versa. According to the invention, the traditional circuit modules which carry out this function are dispensed with, and the conversion is carried out by a microprocessor or microcontroller. Because of the extremes in temperature variations to which the test system 10 may experience, the traditional circuit-intensive conversion modules cannot be used. Rather, a 68HC11 microcontroller, obtained from Motorola, selected for the temperature range noted above, is utilized as the core processor for carrying out the conversion algorithm. In the preferred embodiment of the invention, a first conversion circuit and algorithm are incorporated in the communication module 35 (FIG. 1) for converting RS232 asynchronous data streams into DDS synchronous data streams that are coupled to the digital loop carrier system 12. A second converter is incorporated in the test system 10 for converting the DDS synchronous data streams into serial asynchronous data streams that are coupled to the CPU 56. Two independent communication channels in the system of FIG. 1 are involved, namely, a first communication channel 28 designated OS for communicating between the supervisory system 46 and the test system 10, and a communication channel 30 designated SS for providing communications between the SARTS terminal 44 and the test system 10. Because the communication channels are both routed through the digital carrier system 12, the transmission format must be compatible therewith, and in practice constitutes the DDS bipolar transmission format which is operable with standard T1 carrier system. It should be understood that while the present invention is described in connection with the preferred embodiment, the principles and concepts of the invention are not limited to the hardware or software described herein.

Figure 14:
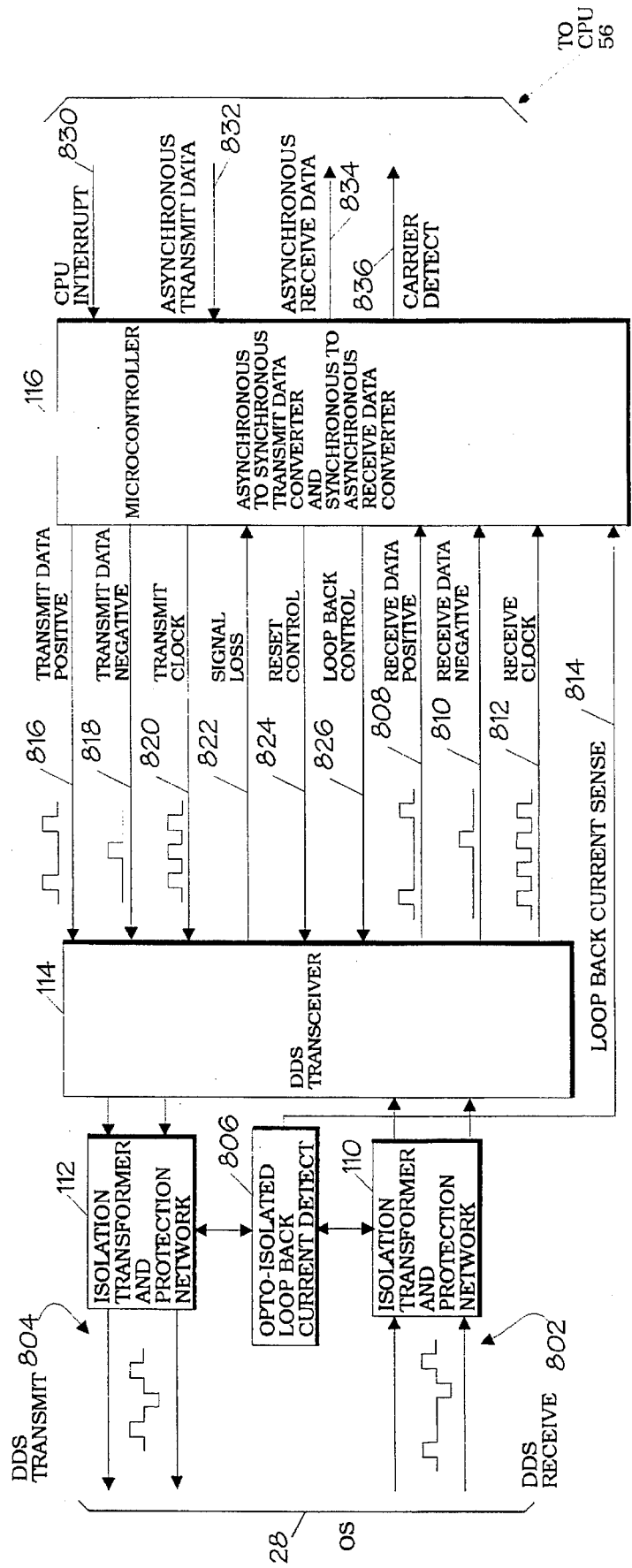
FIG. 14 is a block diagram of the hardware circuits for converting between synchronous and asynchronous data streams.

The structure, programming and operation of the converters in the communication module 35 and the test system 10 are substantially identical, and thus only the converter as situated in the test system 10 is described. FIG. 14 illustrates the structural features of the converter 800 according to the invention. The converter 800 includes an isolation transformer and protection network 110 connected to the DDS receive bus 802. The transformer and network 110 provides impedance matching to the synchronous line 802 and for coupling bipolar pulses to an input port of a transceiver 114. In the preferred form of the invention, the transceiver is of the type LXT400JE, obtainable from LEVEL ONE, INC. A DDS synchronous transmit line 804 is coupled by a similar transformer and matching network 112 to an output port of the transceiver 114. An optical isolated loop-back current detect circuit 806 is connected to the receive and transmit networks 110 and 112 for providing a DC path between the DDS transmit line 804 and the DDS receive line 802.

The function of the transceiver 114 is to provide unipolar receive data and clock signals to the microcontroller 116 from the DDS receive line 802, and to receive asynchronous signals from the microcontroller 116, convert the same into bipolar DDS format for transmission on the transmit line 804. In particular, the transceiver 114 receives the bipolar DDS format signals from the transformer network 110 and separates the bipolar positive pulses from the bipolar negative pulses. The bipolar positive pulses are transmitted to the microcontroller 116 on the receive data positive line 808, and the bipolar negative pulses of the synchronous pulse train are separated and transmitted to the microcontroller 116 on the receive data negative line 810. The transceiver 114 also recovers a clock signal from the synchronous transmission in a conventional manner, and provides clock pulses on the receive clock line 812. The receive clock line 812 is coupled to an interrupt input of the microcontroller 116, and thus for each clock signal on line 812, the microcontroller 116 is interrupted. As is well known for the DDS synchronous format, a series of digital ones is transmitted as alternating positive and negative bipolar pulses, whereas a digital zero is transmitted as no pulse. The bipolar waveform shown input to the transformer-network 110 corresponds to the digital states 1011. For each pulse position in the DDS synchronous format, there is recovered a clock signal by the transceiver 114, which clock is coupled to the microcontroller 116 on the receive clock line 812. The loop-back current detect circuit 806 also provides loop-back current sensing to the microcontroller 116 by way of line 814.

With respect to the transmission of information from the converter 800 to the DDS transmit line 804, the microcontroller 116 provides on line 816 positive pulses which are to appear as corresponding positive pulses in the DDS synchronous bipolar transmission. On line 818, the microcontroller 116 provides positive pulses which are to appear as corresponding negative pulses in the DDS synchronous bipolar transmission. The microcontroller 116 also provides a transmit clock signal on line 820 which is used by the transceiver 114 to synchronize transmitted data with the receive clock on line 812. Essentially, the clock timing of the transmission on the transmit line 804 is synchronized with that on the DDS receive line 802, the latter line being the source and time base of the transmission on line 804. The microcontroller 116 can signal the transceiver 114 on line 822 to indicate signal loss on the receive side. The microcontroller 116 can also reset circuits in the transceiver 114 by applying signals on the reset control line 824. Lastly, the microcontroller 116 can signal the transceiver 114 on line 826 to place the transceiver 114 in a mode in which the digital information on the DDS receive line 802 is loop-backed in the transceiver 114 and retransmitted back out on the DDS transmit line 804. In this mode of operation, the microcontroller 116 does not process and convert the signals, but rather remains idle.

The microcontroller 116 operates at about 8 MHz, and is interrupt driven on the synchronous side by the transceiver 114. On the asynchronous side the microcontroller 116 is interrupt driven by the CPU 56 for carrying out data format conversions. To that end, the microcontroller 116 includes a CPU interrupt input 830 to signal the coupling of asynchronous data from the CPU 56 to the microcontroller 116. Also coupled from the CPU 56 to the microcontroller 116 is a single-wire bus 832 for coupling 9600 baud serial asynchronous data thereto. In like manner, an oppositely directed bus 834 couples serial asynchronous data converted from the DDS synchronous format to the CPU 56. A control line 836 couples carrier detect signals to the CPU 56. The carrier detect signal provides an indication to the CPU 56 as to whether a carrier on the DDS receive line 802 is being received. Thus, when control line 836 is inactive, the CPU is not responsive to any signal transmission occurring on the asynchronous receive data line 834. Further, when there is no carrier detect signal, the CPU 56 is programmed to halt any transmission of asynchronous data on line 832 to the microcontroller 116. As will be discussed in more detail below, the microcontroller 116 includes a number of registers storing flag information to indicate the present status of various pulses and other states during the conversion process. The microcontroller 116 also includes a 16-bit shift register for use in converting the synchronous bipolar format to the asynchronous format, as well as other registers for temporarily storing information during the bidirectional conversion process. It should also be noted that the CPU 56 is of the type having an asynchronous transmit port and receive port to readily accommodate the signals on respective interconnecting lines 832 and 834.

As noted above, the microcontroller 116 is programmed to respond to interrupts for receiving synchronous communication from either the DDS receive line 802 or the CPU 56 and converting to the opposite format for corresponding transmission to different destinations. The flow charts of FIGS. 15a–15d illustrate the programmed operations of the microcontroller 116 for carrying out the different conversions. The microcontroller 116 is programmed with an assembly type of language.

Figures 15A, 15B:
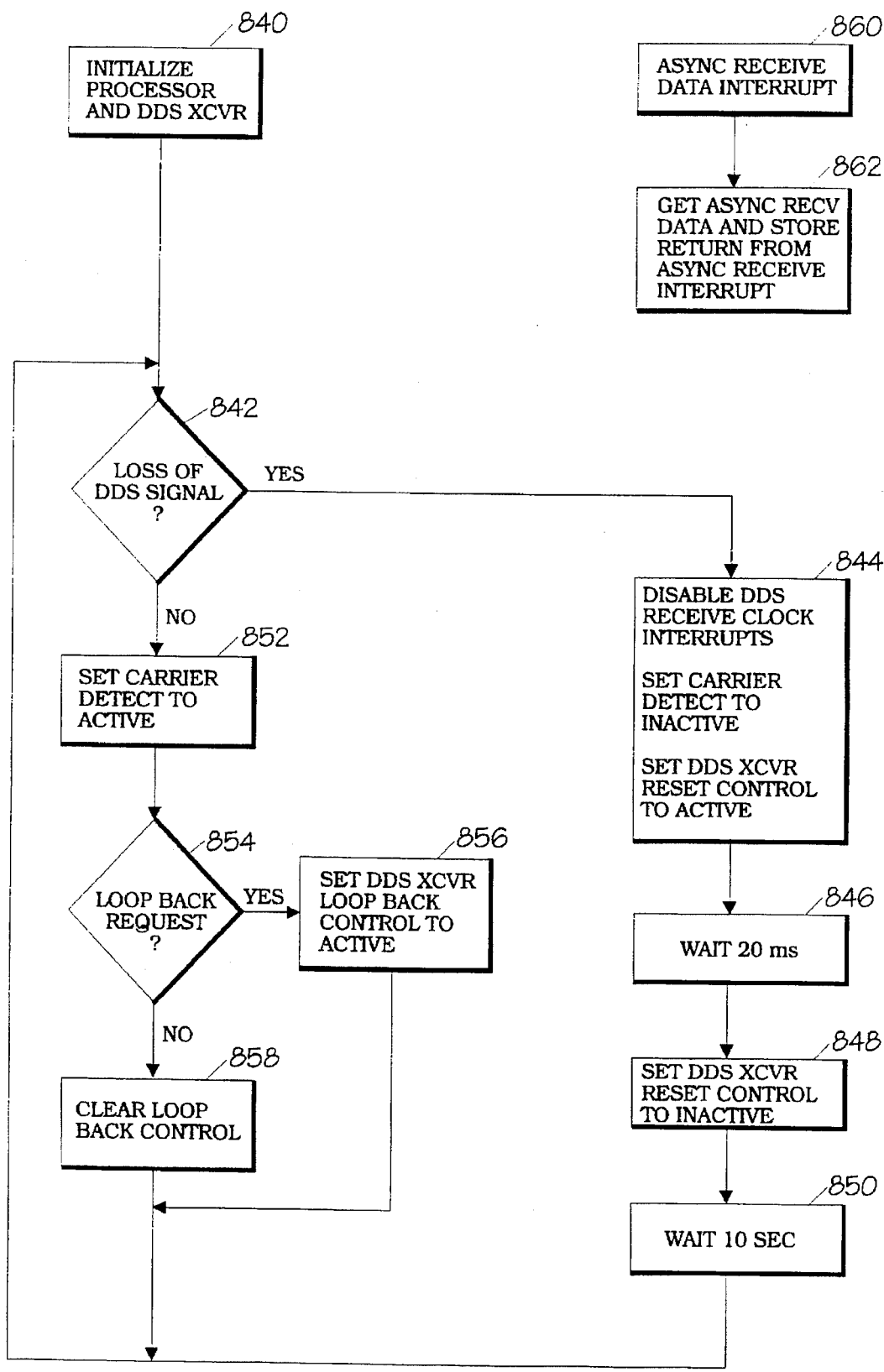
FIGS. 15a–15d are flow charts depicting instructions carried out by the microcontroller of FIG. 14 for achieving the conversion of the data stream formats.

With reference to FIG. 15a, there is shown a program loop through which the microcontroller 116 progresses if its interrupt inputs are not active. The operations carried out in FIG. 15a occur on each power up of the microcontroller 116. Program flow block 840 indicates the carrying out of instructions by the microcontroller 116 for initialization of the circuits thereof, as well as initialization of the transceiver 114. In decision block 842 the microcontroller 116 determines whether there is a loss of the DDS signal by ascertaining the digital state of the signal loss line 822 from the transceiver 114. On an affirmative response of decision block 842, it is determined that there is a loss of carrier on the DDS receive line 802, whereupon the microcontroller 116 proceeds to program flow block 844. Mere, the microcontroller 116 disables the DDS receive clock interrupts in response to any signal on interrupt input 812, sets the carrier detect flag to inactive, and forces a transceiver reset signal on line 824 to an active state. In block 846, a software wait of 20 milliseconds is carried out, and in block 848, the reset line 824 is driven to an inactive state. A software wait of ten seconds is carried out in program flow block 850 for allowing the transceiver a sufficient time to reset itself. In this sequence, the transceiver has been pulsed with a reset signal to place it into condition to respond to the carrier on the receive line 802 should transmission on the line resume, to the extent that clock pulses can be recovered. This loop is carried out repetitively when loss of the DDS signal is detected.

Should the carrier and clock on the receive line 802 be restored, and detected according to decision block 842, program flow branches to block 852 where a flag bit is set to indicate the status of the carrier is active. In decision block 854, it is determined whether there is a loop-back request, as ascertained by the receipt of a specific set of signals received on the synchronous line 802. Various types of maintenance signals can be transmitted from the SARTS terminal 44 on the synchronous line 802 to provide loop-back functions, as well as other network maintenance functions. Reference is made to Bell System technical reference PUB.62310 for the format of the various network signals. In the event there is a loop-back request received from the SARTS terminal 44 and received on the DDS synchronous receive line 802, program flow branches to block 856 where the microcontroller 116 sets the loop-back control line 826 to an active state, whereby the transceiver 114 configures itself to reroute the signals from the DDS receive line 802, through the transceiver 114 and back out the DDS transmit line 804. When a loop-back request is processed, the microcontroller 116 signals the CPU 56 via the carrier detect line 836 to indicate that the DDS transmit line 804 is busy and cannot be used for transmission by the CPU 56. From block 856, the microcontroller 116 returns for processing in the loop of FIG. 15a. In the event the determination of decision block 854 is negative, indicating no request for loop-back, the loop-back control signal is cleared, and processing in the loop continues.

With reference now to FIG. 15b, there is shown the basic operation of the microcontroller 116 in responding to an interrupt from the CPU 56 to receive a byte of asynchronous data therefrom. In block 860, the microcontroller 116 receives a CPU interrupt on input 830 (FIG. 14). While not shown, other instructions carried out by the microcontroller 116 are operative to receive the asynchronous transmission from the CPU 56, including a leading start bit, eight bits of data, and a stop bit for storage in an on-board shift register. When the entire byte is received and stored in the shift register of the microcontroller 116, it is interrupted to indicate the receipt of the byte of asynchronous data to be processed and converted for synchronous transmission. As noted above, the transmission of synchronous data by the converter 800 is carried out under control and timing of the recovered clock from the DDS receive line 802, which clock is provided to the microcontroller 116 on the receive clock input 812. It should also be noted that even when digital commands are not transmitted on the DDS synchronous receive line 802, an idle data format of all ones (alternating positive and negative pulses) is transmitted so that the clock signals can be recovered by the transceiver 114 and timing provided for the transmission of signals by the converter 800 on the DDS transmit line 804.

In block 862 of FIG. 15b, the microcontroller 116 retrieves the byte of asynchronous data from the shift register and stores the same in RAM memory. The microcontroller 116 then returns from the asynchronous receive interrupt servicing routine and resets the interrupt for receipt of a subsequent byte of asynchronous data.

Figure 15C:
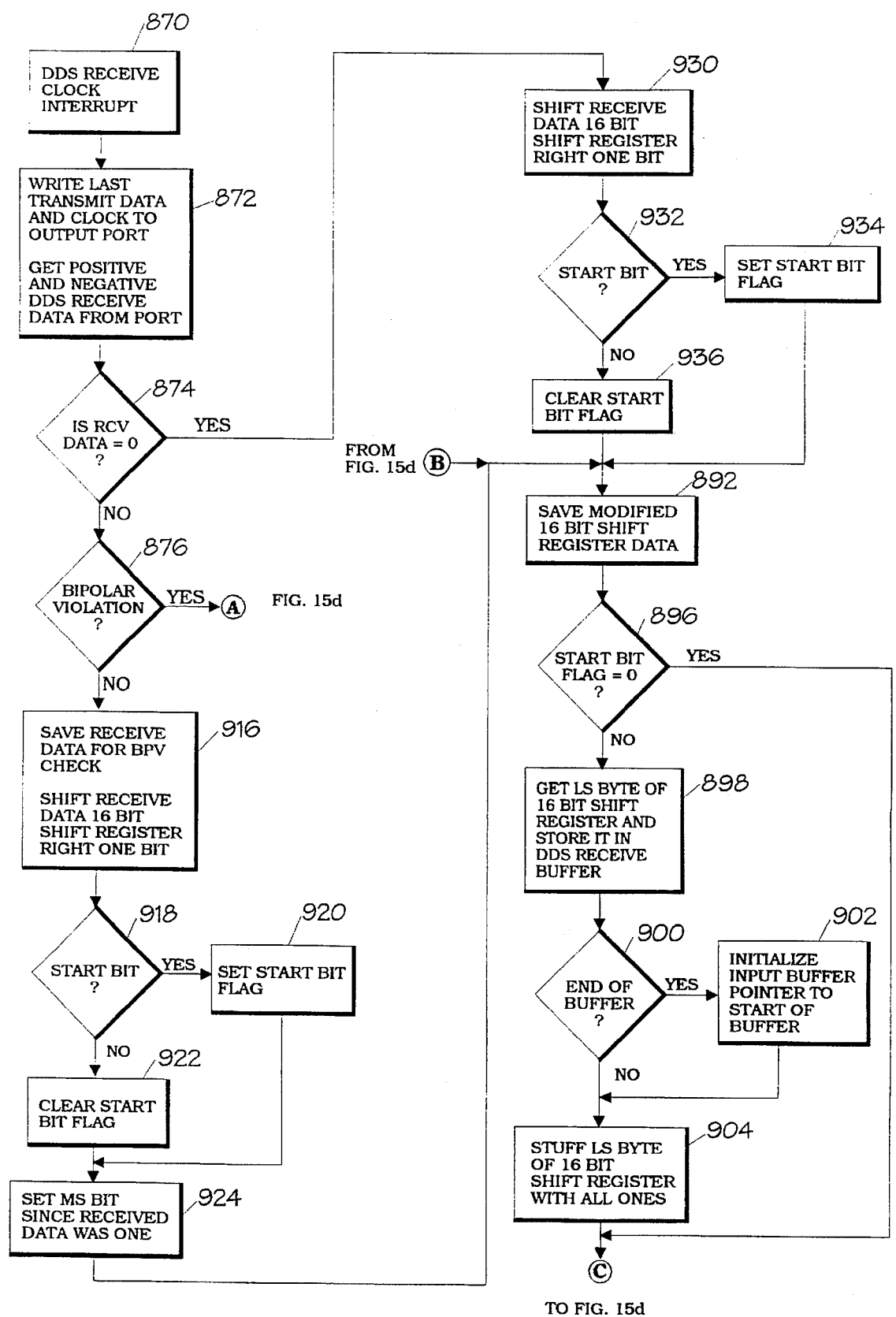
Figure 15D:
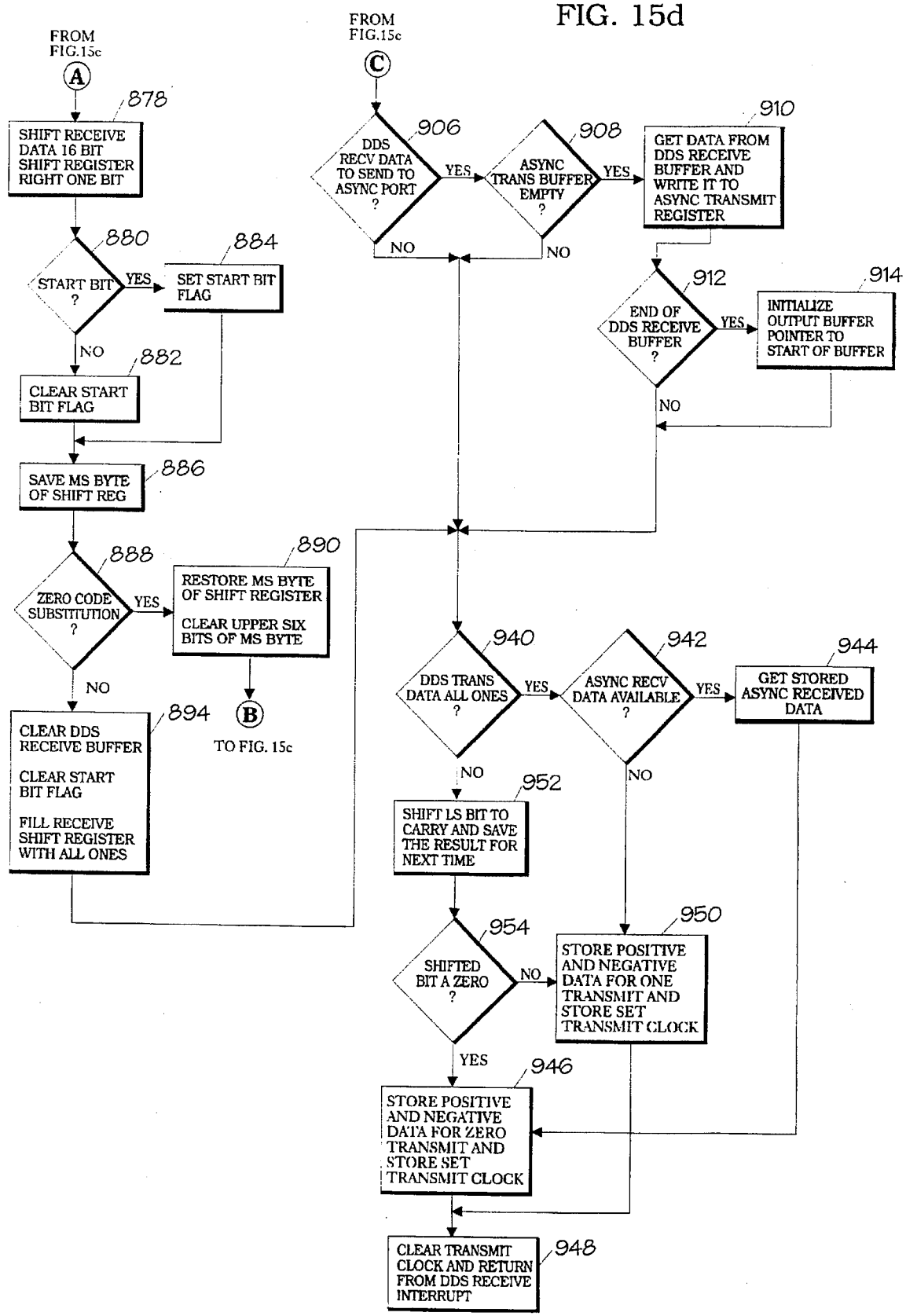

Referring now to FIGS. 15c and 15d, there is shown the program flow of the instructions carried out by the microcontroller 116 in converting bidirectional communications between the SARTS terminal 44 and the CPU 56. It is to be noted that the microcontroller 116 passes through the flow chart route once for each digital bit processed. More particularly, during traversal of the flow chart of FIGS. 15c and 15d, the microcontroller 116 processes one bit received from the DDS synchronous receive line 802 and one bit of the byte received from the CPU 56 on the asynchronous transmit line 832, as well as attends to the transmission of bits to the DDS transmit line 804 via the transceiver 114 and to the CPU on line 834.

It should be noted that the description of the program flow of FIGS. 15c and 15d are explained with the assumption that prior synchronous clocks have been received in connection with data, and that the conversion process is ongoing. In other words, the example does not assume that the processing commences with a first clock signal and a first data bit received from the DDS synchronous line 802. In program flow block 870 of FIG. 15c, the microcontroller 116 polls its interrupt input 812 to determine if a receive clock has been received. As noted above, the transceiver 114 recovers clock signals from the bipolar signals carried by the DDS receive line 802, even in the absence of the transmission of information. Hence, the microcontroller 116 is interrupted once for each clock received on interrupt input 812.

In response to the interrupt on the synchronous data side of the microcontroller 116, the last converted transmit data bit and clock are written to the output port of the microcontroller that is connected to the transceiver 114. If the data to be transmitted is a zero, then both the transmit data negative line 818 and the transmit data positive line 816 are maintained at a logic low level, while a clock pulse is output on the transmit clock line 820. On the other hand, if the data bit to be transmitted is a one, then either the transmit positive line 816 or the transmit negative line 818 is pulsed, depending upon the state of the preceding digital bit transmitted. In order to maintain conformance with the DDS format, sequential digital ones are transmitted as alternate positive and negative bipolar pulses. Thus, according to block 872, if the previous digital one transmitted was a positive pulse, then the transmit negative line 818 is pulsed so that the subsequent or present digital one will be transmitted as a negative bipolar pulse. On the other hand, if the preceding data bit was represented by a negative bipolar pulse, then the transmit data positive line 816 is pulsed by the microcontroller 116 so that the present digital one will be represented by a positive going bipolar pulse on the DDS transmit line 804. Because the transmission of data by the microcontroller 116 on the positive and negative lines 816 and 818 depends upon what was previously transmitted, the microcontroller 116 maintains an internal flag denoting the state of the preceding pulse that was transmitted. It should also be noted that in converting the asynchronous data received on line 832, the microcontroller 116 inserts the asynchronous start bits and may suppress the stop bits and additionally transmits the eight bits of data to the transceiver 114 for further conversion into the synchronous bipolar format.

Also noted in program flow block 872, the microcontroller 116 obtains the positive and negative DDS receive data from the synchronous receive port constituting the receive data positive line 808 and the receive data negative line 810. In other words, for a digital one value received by the transceiver 114, if it was represented by a positive bipolar pulse on line 802, then the pulse would be reconstituted on line 808 in coincidence with a clock pulse on line 812. On the other hand, if the bipolar incoming pulse was of negative polarity, then such pulse would be reproduced by the transceiver 114 as a positive pulse on the data negative line 810, again in correspondence with a clock pulse on line 812. If a digital zero was received on the bipolar synchronous DDS input 802, no pulse will appear on either line 808 or 810, but rather two digital zeroes will appear coincident with a clock pulse on line 812. Hence, the microcontroller 116 only receives positive unipolar pulses, but can determine if they were previously represented by positive or negative bipolar pulses, depending on which line 808 or 810 the pulse is received.

In decision block 874, the microcontroller 116 determines whether the synchronous data received on line 802 was representative of a digital one or a digital zero. Digital zeroes are indicative of either data bits or as a start bit encoded from the RS232 bit stream of the pad 42 (FIG. 1) into a synchronous format by the communication module. Encoded digital ones can be data bits or stop bits. If either a positive or negative bipolar pulse was received, it is representative of a digital one, and program flow proceeds with block 876 to further determine if the synchronous serial stream received, including the last data bit received, constitutes a bipolar violation. The format of various bipolar violations is set forth in the Bell System technical reference PUB.62310, as noted above. One bipolar violation of interest according to the present invention is the transmission of a zero suppression sequence, which is a particular sequence for transmitting a predetermined pattern of zeroes and ones, but the overall sequence is representative of a zero data state of a number of bits. The zero suppression sequence is special formatted data so that during the transmission of many zeroes, there will be sufficient ones for clock recovery purposes. This can be appreciated as if absolutely no pulses whatsoever were transmitted on the DDS synchronous receive line 802 to truly represent digital zeroes, then no clock signals could be recovered and no data transmissions could be carried out by the transceiver 114 on the DDS synchronous transmit line 804.

The zero suppression sequence transmission constitutes a bipolar violation, and the sequence is different depending upon the bit rate of transmission. For a 9.6 kb/s transmission rate, the received sequence of 000X0V must be replaced by 000000 which is the true representation of the data being transmitted. The X and V denotation are the same as specified in the Bell System publication identified above, and essentially mean that the X and V bits are both ones and both are of the same polarity—thus constituting a violation that ones must be represented as alternate positive and negative pulses. In any event, the sequence of 000101 received on the DDS receive line 802 represents a bipolar violation when the two ones are of the same polarity, i.e., either being both positive pulses separated by a zero level, or both negative pulses separated by a zero level. When such a sequence is received, the microcontroller 116 must recognize the sequence as being a series of true zero bits, i.e., as representing the transmission of all zeroes. Hence, the actual received format must be replaced in part by six logic zero levels. In order to determine whether a zero suppression sequence or other bipolar violation has been transmitted, the previous bits transmitted must be stored and compared with the presently received bits. In doing this, the microcontroller 116 utilizes an internal 16-bit shift register having eight most significant bits (MSB 8–15) and eight least significant bits (LSB 0–7). The actual bits received from the DDS synchronous receive line 802 are shifted first into the MSB bit position 15 of the shift register, analyzed, and if a zero suppression sequence is detected, the LSB bits are set to zero and forwarded to the CPU 56.

In each iteration through the program flow of the blocks of FIGS. 15c and 15d, the microcontroller 116 looks at the polarity of the present bit received and the polarity flag of the previous digital one, and determines whether a bipolar violation has occurred. If both pulses have the same polarity, then a violation has occurred. This determination is made in decision block 876. If a bipolar violation has occurred, processing proceeds to block 878 of FIG. 15d. In program block 878, the bit received is shifted into the 16-bit shift register, and bits of the shift register are shifted right by one bit. It should be noted that prior to shifting a first bit to be converted into the shift register, all bit positions were set to ones. Hence, when a start bit (digital zero bit) of an asynchronous bit stream is encoded into the synchronous stream and received as a leading bit at the DDS receive line 802, that zero bit becomes the first bit shifted into the shift register. Each subsequent bit is a data bit followed by a digital one stop bit. After the shift right of program block 878, the microcontroller 116 checks the carry position, or flag position, of an accumulator to determine if it is a zero, denoting the start bit. In block 880, the microcontroller tests the carry bit of the accumulator to determine the presence or absence of the start bit. If the flag indicates that there is yet no start bit, this indicates that more data is to come, and processing moves to block 882 where the start bit flag is cleared. On the other hand, if the result of block 880 indicates the presence of a start bit in the accumulator carry position, processing moves to block 884 where the start bit flag is set, and processing proceeds to block 886. In block 886, the most significant bits (bits 8–15) of the shift register are stored in RAM memory of the microcontroller 116. In the decision block 888, the microcontroller 116 determines the specific type of bipolar violation received. If the violation is of a zero code substitution type described above, processing proceeds to block 890 where the most significant bits are restored, and the six shift register bits 8–15 representative of the sequence 000X0V are cleared, making such bits zero. The processing from block 890 returns to block 892 of FIG. 15c.

Returning to decision block 888 of FIG. 15d, if the bipolar violation was not of the zero code substitution type, then processing proceeds to block 894 where the various registers of the microcontroller 116 are cleared as the code must have been a maintenance type which does not require processing by the converter 800. The start bit flag is cleared and the receive shift register is filled with digital ones for transmission on the DDS transmit line 804 indicating an idle state. From block 894, processing proceeds as shown in FIG. 15d.

In further processing the zero code substitution as determined in program flow blocks 888 and 890, the microcontroller 116 saves in memory the modified 16-bit shift register data, as noted in block 892 of FIG. 15c. The shift register contains potentially valid data of a full byte in length. In decision block 896, the start bit flag is checked to determine if it is set or reset. It is noted that the start flag was set or cleared depending upon the actions of blocks 882 or 884 in FIG. 15d. If the start flag does not equal zero, processing proceeds from decision block 896 to block 898. This route from decision block 896 indicates that the full complement of bits have been received on the DDS receive line 802, as a start bit now appears in the carry position of the accumulator. In block 898, the least significant bits (bits 0–7) of the shift register define the byte and are saved or stored in RAM memory, without the associated start or stop bits. When the byte is sent by the microcontroller 116 to the CPU 56, the microcontroller hardware will reinsert the start and stop bits with the eight bits of data. If the DDS receive buffer is empty, processing branches from block 900 to 902 where an input buffer pointer is initialized to the start of the receive buffer. It this manner, when the bits are transmitted to the CPU 56, the first bit will be identified by the pointer. On a negative determination of block 900, the least significant byte (bits 0–7) of the shift register is written with all ones. In this manner, the contents of the LS byte of the shift register will not be interpreted as a start bit when shifted out. This is noted in block 904 of FIG. 15c.

If the start bit flag as tested in program block 896 is in the affirmative, then processing proceeds directly to block 906 of FIG. 15d. The microcontroller 116 tests the decision block 906 to determine if the DDS receive buffer has data. If there is no data yet in the receive buffer, then processing proceeds as noted in FIG. 15d. On the other hand, if the result of decision block 906 is in the affirmative, decision block 908 is encountered. In decision block 908, a determination is made as to whether the asynchronous transmit buffer is empty. This decision is made by checking a flag in the UART of the microcontroller 116 to see if it can receive another byte of data. If the answer is negative, processing proceeds as noted in FIG. 15d. If the result of decision block 908 is in the affirmative, then the microcontroller 116 transfers the data from the buffer to the microcontroller UART which serializes the data and sends it out to the CPU 56 via the asynchronous receive data line 834. It should be noted that only one bit is operated on during each pass through blocks 906–910. If the bit presently transferred to the UART is not the last bit in the buffer, then processing proceeds from decision block 912 downwardly through the negative decision path. If the last bit transmitted was in fact the last bit of the byte, then the microcontroller 116 initializes the output buffer pointer to the start of the buffer, as noted by block 914. The foregoing path is carried out by the microcontroller 116 in receiving data from the DDS synchronous receive line 802, converting the bipolar violation data to asynchronous format and transmitting the same to the CPU 56.

Returning now to decision block 876 of FIG. 15c, if the received synchronous data is determined not to be a bipolar violation, processing proceeds to block 916 where the received bit is obtained by the microcontroller 116 as a zero or one data bit, and it is shifted into the shift register by moving the previous bits to the right by one bit. It should be noted that even though processing has proceeded to block 916 from the negative path of block 876, a bipolar violation might be imminent, although not enough bits have yet been received and processed to determine if a bona fide bipolar violation has occurred. In any event, the bit presently being processed with respect to block 916 provides a sufficient indication that with respect to such bit and the bits preceding it, no bipolar violation has yet occurred. On the shifting of the shift register to the right one bit position, it is determined whether the leading bit in the accumulator carry position comprises a start bit. The start bit is defined by a leading digital zero, as contrasted to a leading digital one. As was noted above, the shift register is initialized to all ones and thus the first synchronous bit received must be a zero to be recognized as a start bit. If the shift bits in the shift register resulted in a start bit, as determined by decision block 918, then the start bit flag is set as noted in block 920, and the most significant bit in the shift register is set to a digital one, in correspondence with the state of the digital bit received from the DDS receive line 802. It is realized that if a digital one is received by the microcontroller 116, branching from decision block 874 is only downwardly in the flow diagram and eventually to block 924 where the shift register is set to the value of the bit received. If, on the other hand, a start bit was not detected in decision block 918, the start bit flag is cleared as noted in block 922, and again the most significant bit in the shift register is set to one, as noted in block 924. From block 924, processing proceeds to block 892 as described above for further conversion to complete a byte of data, and for transmitting the byte of data in the asynchronous format to the CPU 56.

Returning to the decision block 874 of FIG. 15c, if an affirmative decision therefrom resulting from the receipt of a digital zero, the program flow branches to block 930. It is noted in block 874 that if a data bit zero is received that is either a start bit or a bona fide logic zero data bit, then such bit is written into the shift register and the shift register is shifted right by one bit. The carry bit of the shift register is then tested in block 932 to determine if a start bit has appeared. It is recalled that the shift register was previously initialized to all digital ones, and the first bit shifted in is a zero bit defining a start bit. Hence, after a number of shifts in the shift register when a leading zero bit is detected, it is known that it is the start bit and the following eight bits are data bits. If a start bit is detected, the start bit flag is set in block 934 and processing proceeds to block 892 as discussed above. On the other hand, if the start bit is not detected in block 932, the start bit flag is cleared in block 936, whereupon processing proceeds as described above.

The paths taken by the microcontroller 116 in the processing of the bits described above all lead to decision block 940 of FIG. 15d. The series of program flow blocks starting with decision block 940 involve the processing of asynchronous data received from the CPU 56, the converting of such data into a synchronous format for the transmission to the SARTS terminal 44, via the DDS synchronous transmit line 804 (FIG. 14). The conversion of asynchronous data to synchronous data is facilitated as the past history of pulse polarities is not significant. As described above in connection with the processing of a single bit of synchronous data for conversion into asynchronous format, a single bit of data received from the CPU 56 is also involved for each traversal of the flow chart of FIGS. 15c and 15d. As described above in connection with FIG. 15b, the microcontroller 116 has received from the CPU 56 a full byte of asynchronous data, and such data has been temporarily stored in the memory of the microcontroller 116. Design program block 940 is encountered to determine if the transmission of all digital ones to the transceiver 114 is occurring to indicate that the DDS transmit line 804 is idle. In other words, the microcontroller 116 will output alternate pulses on the transmit data positive line 816 and the transmit data negative line 818 so that alternate positive and negative bipolar pulses will be transmitted on the synchronous transmit line 804 to indicate an idle line. If the past state of the transmission line is idle, then processing branches from block 940 to block 942 where the microcontroller 116 determines if there is bona fide communication data to transmit on the DDS transmit line 804, rather than the idle status bits. In block 942, a flag is tested to determine if the microcontroller 116 has received and stored asynchronous data from the CPU 56. Assuming that asynchronous data has been received pursuant to blocks 860 and 862 of FIG. 15b, the microcontroller 116 retrieves the byte of asynchronous data from the memory as shown in block 944. From block 944, the microcontroller proceeds to block 946 where a start bit and a stop bit are added to the byte of data. Further, if the byte of data to be transmitted comprises all zeroes, then the appropriate positive or negative pulses defined by the zero suppression sequence must be substituted therefor. In other words, if all eight bits of asynchronous data are zeroes, then such data must be reconfigured as having the least significant six bits as 000101 which is the zero suppression sequence. Further, if the two logic one bits of the zero suppression sequence are to be transmitted as positive pulses, then the microcontroller 116 will place corresponding signals on the transmit data positive line 816 in the appropriate clock cycles during each traversal of the flow chart. On the other hand, if the zero suppression sequence logic ones are to be represented as bipolar negative pulses, then the microcontroller 116 will place the appropriate pulses on the transmit data negative line 818 in the appropriate time slots. If the asynchronous data to be transmitted is other than all zeroes, then the bit sequence, together with the start and stop pulses, will be transmitted in a sequence, one bit for each traversal of the flow chart.

According to program block 948, the transmit clock is cleared and the microcontroller 116 returns from the DDS receive interrupt routine. As was noted above, the microcontroller 116 is interrupted on each recovered clock pulse appearing on the receive clock line 812, and a clock on such line is required for each transmission of a data bit from the microcontroller 116 to the DDS transmit line 804, via the transceiver 114. From block 948, the microcontroller 116 returns to block 834 on the receipt of a subsequent interrupt on line 812.

Returning to program decision block 942 of FIG. 15d, if asynchronous data has not been received from the CPU 56 and made available for conversion and transmission, the processor proceeds from block 942 to block 950 where the microcontroller 116 is configured to transmit digital ones on the synchronous transmit line 804, thereby indicating an idle state. Program block 950 causes the transmission of either a pulse on the transmit data positive line 816 or the transmit data negative line 818, depending upon the state of the previously sent pulse. This assures that all digital ones transmitted on the DDS synchronous line 804 have alternating positive and negative pulses. From block 950, processing proceeds to block 948, as described above.

With reference again to decision block 940 of FIG. 15d, if the flag indicates that the transmit line is not idle, but rather bits of asynchronous data are in the process of being transmitted, the microcontroller 116 proceeds to block 952. Here, the least significant bit, whether it be a start bit or one of the data bits, or the stop bit, is shifted to the carry position of the microcontroller accumulator, and the result thereof is saved for the next transmission. In the decision block 954, a determination is made as to whether the shifted bit is a zero or a one. If the bit to be transmitted is a one, then in block 950 the microcontroller 116 provides a pulse on either the transmit data positive line 816 or the transmit data negative line 818 to send a respective positive or negative bipolar pulse, depending upon the state of the previous pulse transmitted. A transmit pulse is also transmitted pursuant to block 950 on the transmit clock line 820 so that the transceiver 114 can convert the signals into the corresponding bipolar representation of the data. If, on the other hand, the bit shifted is a zero, processing continues from block 954 to block 946 to place the appropriate digital signals on the lines 816 and 818, as well as set the transmit clock for clocking line 820 to the transceiver 114. From block 946, processing continues to program flow block 948, as discussed above.

If the rate of receiving asynchronous data from the CPU 56 is equal to or less than the frequency of the clock signals recovered from the DDS receiver line 802, then the start bit, eight data bits and the stop bit are encoded by the microcontroller 116 into a synchronous format and transmitted on the DDS transmit line 804. However, in the event that the rate of transmission of the asynchronous data from the CPU 56 to the microcontroller 116 is greater than the synchronous transmission rate, the microcontroller 116 can be programmed to eliminate various of the stop bits from transmission, thereby accommodating the different asynchronous and synchronous transmission rates. The converter 800 can accommodate a difference in transmission rates of about 2.5%. Alternatively, the stop bit can be decreased in pulse width and appended to the eight data bits to also accommodate the different transmission rates. Whether or not a stop bit is deleted by the microcontroller 116 is determined by the microcontroller 116 after the 8-bits of asynchronous data have been processed. Once the eight bits have been processed, but before the stop bit has been processed by the microcontroller 116, the internal UART of the microcontroller is polled to determine if a subsequent byte of asynchronous data has been received from the CPU 56. If a subsequent byte has been received and is ready for processing, the microcontroller 116 does not process the stop bit of the preceding byte, but rather suppresses the stop bit and proceeds directly in processing the start bit of the newly received byte of asynchronous data. If, on the other hand, a new byte of asynchronous data has not been received by the UART from the CPU 56, a stop bit is processed by the microcontroller 116 and added after the eighth bit of the preceding byte and transferred to the transceiver 114. On the synchronous side of the microcontroller 116, a stop bit is not distinguishable from the idle state, as both constitute bipolar ones.

From the foregoing, disclosed is a technique for carrying out the bidirectional conversion of asynchronous and synchronous data, using a software driven processor, rather than discrete hardware circuits. Those skilled in the art may find from the foregoing disclosure that the principles and concepts of the invention can be employed to convert from and to formats other than described above.

While the preferred embodiment of the invention has been disclosed with reference to a specific test set arrangement, and methods of operation thereof, it is to be understood that many changes in detail may be made as a matter of engineering or software choices, without departing from the spirit and scope of the invention, as defined by the appended claims.

What is claimed is:

1. A method of calibrating test equipment to carry out tests, comprising the steps of:

disconnecting an input of the test equipment from a device under test;

connecting a predefined reference voltage to the input of the test equipment, said test equipment having a differential measuring path;

measuring the amplitude of the reference voltage by connecting the reference voltage to a noninverting path of the differential path and taking a first measurement thereof, and connecting the reference voltage to an inverting path of the differential path and taking a second measurement thereof;

connecting both inverting and noninverting paths to a common voltage and taking a third measurement to measure a DC offset parameter of the differential path;

storing the first, second and third measurements;

connecting the device under test to the test equipment and measuring the amplitude of a test signal for testing the device under test; and calculating a calibrated signal amplitude of the test signal by using the first, second and third measurements in combination with the test signal.

2. The method of claim 1, further including carrying out a calibration sequence in a first differential path of the test equipment for voltage measurements, and carrying out a calibration sequence in a second differential path of the measurement equipment for current measurements of the device under test.

3. The method of claim 1, further including calculating the calibrated signal amplitude according to the following algorithm, calculated AC measurement=VPB (raw measurement), and calculated DC value=VPB (raw DC measurement)–DC offset, where VPB is a voltage per bit determined in the calibration sequence and the DC offset is a parameter determined in the calibration sequence.

4. The method of claim 1, further including measuring the output of a signal transmitter providing a specified output, determining the error in amplitude thereof, and adjusting a transmitter drive based on said error to achieve a desired output of the transmitter.

5. A method of calibrating test equipment of the type employing A/D converters for converting analog signals resulting from tests conducted by the test equipment to corresponding digital signals, comprising the steps of:

driving the A/D converter with at least two different amplitude input signals and obtaining corresponding output digital signals and deriving a characteristic operating slope of the A/D converter;

driving a circuit employing the A/D converter with a reference signal and obtaining a corresponding digital signal and determining a characteristic DC offset voltage of the A/D converter circuit;

conducting a test of a device under test by connecting the test equipment thereto and driving the device under test with analog signals and coupling resulting analog signals from the device under test to the A/D converter circuit, and generating resulting digital signals; and correcting the resulting digital signals by arithmetically combining the resulting digital signals with the characteristic operating slope and the characteristic DC offset voltage of the A/D converter circuit.

6. The method of claim 5, further including correcting the resulting digital signals by multiplication thereof with the characteristic operating slope.

7. Test equipment for carrying out the steps of claim 5.

8. The method of claim 5, further including correcting the resulting digital signals by subtraction thereof by the characteristic DC offset voltage.

9. The method of claim 5, further including testing a device under test comprising a telephone subscriber line having a tip conductor and a ring conductor.

10. The method of claim 9, further including driving the tip and ring conductors with test signals and measuring a DC resistance thereof.

11. The method of claim 10, further including driving the tip and ring conductors with test signals through resistors in the test equipment of predefined values, coupling the A/D converter across at least one of said resistors, and determining a characteristic input resistance of the A/D converter circuit, and determining therefrom a DC resistance of the telephone subscriber line.

12. The method of claim 5, further including an A/D transmitter in said test equipment for driving the device under test with test signals, and using said A/D converter to both measure characteristics of the test signals coupled to the device under test, as well as measure signals from the device under test resulting from the test signals.

13. The method of claim 5, further including driving said A/D converter with a first frequency clock to determine a low-band measurement characteristic operating slope, and driving the A/D converter with a second different frequency clock signal to determine a high-band measurement characteristic operating slope of the A/D converter.

14. The method of claim 13, further including correcting the resulting digital signals using either said low-band or high-band measurement slope as a function of the frequency of the test signals by which said device under test is driven.

15. The method of claim 5, further including employing a tone transmitter for driving the device under test with a test tone of a predefined amplitude, and measuring an actual amplitude of the test tone at an input of the device under test and determining a difference between the predefined amplitude and the actual amplitude to thereby define a calibration factor of the test tone.

16. The method of claim 15, further including mathematically combining the predefined amplitude of the test tone with the calibration factor to accurately characterize the test tone employed to drive the device under test.

17. The method of claim 5, further including calibrating the test equipment before a test is conducted on the device under test by determining the characteristic operating slope of the A/D converter and the offset voltage characteristic of the A/D converter circuit.

18. A method of calibrating test equipment of the type employing A/D converters for converting analog signals resulting from tests conducted by the test equipment to corresponding digital signals, comprising the steps of:

generating a test signal by the test equipment by applying digital signals to a D/A converter to provide an analog test signal, employing the analog test signal as an input to a pair of power amplifiers, and driving a respective tip and ring conductor of a line under test using the power amplifier outputs via a pair of load resistors connected respectively between the power amplifier outputs and the tip and ring conductors;

switchably connecting test equipment circuits and test voltages applied to the tip and ring conductors to an A/D receiver for use in calibrating the test equipment, and thereafter coupling voltage and currents resulting from the tests to the A/D receiver; and computing corrected test voltages and currents applied to the tip and ring conductors using said calibration and comparing the resulting currents and voltages from the tip and ring conductors with the corrected test voltages and test current and determining whether the tip and ring conductors are operable.

19. The method of claim 18, further including measuring a current driven in the tip conductor by measuring a voltage across one said load resistor, and measuring a current driven into the ring conductor by measuring a voltage across the other said load resistor.

20. The method of claim 19, further including using a current processing circuit for converting a differential voltage developed across each said load resistor to a corresponding single ended voltage representative of the tip and ring currents.

21. The method of claim 20, further including using a voltage processing circuit for switchably connecting across the tip and ring conductors for measuring the test voltage applied to the tip and ring conductors via said load resistors.

22. The method of claim 21, further including converting the signals of the respective current and voltage processing circuits to corresponding digital signals using a pair of A/D converters.

23. The method of claim 22, further including coupling the voltage and current processing circuits to said respective A/D converters via a respective pair of voltage level shifting amplifiers.

24. The method of claim 18, further including using a digital signal processor to generate digital signals for coupling to said D/A transmitter to produce corresponding analog test signals.

25. The method of claim 24, further including coupling the A/D receiver output to the digital signal processor to analyze the resulting test signals.

26. The method of claim 25, further including calibrating said test equipment before each different test of said tip and ring conductors.

27. The method of claim 18, further including calibrating the test signals for AC tests and DC tests.

28. A method of calibrating test equipment to carry out tests, comprising the steps of:

a) driving a differential voltage measuring path of the test equipment adapted for measuring voltage with a first set of different reference voltages;

b) converting an output of the differential voltage measuring path to a single ended voltage;

c) converting the single ended voltage to a corresponding digital value;

d) repeating steps a)–c) but with a second set of different reference voltages that are different from said first set of different reference voltages;

e) driving a differential current measuring path of the test equipment adapted for measuring current with a third set of different reference voltages;

f) converting an output of the differential current measuring path to a single ended voltage;

g) converting the single ended voltage of the current measuring path to a corresponding digital value;

h) repeating steps e)–g) but with a fourth set of different reference voltages that are different from said third set of different reference voltages;

whereby said digital values of said voltage measuring path and said digital values of said current measuring path define respective slope characteristics A/D converters associated with the voltage and current measuring paths.

29. The method of claim 28, wherein said first sets of reference voltages are respectively a reference DC voltage and ground.

30. The method of claim 29, wherein said second set of reference voltages includes reversing the reference DC voltage and the ground with respect to the differential voltage measuring path.

31. The method of claim 28, further including driving A/D converters associated with the differential voltage and current measuring paths with a first sampling frequency to define low-band characteristic slopes of the respective A/D converters, and driving the A/D converters with a higher sampling frequency to define high-band characteristic slopes of the respective A/D converters.

32. The method of claim 28, further including applying a zero reference voltage to the differential voltage measuring path and to the differential current measuring path and converting a respective resulting voltage measuring output and a resulting current measuring output to digital values, whereby the digital values define respective DC offset characteristics of the current and voltage measuring paths.

33. The method of claim 28, further including measuring an input resistance to the differential voltage measuring path.

* * * * *